(12) United States Patent
Kim et al.

(10) Patent No.: US 12,471,273 B2
(45) Date of Patent: Nov. 11, 2025

(54) SEMICONDUCTOR MEMORY DEVICE

(71) Applicant: Samsung Electronics Co., Ltd., Suwon-si (KR)

(72) Inventors: Eunjung Kim, Daegu (KR); Hyunyong Kim, Daegu (KR); Sangho Lee, Suwon-si (KR); Yongseok Ahn, Seoul (KR); Jay-Bok Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 460 days.

(21) Appl. No.: 17/729,024

(22) Filed: Apr. 26, 2022

(65) Prior Publication Data

US 2022/0406791 A1    Dec. 22, 2022

(30) Foreign Application Priority Data

Jun. 22, 2021  (KR) .......................... 10-2021-0080853

(51) Int. Cl.
    *H10B 12/00*    (2023.01)
(52) U.S. Cl.
    CPC ......... *H10B 12/485* (2023.02); *H10B 12/482* (2023.02); *H10B 12/488* (2023.02)
(58) Field of Classification Search
    CPC .............. H10B 12/0335; H10B 12/053; H10B 12/315; H10B 12/34; H10B 12/48; H10B 12/482; H10B 12/485; H10B 12/488
    See application file for complete search history.

(56) References Cited

U.S. PATENT DOCUMENTS

| | | |
|---|---|---|
| 6,358,820 B1 | 3/2002 | Maeda |
| 6,380,554 B1 | 4/2002 | Bush et al. |
| 6,573,153 B2 | 6/2003 | Maeda |
| 7,308,588 B2 | 12/2007 | Nishizawa et al. |
| 7,930,656 B2 | 4/2011 | Aton et al. |
| 7,995,984 B2 | 8/2011 | Kudaishi et al. |
| 10,008,505 B2 | 6/2018 | Lee et al. |
| 10,304,852 B1 | 5/2019 | Cui et al. |
| 10,916,549 B2 | 2/2021 | Son et al. |
| 2004/0097018 A1 | 5/2004 | Lee et al. |

(Continued)

FOREIGN PATENT DOCUMENTS

| | | |
|---|---|---|
| CN | 105097933 A | 11/2015 |
| CN | 109755254 A | 5/2019 |

(Continued)

*Primary Examiner* — Britt D Hanley
*Assistant Examiner* — Kevin Quinto
(74) *Attorney, Agent, or Firm* — Muir Patent Law, PLLC

(57) ABSTRACT

Provided is a semiconductor memory device comprising a device isolation pattern in a substrate and defining first and second active sections spaced apart from each other, wherein a center of the first active section is adjacent to an end of the second active section, a bit line that crosses over the center of the first active section, a bit-line contact between the bit line and the first active section, and a first storage node pad on the end of the second active section. The first storage node pad includes a first pad sidewall and a second pad sidewall. The first pad sidewall is adjacent to the bit-line contact. The second pad sidewall is opposite to the first pad sidewall. When viewed in plan, the second pad sidewall is convex in a direction away from the bit-line contact.

15 Claims, 50 Drawing Sheets

(56) References Cited

U.S. PATENT DOCUMENTS

| | | | |
|---|---|---|---|
| 2009/0236658 A1* | 9/2009 | Gruening-von Schwerin | ............ H10N 70/8833 438/270 |
| 2013/0256769 A1* | 10/2013 | Jeong | ............ H10B 12/31 257/296 |
| 2015/0325695 A1 | 11/2015 | Suh et al. | |
| 2015/0333069 A1* | 11/2015 | Kim | ............ H10B 12/0335 257/334 |
| 2019/0006365 A1* | 1/2019 | Derner | ............ G11C 5/025 |
| 2020/0203354 A1 | 6/2020 | Lee et al. | |
| 2020/0343252 A1 | 10/2020 | Lai et al. | |
| 2020/0365537 A1* | 11/2020 | Choi | ............ H10B 12/053 |
| 2020/0388618 A1 | 12/2020 | Ikeda | |
| 2020/0395244 A1 | 12/2020 | Lee et al. | |
| 2021/0066305 A1 | 3/2021 | Kim et al. | |
| 2021/0149598 A1 | 5/2021 | Choi et al. | |

FOREIGN PATENT DOCUMENTS

| | | |
|---|---|---|
| CN | 111295757 A | 6/2020 |
| KR | 10-2019-0035250 A | 4/2019 |

\* cited by examiner

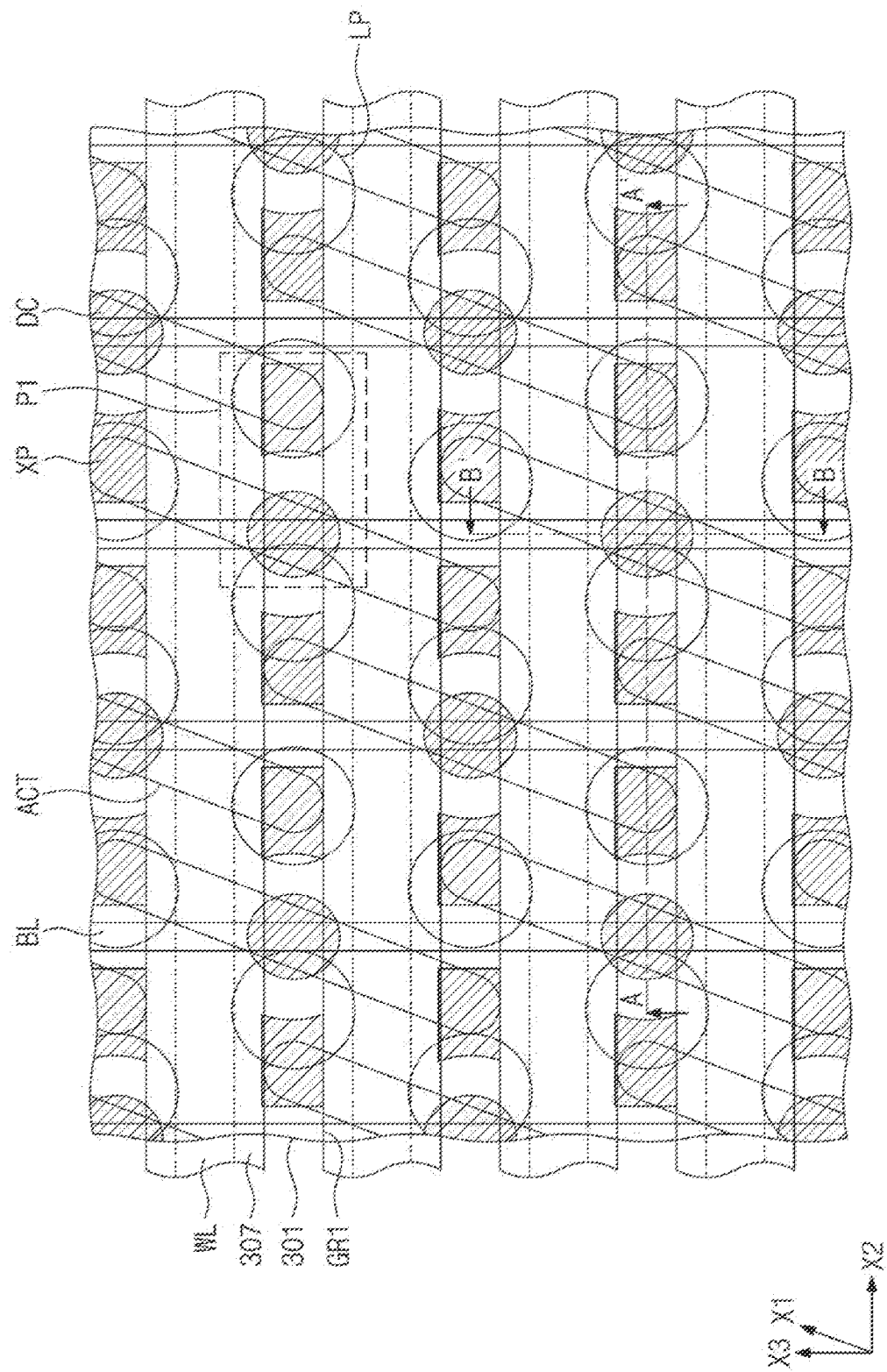

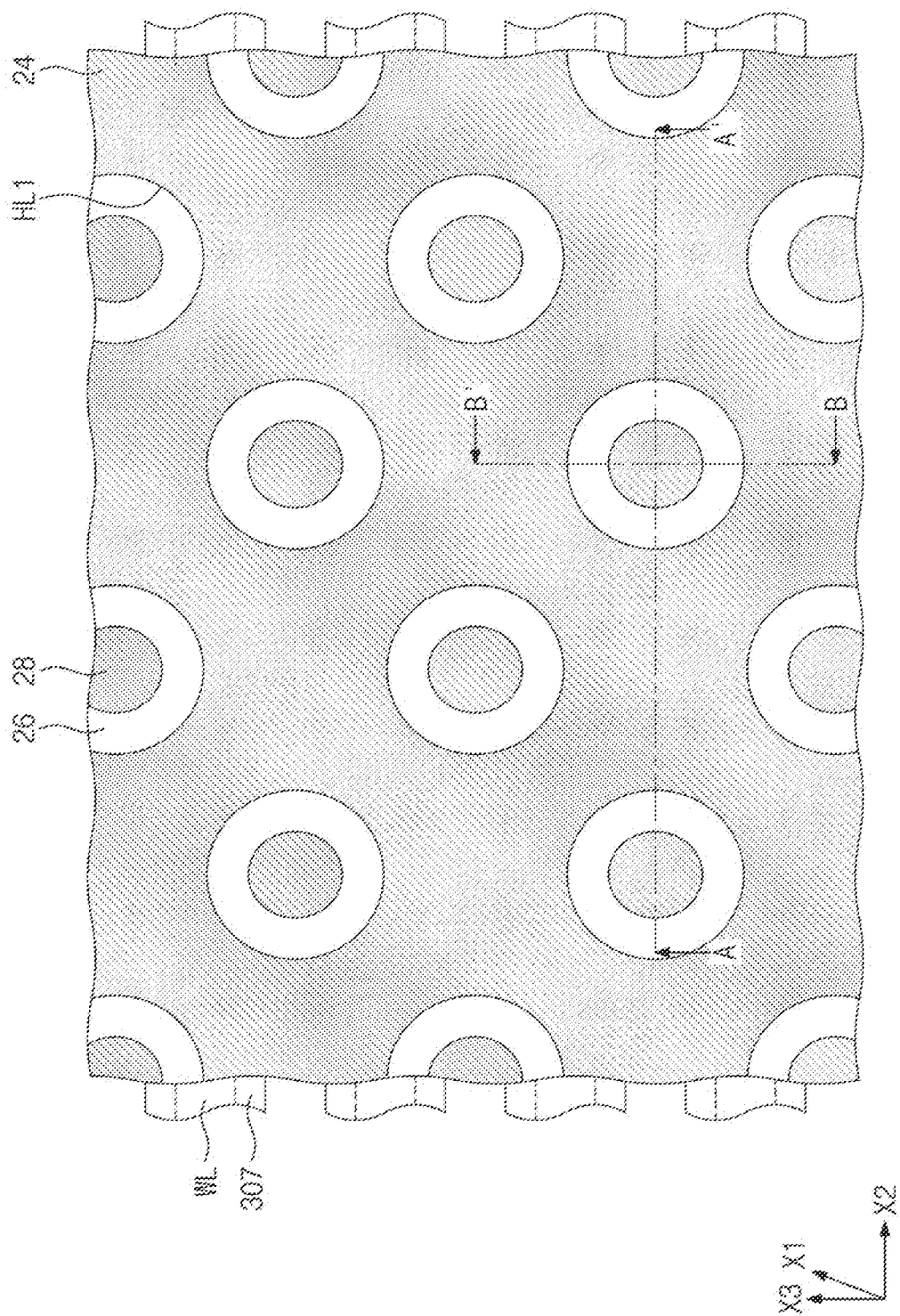

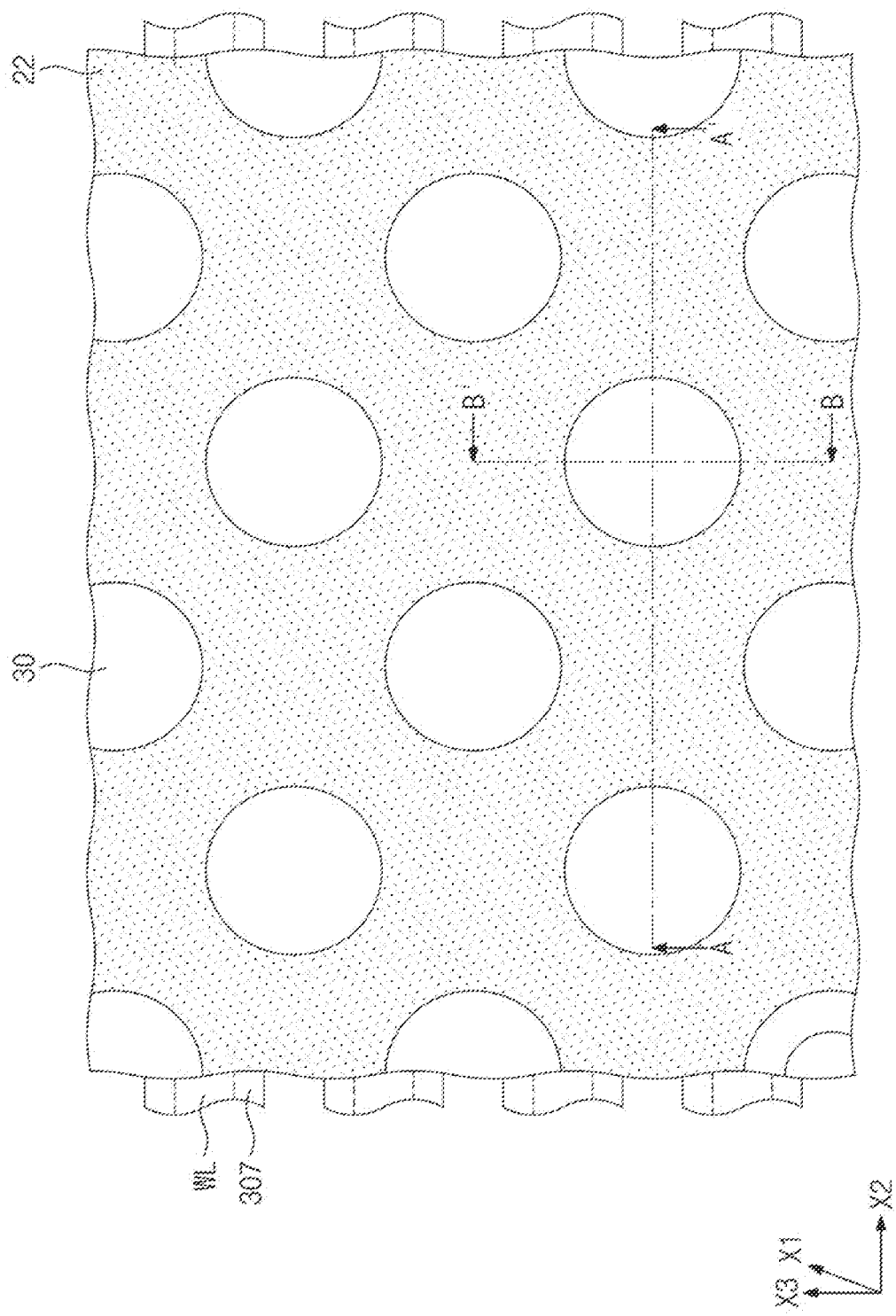

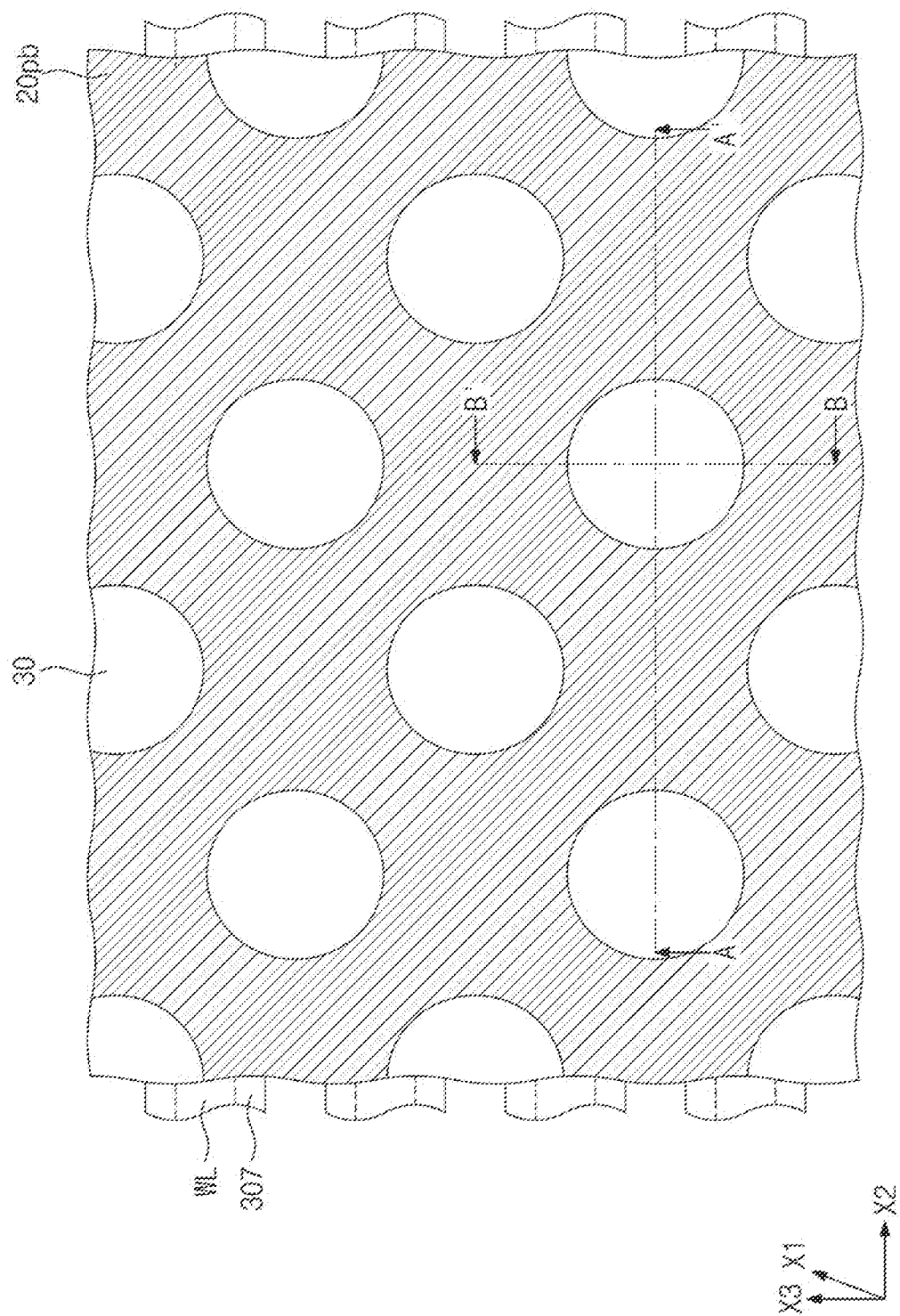

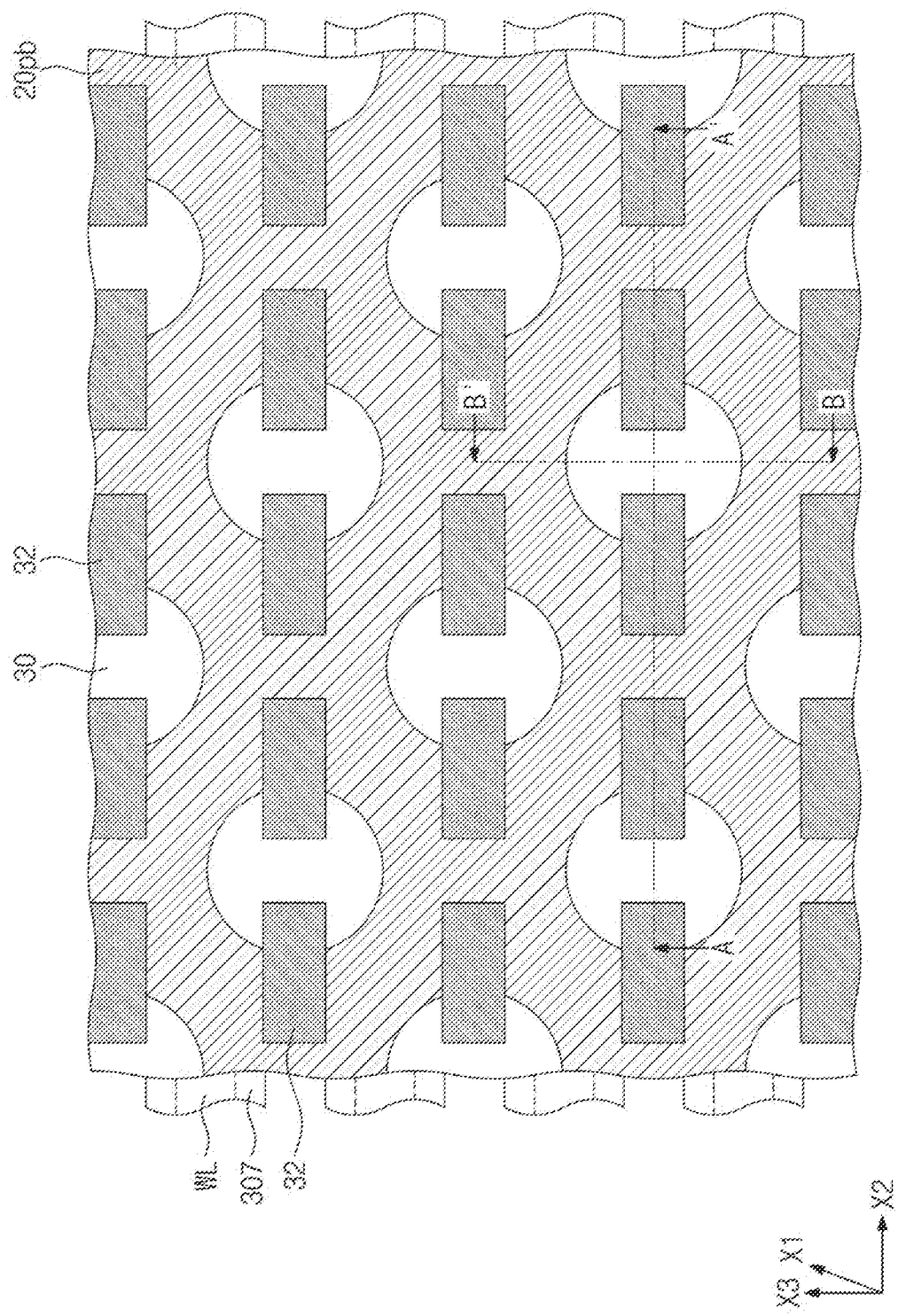

SEMICONDUCTOR MEMORY DEVICE

CROSS-REFERENCE TO RELATED APPLICATION

This U.S. nonprovisional application claims priority under 35 U.S.C § 119 to Korean Patent Application No. 10-2021-0080853, filed on Jun. 22, 2021, in the Korean Intellectual Property Office, the disclosure of which is hereby incorporated by reference in its entirety.

BACKGROUND

The present inventive concepts relate to a semiconductor memory device.

Semiconductor devices are beneficial in the electronic industry because of their small size, multi-functionality, and/or low fabrication cost. However, the semiconductor devices are being highly integrated with the remarkable development of the electronic industry. Line widths of patterns of semiconductor devices are being reduced for high integration thereof. However, new exposure techniques and/or expensive exposure techniques are required for fineness of the patterns such that it can be difficult to highly integrate semiconductor devices. Various studies have thus recently been conducted for new integration techniques.

SUMMARY

Some embodiments of the present inventive concepts provide a semiconductor memory device with increased reliability.

According to some embodiments of the present inventive concepts, a semiconductor memory device may comprise: a device isolation pattern in a substrate and defining a first active section and a second active section that are spaced apart from each other, a center of the first active section being adjacent to an end of the second active section; a bit line that crosses over the center of the first active section; a bit-line contact between the bit line and the first active section; and a first storage node pad on the end of the second active section. The first storage node pad may include a first pad sidewall and a second pad sidewall. The first pad sidewall may be adjacent to the bit-line contact. The second pad sidewall may be opposite to the first pad sidewall. When viewed in plan, the second pad sidewall may be convex in a direction away from the bit-line contact.

According to some embodiments of the present inventive concepts, a semiconductor memory device may comprise: a device isolation pattern in a substrate and defining a first active section and a second active section that are spaced apart from each other, a center of the first active section being adjacent to an end of the second active section; a first word line in the substrate and extending in a first direction, the first word line running across both of the first active section and the second active section; a second word line in the substrate and spaced apart from the first word line, the second word line extending in the first direction and running across the first active section; a word-line capping pattern on each of the first word line and the second word line; a bit line that crosses over the center of the first active section; a bit-line contact between the bit line and the first active section; and a storage node pad on the end of the second active section. When viewed in plan, the storage node pad may be between the first word line and the second word line. A first interval between the first word line and the storage node pad may be different from a second interval between the second word line and the storage node pad.

According to some embodiments of the present inventive concepts, a semiconductor memory device may comprise: a device isolation pattern in a substrate and defining a first active section and a second active section that are spaced apart from each other, a center of the first active section being adjacent to an end of the second active section; a first word line in the substrate and extending in a first direction, the first word line running across both of the first active section and the second active section; a second word line in the substrate and spaced apart from the first word line, the second word line extending in the first direction and running across the first active section; a first gate dielectric layer between the first word line and the substrate; a second gate dielectric layer between the second word line and the substrate; a bit line that crosses over the center of the first active section; a bit-line contact between the bit line and the first active section; and a storage node pad on the end of the second active section. When viewed in plan, the storage node pad may be between the first word line and the second word line. A center of a width of the storage node pad may not be on an imaginary line that is parallel to the first direction and passes through a center of an interval between the first gate dielectric layer and the second gate dielectric layer. The width of the storage node pad may be measured in a second direction orthogonal to the first direction.

BRIEF DESCRIPTION OF THE DRAWINGS

FIG. 1A illustrates a plan view showing a semiconductor memory device, according to some example embodiments of the present inventive concepts.

FIGS. 4A to 17A illustrate plan views showing an example method of fabricating the semiconductor memory device of FIG. 1A.

FIGS. 4B, 4C, 5B to 13B, 13C, and 14B to 17B illustrate cross-sectional views showing an example method of fabricating the semiconductor memory device of FIG. 1B.

DETAILED DESCRIPTION OF EMBODIMENTS

Some embodiments of the present inventive concepts will now be described in detail with reference to the accompanying drawings to aid in clearly explaining the present inventive concepts. Like numerals refer to like elements throughout.

Figure 1B:
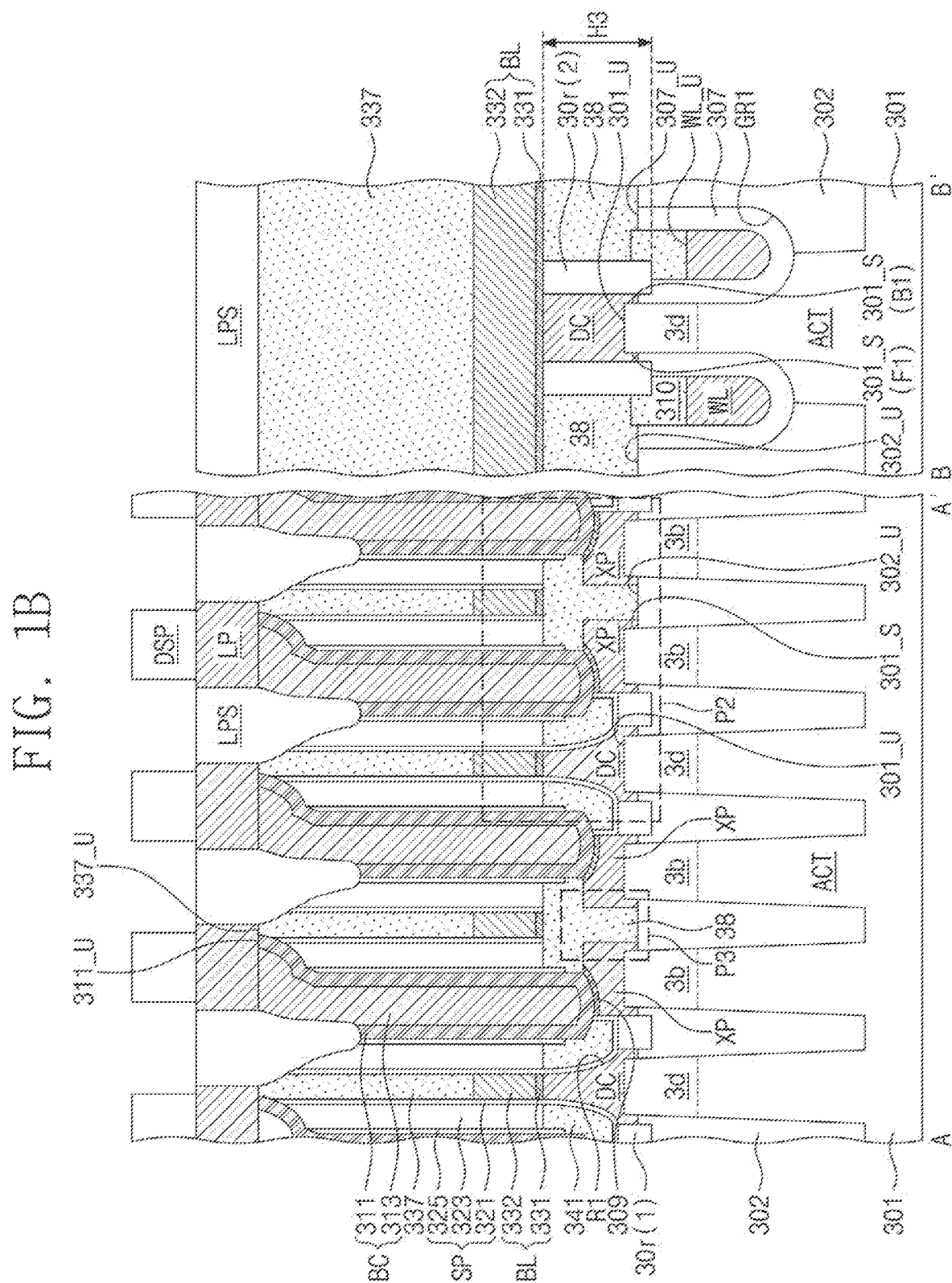
FIG. 1B illustrates a cross-sectional view taken along lines A-A' and B-B' of FIG. 1A.
Figure 2A:
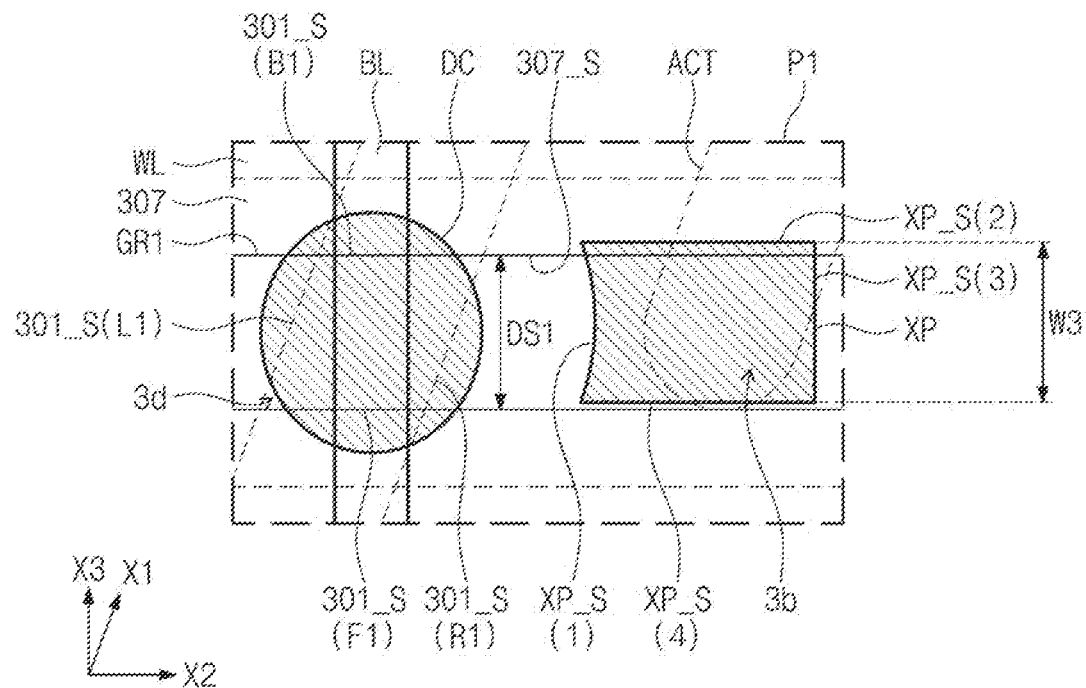
FIGS. 2A to 2C illustrate enlarged views showing section P1 of FIG. 1A.
Figure 2B:
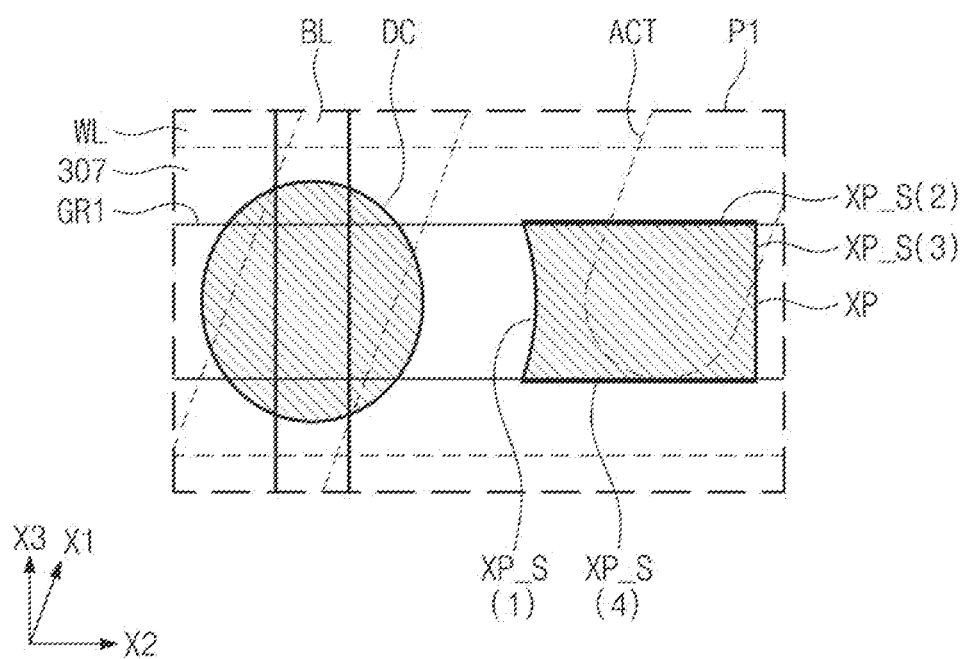
Figure 2C:
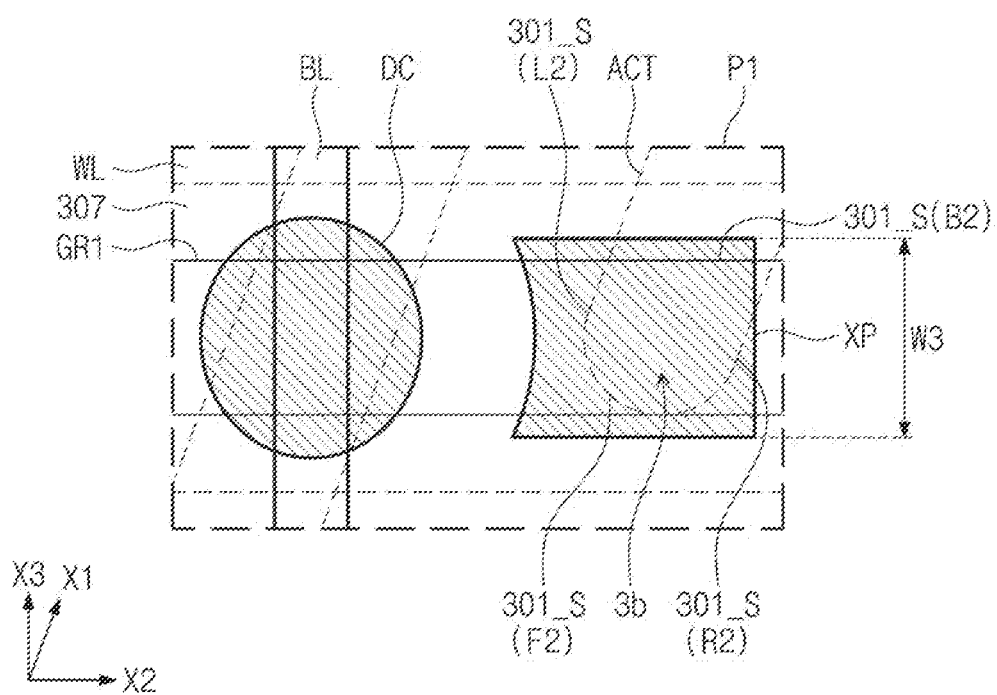
Figure 3A:
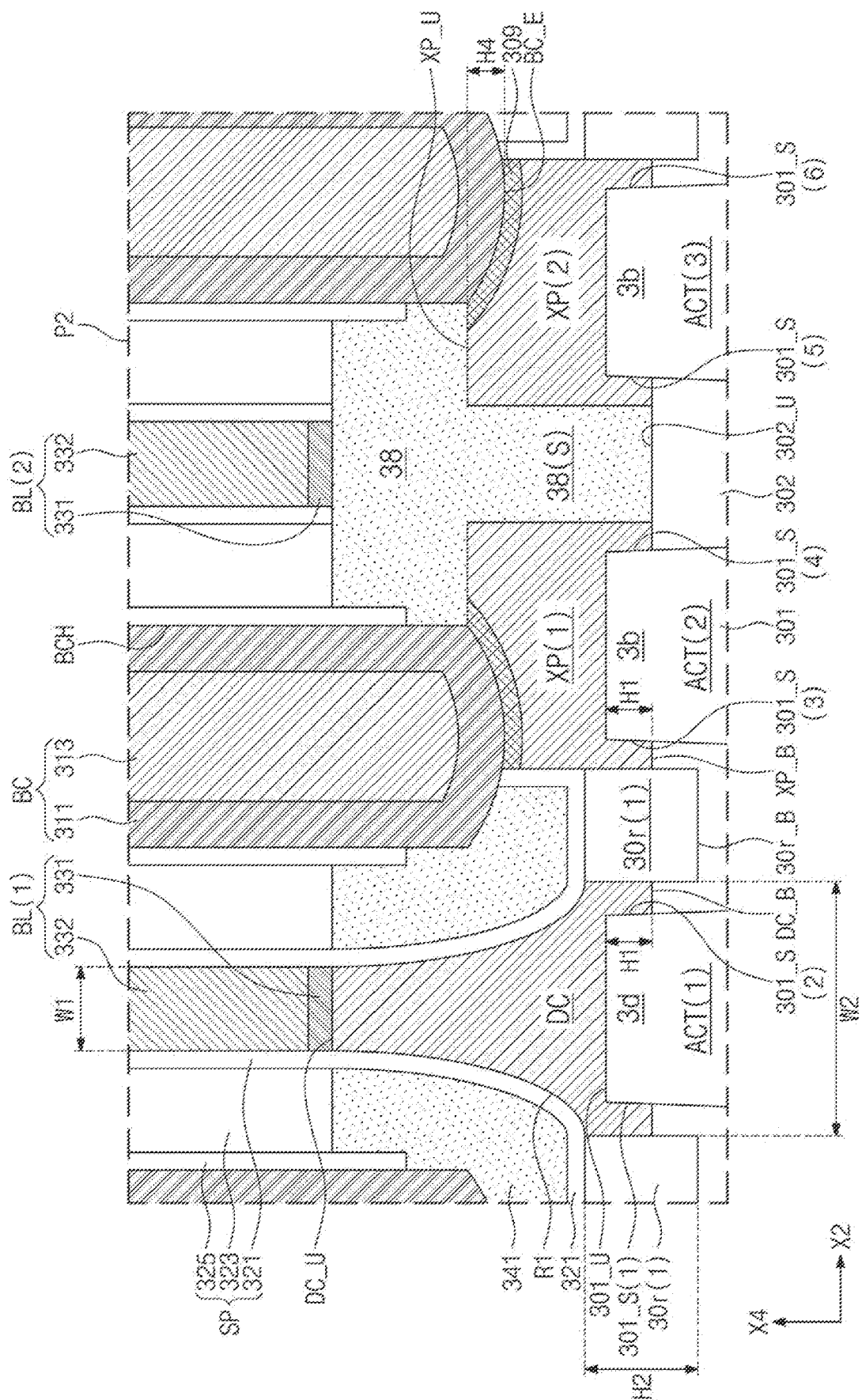
FIG. 3A illustrates an enlarged view showing section P2 of FIG. 1B.
Figure 3B:
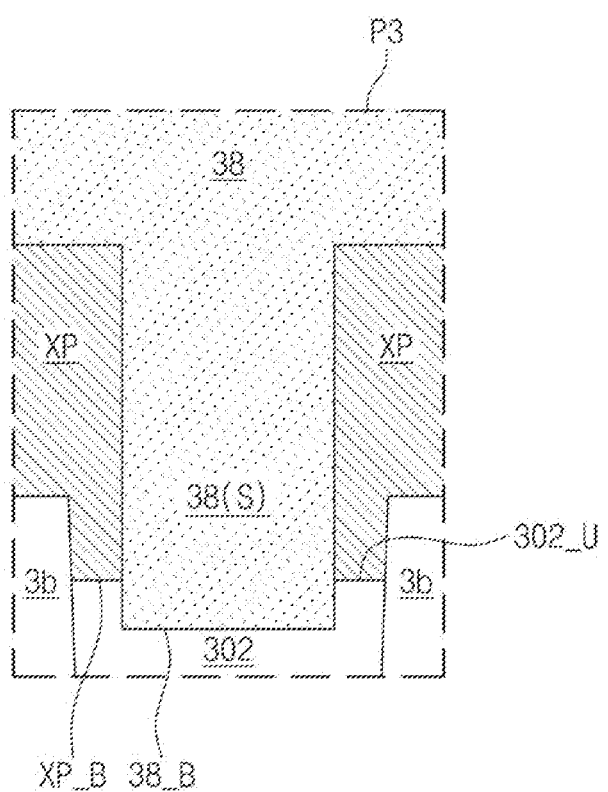
FIG. 3B illustrates an enlarged view showing section P3 of FIG. 1B.

FIG. 1A illustrates a plan view showing a semiconductor memory device, according to some example embodiments of the present inventive concepts. FIG. 1B illustrates a cross-sectional view taken along lines A-A' and B-B' of FIG. 1A. FIGS. 2A to 2C illustrate enlarged views showing section P1 of FIG. 1A. FIG. 3A illustrates an enlarged view showing section P2 of FIG. 1B. FIG. 3B illustrates an enlarged view showing section P3 of FIG. 1B.

Referring to FIGS. 1A and 1B, device isolation patterns 302 may be disposed on a substrate 301, defining active sections ACT. Each of the active sections ACT may have an isolated shape. Each of the active sections ACT may have a bar shape elongated in a first direction X1 when viewed in plan. When viewed in plan, the active sections ACT may correspond to portions of the substrate 301 that are surrounded by the device isolation patterns 302. The substrate 301 may include a semiconductor material. The active sections ACT may be arranged parallel to each other in the first direction X1, such that one of the active sections ACT may have an end adjacent in the second direction X2 to a central portion of a neighboring one of the active sections ACT. Each of the device isolation patterns 302 may have a single-layered or multi-layered structure formed of at least one selected from, for example, silicon oxide, silicon oxynitride, and silicon nitride.

The first, second, and third directions X1, X2, and X3 may be parallel to a top surface of the substrate 301. The third and second directions X3 and X2 may be perpendicular to one another, and the first direction X1 may be at an angle to the third and second directions X3 and X2. The fourth direction X4 may be perpendicular to the top surface of the substrate 301.

The device isolation patterns 302 may have their top surfaces 302_U lower than top surfaces 301_U of the active sections ACT (or of the substrate 301). Therefore, the device isolation patterns 302 may expose portions of sidewalls 301_S of the active sections ACT (or of the substrate 301). In this case, the active sections ACT may have their upper portions that protrude beyond the device isolation patterns 302.

Word lines WL may run across the active sections ACT. The word lines WL may be disposed in grooves GR1 formed in the device isolation patterns 302 and in the active sections ACT. The word lines WL may be parallel to a second direction X2 that intersects the first direction X1. For example, the word lines WL may extend lengthwise in the second direction X2. The word lines WL may be formed of a conductive material. A gate dielectric layer 307 may be disposed between each of the word lines WL and an inner surface of each groove GR1. Although not shown, the grooves GR1 may have their bottom surfaces located relatively deeper in the device isolation patterns 302 and relatively shallower in the active sections ACT. Each of the word lines WL may have a curved bottom surface. The gate dielectric layer 307 may have a curved upper surface corresponding to the curved bottom surface of the word line WL. The gate dielectric layer 307 may include at least one selected from thermal oxide, silicon nitride, silicon oxynitride, and high-k dielectric. For example, the gate dielectric layer 307 may include thermal oxide. The gate dielectric layer 307 may have a top surface 307_U lower than the top surfaces 301_U of the active sections ACT (or of the substrate 301). For example, the top surface 307_U of the gate dielectric layer 307 may be located at the same level as that of the top surfaces 302_U of the device isolation patterns 302.

A first impurity region 3d may be disposed in the active section ACT between a pair of word lines WL, and a pair of second impurity regions 3b may be correspondingly disposed in opposite edge portions of each of the active sections ACT. The first and second impurity regions 3d and 3b may be doped with, for example, N-type impurities. The first impurity region 3d may correspond to a common drain region, and the second impurity regions 3b may correspond to source regions. A transistor may be constituted by each of the word lines WL and its adjacent first and second impurity regions 3d and 3b. As the word lines WL are disposed in the grooves GR1, each of the word lines WL may have thereunder a channel region whose length becomes increased within a limited planar area. Accordingly, short-channel effects may be minimized.

The word lines WL may have their top surfaces WL_U lower than the top surfaces 301_U of the active sections ACT (or of the substrate 301). A word-line capping pattern 310 may be disposed on each of the word lines WL. The word-line capping patterns 310 may have their linear shapes that extend along longitudinal directions of the word lines WL, and may cover entire top surfaces WL_U of the word lines WL. For example, the word-line capping patterns 310 may contact the top surfaces WL_U of the word lines WL. The grooves GR1 may have inner spaces not occupied by the word lines WL, and the word-line capping patterns 310 may fill the unoccupied inner spaces of the grooves GR1. The word-line capping patterns 310 may be formed of, for example, a silicon nitride layer. The word-line capping pattern 310 may have a top surface higher than the top surface 307_U of the gate dielectric layer 307 and/or higher than the top surfaces 302_U of the device isolation patterns 302.

Bit lines BL may be disposed on the substrate 301. The bit lines BL may cross over the word-line capping patterns 310 and the word lines WL. As disclosed in FIG. 1A, the bit lines BL may be parallel to a third direction X3 that intersects the first and second directions X1 and X2. For example, the bit lines BL may extend lengthwise in the third direction X3. The bit line BL may include a bit-line diffusion barrier pattern 331 and a bit-line wire pattern 332 that are sequentially stacked. For example, the bit-line wire pattern 332 may be stacked on the bit-line diffusion barrier pattern 331, contacting the bit-line diffusion barrier pattern 331. The bit-line diffusion barrier pattern 331 may include at least one selected from titanium, titanium nitride (TiN), titanium silicon nitride (TiSiN), tantalum, tantalum nitride, and tungsten nitride. The bit-line wire pattern 332 may include metal, such as tungsten, aluminum, or copper. Although not shown, the bit line BL may further include an impurity-doped polysilicon pattern below the bit-line diffusion barrier pattern 331. A bit-line capping pattern 337 may be disposed on each of the bit lines BL. The bit-line capping patterns 337 may be formed of a dielectric material, such as a silicon nitride layer.

A bit-line contact DC may be disposed between the bit line BL and the active section ACT disposed with the first impurity region 3d. The bit-line contact DC may include, for example, impurity-doped polysilicon. The bit-line contact DC may have a circular or oval shape when viewed in plan as shown in FIGS. 2A to 2C. The bit-line contact DC may have a planar area greater than that of a location where the bit line BL and the first impurity region 3d overlap each other. The planar area of the bit-line contact DC may be greater than that of the first impurity region 3d.

As shown in FIG. 2A, the active section ACT disposed with the first impurity region 3d may have four substrate sidewalls 301_S, for example, a first substrate left sidewall 301_S(L1), a first substrate rear sidewall 301_S(B1), a first substrate right sidewall 301_S(R1), and a first substrate front sidewall 301_S(F1), which four substrate sidewalls 301_S are arranged in a clockwise direction, and upper portions of the four substrate sidewalls 301_S may be exposed without being covered with the device isolation pattern 302 or the gate dielectric layer 307. The bit-line contact DC may cover the exposed first substrate left, rear, right, and front sidewalls 301_S(L1), 301_S(B1), 301_S(R1), and 301_S(F1). For example, the bit-line contact DC may contact the exposed first substrate left, rear, right, and front sidewalls 301_S(L1), 301_S(B1), 301_S(R1), and 301_S(F1).

Referring to FIGS. 1B and 3A, the bit-line contact DC may have a first width W1 at a top surface DC_U thereof. A lower portion of the bit-line contact DC may have a second width W2 greater than the first width W1. The bit-line contact DC may have a width that gradually increases in a direction from an upper portion thereof toward a lower portion thereof. The bit-line contact DC may have a bottom end DC_B located at a level which is a first height H1 downwardly away from the top surface 301_U of the substrate 301.

In the present inventive concepts, there may occur an increase in contact area between the bit-line contact DC and the active section ACT disposed with the first impurity region 3d, and accordingly a contact resistance may be reduced between the bit-line contact DC and the active section ACT (or the first impurity region 3d), with the result that a semiconductor memory device may operate at high speeds and low powers.

A storage node pad XP may be disposed on the active section ACT disposed with the second impurity region 3b. The storage node pad XP may include, for example, impurity-doped polysilicon. When viewed in plan as shown in FIGS. 2A to 2C, the storage node pad XP may have a shape similar to a rectangular shape. The storage node pad XP may have a first pad sidewall XP_S(1), a second pad sidewall XP_S(2), a third pad sidewall XP_S(3), and a fourth pad sidewall XP_S(4) that are arranged in a clockwise direction. The first pad sidewall XP_S(1) of the storage node pad XP may be recessed in a direction (e.g., the second direction X2) away from the bit-line contact DC adjacent to the first pad sidewall XP_S(1). When viewed in plan, the second pad sidewall XP_S(2) and the fourth pad sidewall XP_S(4) may not align (or overlap) with an inner sidewall of the groove GR1 or an outer sidewall 307_S of the gate dielectric layer 307 as shown in FIGS. 2A and 2C, or may align (or overlap) with the inner sidewall of the groove GR1 or the outer sidewall 307_S of the gate dielectric layer 307 as shown in FIG. 2B.

The storage node pad XP may have a third width W3 in the third direction X3. The third width W3 may be the same as or greater than an interval DS1 between neighboring grooves GR1. The storage node pad XP may have a planar area greater than that of a single second impurity region 3b. The storage node pad XP may cover at least two sidewalls (see, e.g., 301_S(3) and 301_S(4) of FIG. 3A) of the active section ACT disposed with the second impurity region 3b, which sidewalls are opposite to each other in the second direction X2. For example, the storage node pad XP may contact at least two sidewalls of the active section ACT disposed with the second impurity region 3b Referring to FIG. 2C, the active section ACT disposed with the second impurity region 3b may have a second substrate left sidewall 301_S(L2), a second substrate rear sidewall 301_S(B2), a second substrate right sidewall 301_S (R2), and a second substrate front sidewall 301_S(F2) that are arranged in a clockwise direction, and upper portions of the second substrate left, rear, right, and front sidewalls 301_S(L2), 301_S(B2), 301_S(R2), and 301_S(F2) may be exposed without being covered with the device isolation pattern 302 or the gate dielectric layer 307. The second substrate front sidewall 301_S(F2) may be rounded. As shown in FIG. 2C, the storage node pad XP may cover all of the second substrate left, rear, right, and front sidewalls 301_S(L2), 301_S(B2), 301_S(R2), and 301_S(F2). For example, the storage node pad XP may contact all of the second substrate left, rear, right, and front sidewalls 301_S (L2), 301_S(B2), 301_S(R2), and 301_S(F2). In the present inventive concepts, there may occur an increase in contact area between the storage node pad XP and the active section ACT disposed with the second impurity region 3b, and accordingly a contact resistance may be reduced between the storage node pad XP and the active section ACT (or the second impurity region 3b), with the result that a semiconductor memory device may operate at high speeds and low powers.

The storage node pad XP may have a bottom end XP_B located at a level which is the first height H1 downwardly away from the top surface 301_U of the substrate 301. The bottom end XP_B of the storage node pad XP and the bottom end DC_B of the bit-line contact DC may be located at the same level, e.g., a position which is the first height H1 downwardly away from the top surface 301_U of the substrate 301. The storage node pad XP may have a top surface XP_U lower than the top surface DC_U of the bit-line contact DC. A contact dielectric pattern 30r may be interposed between the bit-line contact DC and its adjacent storage node pad XP. The contact dielectric pattern 30r may include a dielectric material, for example, silicon oxide.

Figure 12A:
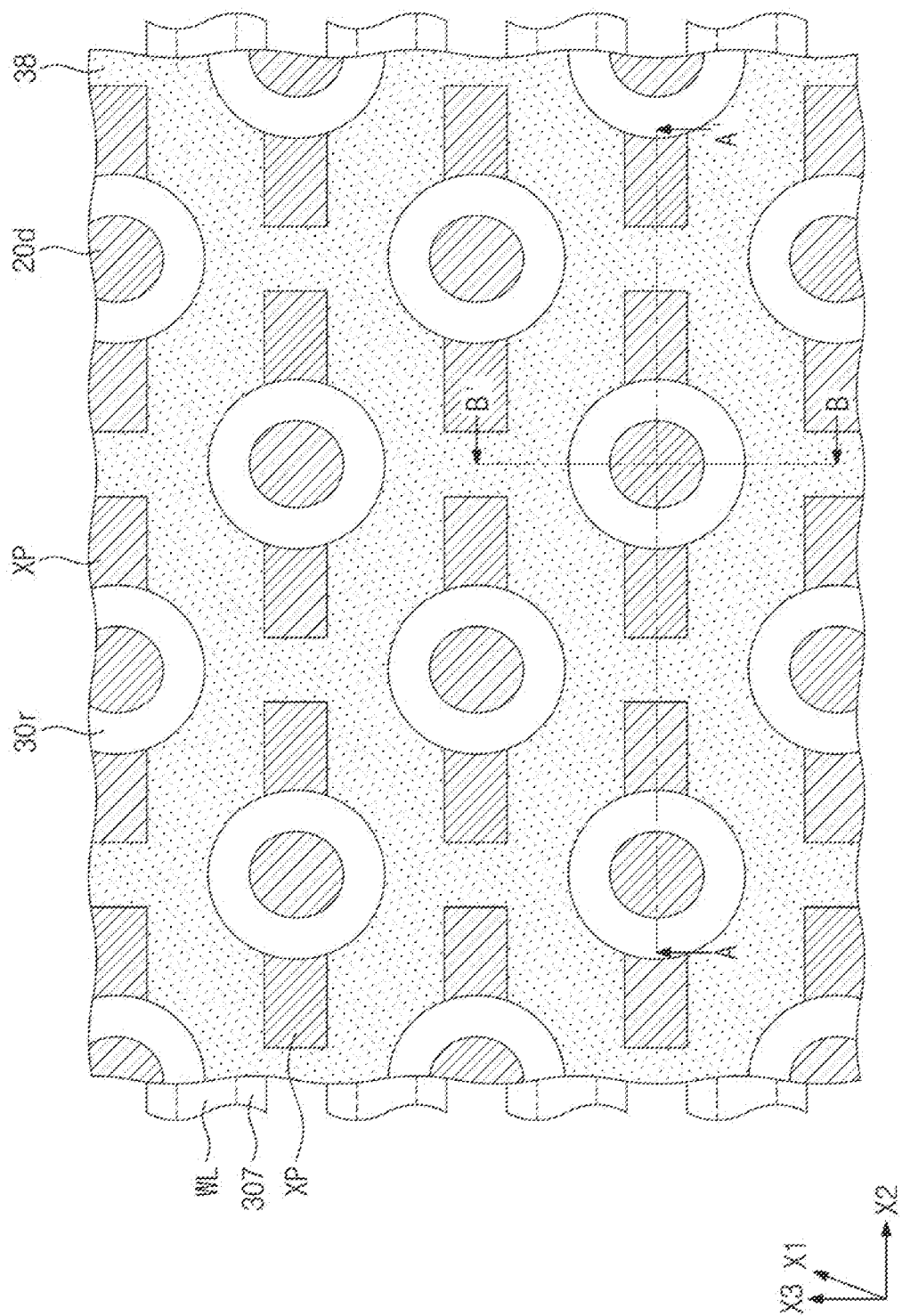
Figure 12B:
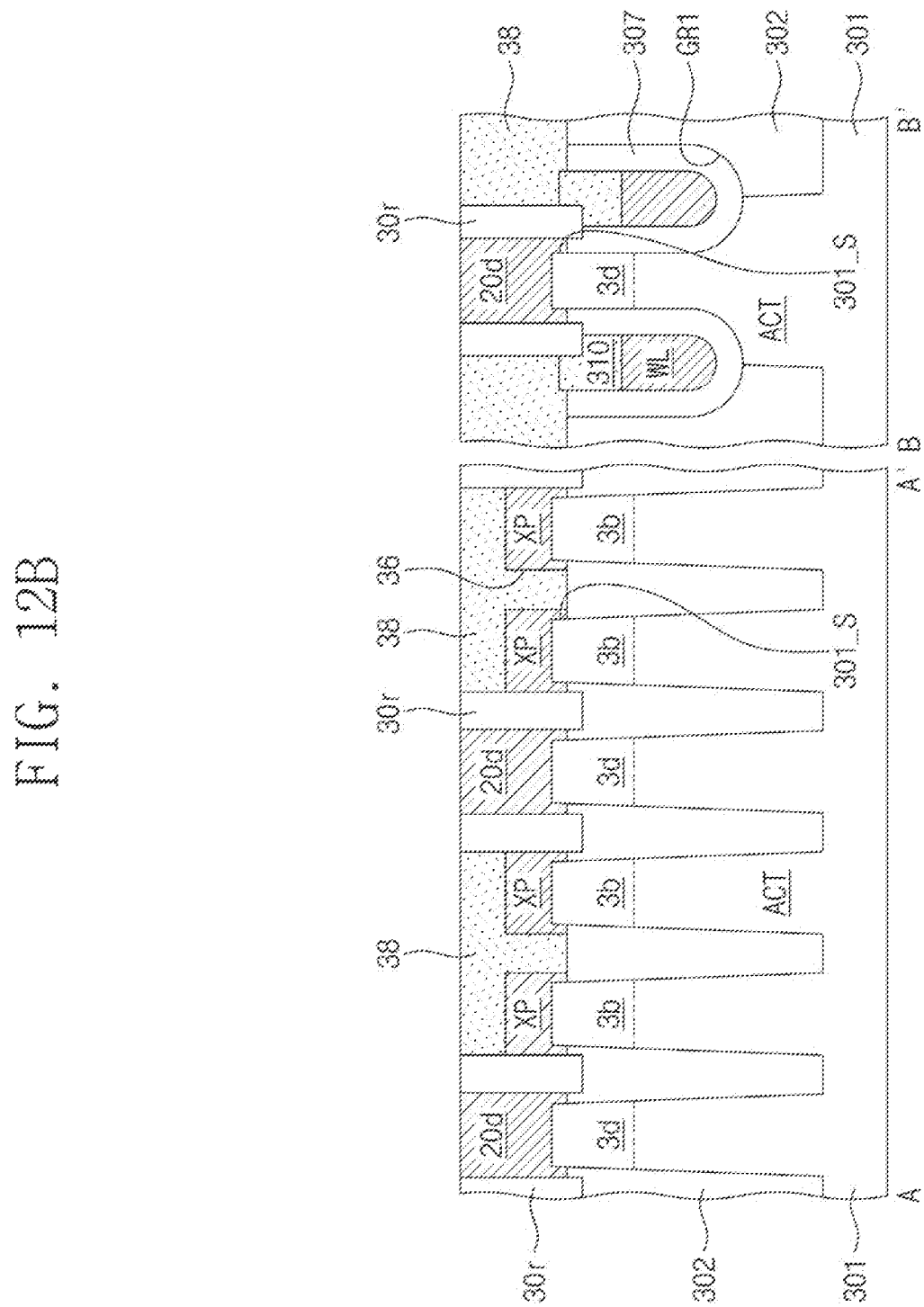

When viewed in plan, the contact dielectric pattern 30r may have a donut or annular shape as shown in FIG. 12A and may surround the bit-line contact DC. A portion of the contact dielectric pattern 30r may extend downwardly from the bit line BL as shown in the cross-sectional view of B-B' in FIG. 1B. The contact dielectric pattern 30r may have a first dielectric part 30r(1) between the bit-line contact DC and its adjacent storage node pad XP, and may also include a second dielectric part 30r(2) below the bit line BL. The first dielectric part 30r(1) may have a second height H2. For example, the distance in the fourth direction X4 between a top surface and a bottom surface 30r_B of the first dielectric part 30r(1) may be the second height H2. The second dielectric part 30r(2) may have a third height H3 greater than that second height H2. For example, the distance in the fourth direction X4 between a top surface and the bottom surface 30r_B of the second dielectric part 30r(2) may be the third height H3. The contact dielectric pattern 30r may be in contact with a bottom surface of the bit line BL.

The contact dielectric pattern 30r may have the bottom surface 30r_B located at a level the same as or lower than that of the top surface 302_U of the device isolation pattern 302. The bottom surface 30r_B of the contact dielectric pattern 30r may be located at a level the same as or lower than that of the top surface 307_U of the gate dielectric layer 307. The bottom surface 30r_B of the contact dielectric pattern 30r may be located at a level the same as or lower than that of the top surface of the word-line capping pattern 310.

The bit line BL and the bit-line capping pattern 337 may have their sidewalls covered with a bit-line spacer SP. The bit-line spacer SP may include a spacer liner 321, a first spacer 323, and a second spacer 325 that are sequentially arranged along a direction away from the sidewalls of the bit line BL and the bit-line capping pattern 337. For example, the spacer liner 321 may contact a side surface of the bit line BL, the first spacer 323 may contact a side surface of the spacer liner 321, and the second spacer 325 may contact a side surface of the first spacer 323. The first spacer 323 may be between the spacer liner 321 and the second spacer 325. The spacer liner 321 and the first spacer 323 may include the same material, for example, silicon oxide. Alternatively, the spacer liner 321 may include a material having an etch selectivity with respect to the first spacer 323, and in this case, the spacer liner 321 may include silicon nitride and the first spacer 323 may include silicon oxide. The second spacer 325 may include a dielectric material, such as silicon nitride, having an etch selectivity with respect to the first spacer 323.

For example, the spacer liner 321 may include silicon oxide. Because silicon oxide has a dielectric constant less than that of silicon nitride, insulating properties of the bit-line spacer SP may increase as a ratio of silicon nitride becomes smaller in the bit-line spacer SP and as a ratio of silicon oxide becomes larger in the bit-line spacer SP. In some embodiments of the present inventive concepts, because the spacer liner 321 includes silicon oxide, insulating properties of the bit-line spacer SP may increase to reduce interference between the bit line BL and a storage node contact BC which will be discussed below. As a result, a semiconductor memory device may increase in reliability.

A recess region R1 may be defined by a sidewall of the bit-line contact DC, a top surface of the contact dielectric pattern 30r, and a sidewall of the storage node pad XP. The spacer liner 321 may extend to conformally cover inner sidewalls and a bottom surface of the recess region R1, or the sidewall of the bit-line contact DC, the top surface of the contact dielectric pattern 30r, and the sidewall of the storage node pad XP. The spacer liner 321 may be provided thereon with a buried dielectric pattern 341 that fills the recess region R1. The second spacer 325 may have a bottom end lower than that of the first spacer 323. For example, a lower surface of the first spacer 323 may contact an upper surface of the buried dielectric pattern 341, and the upper surface of the buried dielectric pattern 341 may be at a higher vertical level than a lower surface of the second spacer 325.

Referring to FIG. 3A, a first active section ACT(1), a second active section ACT(2), and a third active section ACT(3) may be linearly arranged along the second direction X2. The first active section ACT(1) may have a first substrate sidewall 301_S(1) and a second substrate sidewall 301_S(2) that are opposite to each other and exposed without being covered with the device isolation pattern 302. The first impurity region 3d may be formed in the first active section ACT(1). The bit-line contact DC may cover the first substrate sidewall 301_S(1), the second substrate sidewall 301_S(2), and a top surface of the first active section ACT(1). For example, the bit-line contact DC may contact the first substrate sidewall 301_S(1), the second substrate sidewall 301_S(2), and a top surface of the first active section ACT(1). The second active section ACT(2) may have a third substrate sidewall 301_S(3) and a fourth substrate sidewall 301_S(4) that are opposite to each other and exposed without being covered with the device isolation pattern 302. A first storage node pad XP(1) may cover the third substrate sidewall 301_S(3), the fourth substrate sidewall 301_S(4), and a top surface of the second active section ACT(2). For example, the first storage node pad XP(1) may contact the third substrate sidewall 301_S(3), the fourth substrate sidewall 301_S(4), and the top surface of the second active section ACT(2). The third active section ACT(3) may have a fifth substrate sidewall 301_S(5) and a sixth substrate sidewall 301_S(6) that are opposite to each other and exposed without being covered with the device isolation pattern 302. A second storage node pad XP(2) may cover the fifth substrate sidewall 301_S(5), the sixth substrate sidewall 301_S(6), and a top surface of the third active section ACT(3). For example, the second storage node pad XP(2) may contact the fifth substrate sidewall 301_S(5), the sixth substrate sidewall 301_S(6), and the top surface of the third active section ACT(3).

A pad separation pattern 38 may be interposed between neighboring storage node pads XP, for example, between the first storage node pad XP(1) and the second storage node pad XP(2) that are shown in FIG. 3A. The pad separation pattern 38 may extend to cover a top surface of the first storage node pad XP(1) and a top surface XP_U of the second storage node pad XP(2). For example, the pad separation pattern 38 may contact the top surface of the first storage node pad XP(1) and the top surface XP_U of the second storage node pad XP(2). The pad separation pattern 38 may have a separation part 38(S) positioned between the first storage node pad XP(1) and the second storage node pad XP(2). The separation part 38(S) of the pad separation pattern 38 may contact side surfaces of the first storage node pad XP(1) and the second storage node pad XP(2). The pad separation pattern 38 may include a dielectric material, for example, silicon nitride. As shown in FIG. 3B, the pad separation pattern 38 may have a bottom surface 38_B located at a level the same as or lower than that of the top surface 302_U of the device isolation pattern 302. For example, a portion of the pad separation pattern 38 may protrude into the device isolation pattern 302. The bottom surface 38_B of the pad separation pattern 38 may be located at a level the same as or lower than that of the bottom end XP_B of the storage node pad XP, as shown in FIG. 3A or 3B.

As illustrated in the cross-sectional view of B-B' in FIG. 1B, the pad separation pattern 38 may also be disposed below the bit line BL and may be in contact with a sidewall of the second dielectric part 30r(2) included in the contact dielectric pattern 30r, the top surface of the word-line capping pattern 310, the top surface 307_U of the gate dielectric layer 307, and the top surface 302_U of the device isolation pattern 302. The pad separation pattern 38 may be in contact with the bottom surface of the bit line BL.

As shown in FIG. 3A, a first bit line BL(1) may be positioned on the bit-line contact DC that covers the first impurity region 3d of the first active section ACT(1). A second bit line BL(2) adjacent to the first bit line BL(1) may be positioned on the pad separation pattern 38 and may vertically overlap the separation part 38(S).

Figure 17A:
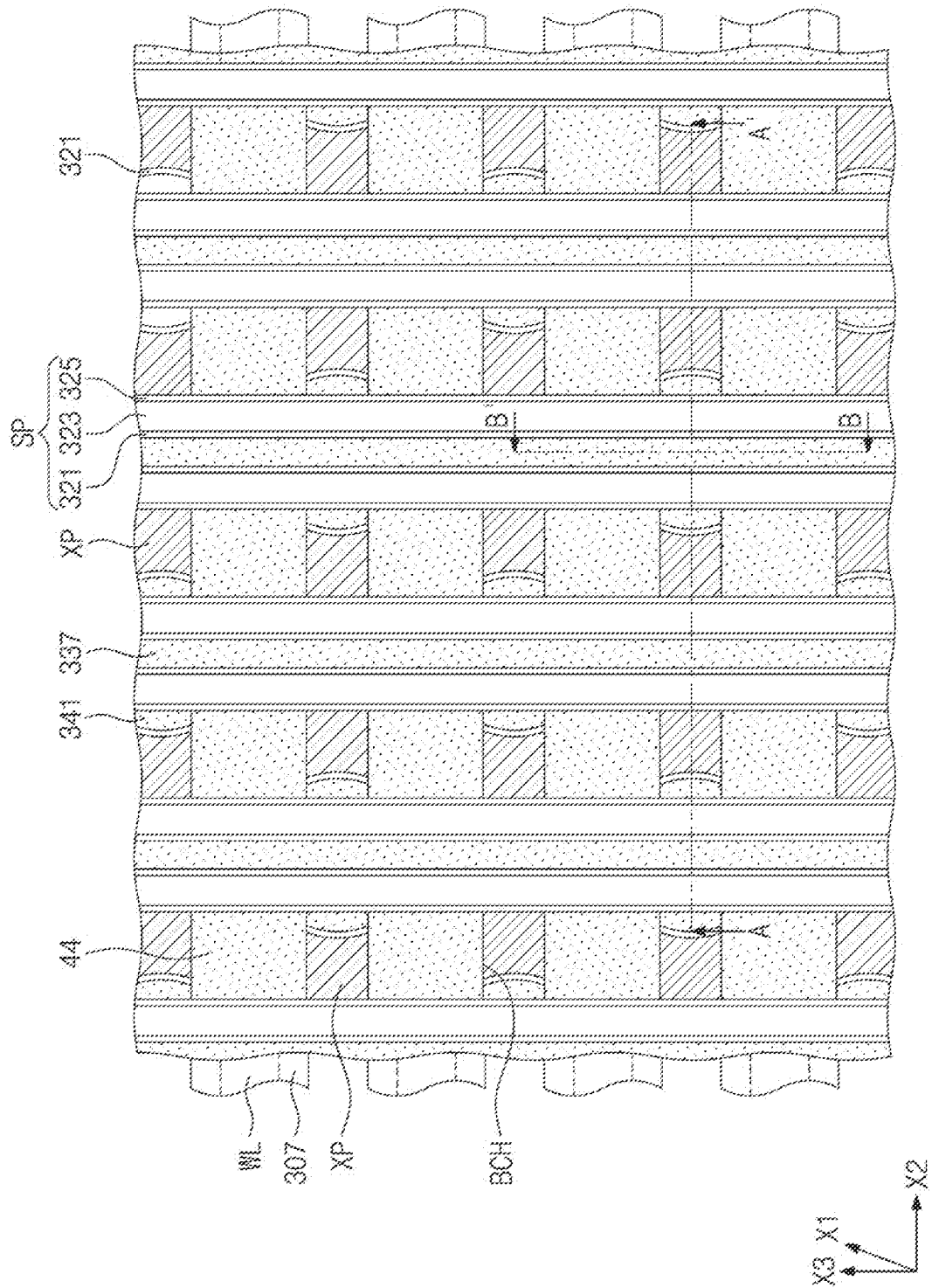
Figure 17B:
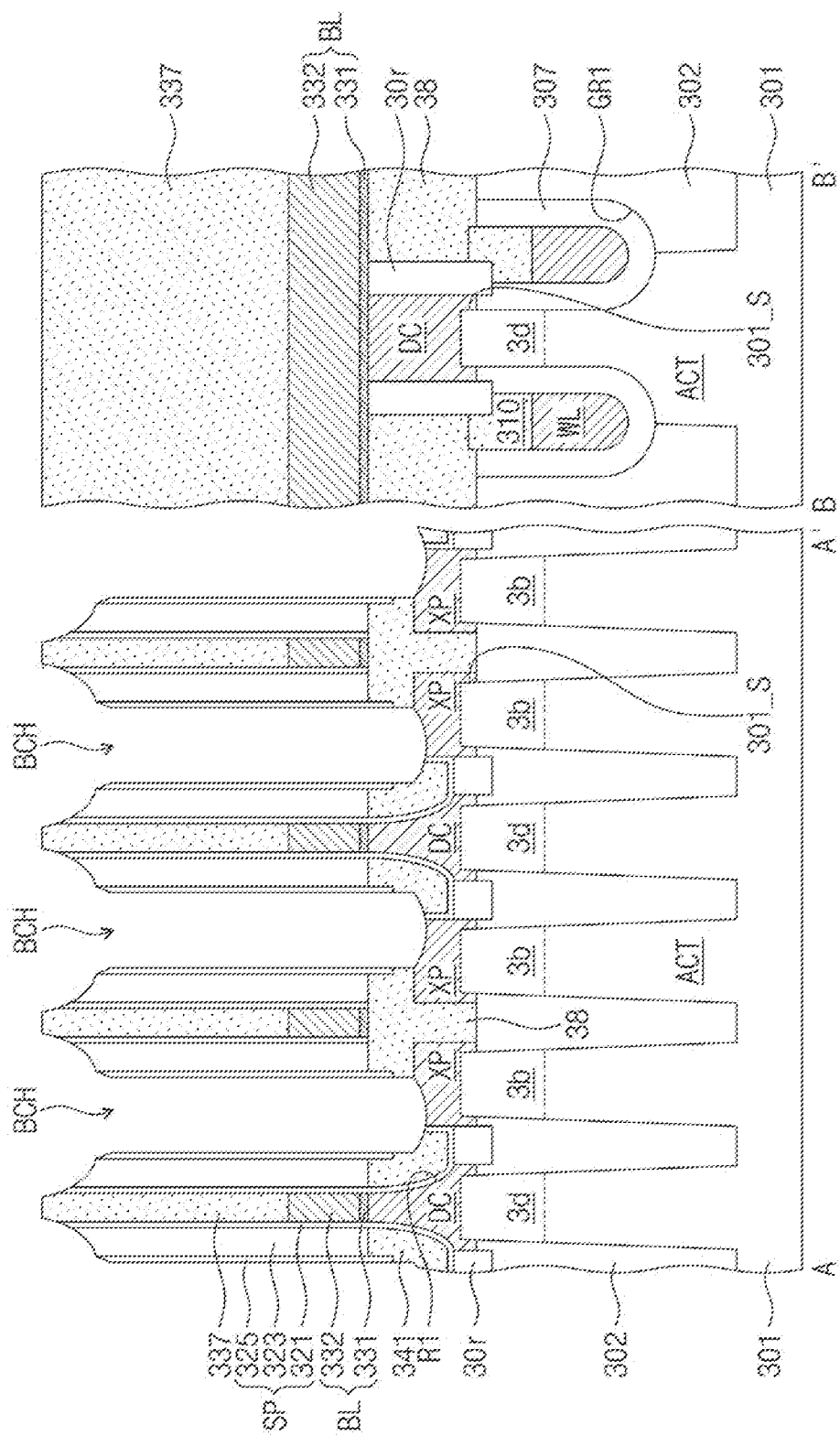

A storage node contact BC may be interposed between neighboring bit lines BL, for example, between the first bit line BL(1) and the second bit line BL(2) that are shown in FIG. 3A. The storage node contact BC may be disposed in a storage node contact hole BCH between neighboring bit lines BL. Although not shown in FIGS. 1A and 1B, a plurality of node separation patterns 44 may be disposed between neighboring bit-line spacers SP as illustrated in FIGS. 17A and 17B. The node separation patterns 44 may be linearly arranged and spaced apart from each other between the bit-line spacers SP. The node separation patterns 44 may overlap the word lines WL. The storage node contact holes BCH may be defined between the bit-line spacers SP and between the node separation patterns 44. The node separation patterns 44 may include a dielectric material, for example, silicon oxide.

The storage node contact BC may include a contact metal pattern 313 and a contact diffusion barrier pattern 311 that surrounds a sidewall and a bottom surface of the contact metal pattern 313. The contact diffusion barrier pattern 311 may contact the sidewall and the bottom surface of the contact metal pattern 313. The contact diffusion barrier pattern 311 may have a uniform thickness regardless of position or may conformally cover a sidewall and a bottom surface of the storage node contact hole BCH. Both of the contact metal pattern 313 and the contact diffusion barrier pattern 311 may include metal. The contact diffusion barrier pattern 311 may include, for example, at least one selected from titanium, titanium nitride (TiN), titanium silicon nitride (TiSiN), tantalum, tantalum nitride, and tungsten nitride. The contact metal pattern 313 may include, for example, tungsten, aluminum, or copper.

In the present inventive concepts, the storage node pad XP may be in contact with the sidewalls 301_S of the substrate 301, and as a result a contact resistance may be remarkably reduced between the storage node contact BC and the second impurity region 3b. Therefore, the storage node contact BC may exclude polysilicon. Alternatively, the storage node contact BC may additionally include a polysilicon pattern below the contact diffusion barrier pattern 311, but in this case the polysilicon pattern may have a relatively small size. An increase in amount of polysilicon in the storage node contact BC may increase a possibility of the occurrence of voids in the storage node contact BC, and therefore a high-temperature annealing process may be required to remove the voids. The annealing process may increase the occurrence of process defects on parts other than the storage node contact BC.

In contrast, according to some embodiments of the present inventive concepts, because the storage node contact BC excludes polysilicon and includes metal, processes (e.g., metal deposition) other than the annealing process may be performed at low temperatures. Therefore, process defects may be reduced or prevented. In addition, such low-temperature processes may use silicon oxide to form the spacer liner 321, and thus the bit-line spacer SP may increase in insulating properties.

The storage node contact BC may have a bottom end BC_E lower than the top surface XP_U of the storage node pad XP. The bottom end BC_E of the storage node contact BC may be located at a level which is a fourth height H4 downwardly away from the top surface XP_U of the storage node pad XP. The bottom end BC_E of the storage node contact BC may be lower than the bottom end of the second spacer 325. A contact ohmic layer 309 may be interposed between the storage node contact BC and the storage node pad XP. The contact ohmic layer 309 may include metal silicide, such as cobalt silicide.

Referring to FIG. 1B, the contact diffusion barrier pattern 311 may have a top surface 311_U located at the same level as that of a top surface 337_U of the bit-line capping pattern 337. In addition, the contact metal pattern 313 may have a top surface that is positioned at the same level as that of the top surface 311_U of the contact diffusion barrier pattern 311 and is coplanar with the top surface 311_U of the contact diffusion barrier pattern 311. Landing pads LP may be positioned on corresponding storage node contacts BC. When viewed in plan as shown in FIG. 1A, the landing pads LP may each have an isolated island shape. Six landing pads LP that surrounds one landing pad LP may constitute a regular hexagonal shape. The landing pads LP may be arranged to form a honeycomb shape.

The landing pad LP may be in contact simultaneously with the top surface 311_U of the contact diffusion barrier pattern 311, the top surface 337_U of the bit-line capping pattern 337, and the top surface of the contact metal pattern 313. The landing pad LP may include the same material as that of the contact metal pattern 313. Landing pad separation patterns LPS may be disposed between the landing pads LP. A portion of the landing pad separation pattern LPS may be interposed between the storage node contact BC and its adjacent bit-line spacer SP. Therefore, the landing pad separation patterns LPS may have their bottom ends lower than a top end of the bit-line spacer SP. For example, lower portions of the landing pad separation pattern LPS may at a lower vertical level than the top surface 311_U of the contact diffusion barrier pattern 311, the top surface 337_U of the bit-line capping pattern 337, and the top surface of the contact metal pattern 313.

Data storage patterns DSP may be disposed on corresponding landing pads LP. The data storage patterns DSP may each be a capacitor including a bottom electrode, a dielectric layer, and a top electrode. In this case, a semiconductor memory device may be a dynamic random access memory (DRAM). Alternatively, the data storage patterns DSP may each include a magnetic tunnel junction pattern. In this case, the semiconductor memory device may be a magnetic random access memory (MRAM). Dissimilarly, the data storage patterns DSP may each include a phase change material or a variable resistance material. In this case, a semiconductor memory device may be a phase change random access memory (PRAM) or a resistive random access memory (ReRAM).

In the present inventive concepts, structures of the bit-line contact DC and the storage node pad XP may induce a reduction in contact resistance, and thus a semiconductor memory device may operate at high speeds and low powers.

FIGS. 4A to 17A illustrate plan views showing an example method of fabricating the semiconductor memory device of FIG. 1A. FIGS. 4B, 4C, 5B to 13B, 13C, and 14B to 17B illustrate cross-sectional views showing a method of fabricating the semiconductor memory device of FIG. 1B.

Figure 4A:
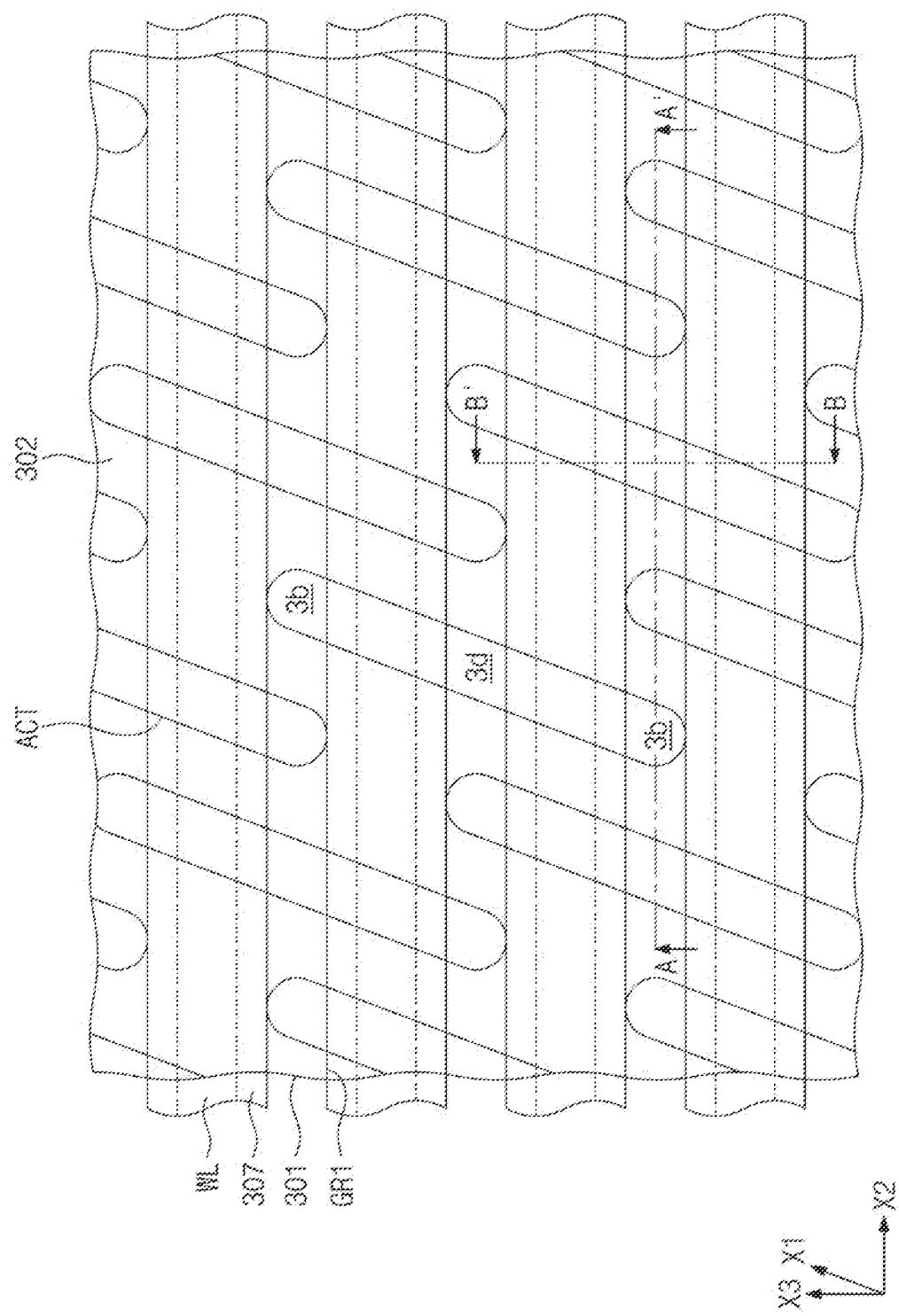
Figure 4B:
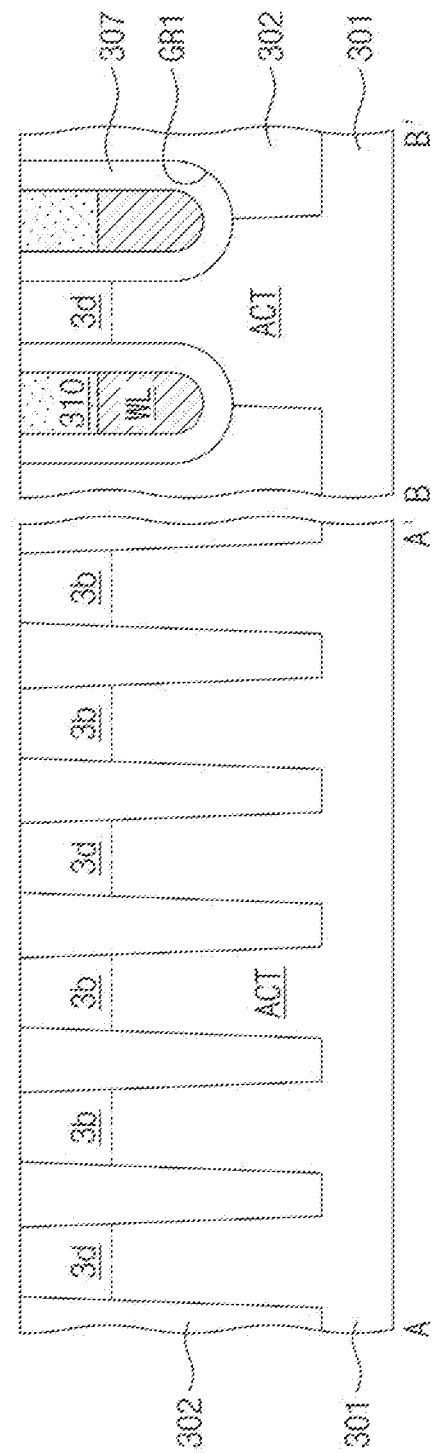

Referring to FIGS. 4A and 4B, device isolation patterns 302 may be formed in a substrate 301, defining active sections ACT. A device isolation trench may be formed in the substrate 301, and the device isolation patterns 302 may fill the device isolation trench. The active sections ACT and the device isolation patterns 302 may be patterned to form grooves GR1. In this step, an etching condition of the substrate 301 and the device isolation patterns 302 may be properly controlled such that the device isolation patterns 302 may be more easily etched than the substrate 301. Therefore, the grooves GR1 may have curved bottom surfaces. A gate dielectric layer 307 may be conformally formed in the grooves GR1. The gate dielectric layer 307 may be formed by one or more of thermal oxidation, chemical vapor deposition, and atomic layer deposition. A gate conductive layer may be stacked to fill the grooves GR1 and may then be etched back to form word lines WL. A pair of word lines WL may run across each of the active sections ACT. A dielectric layer such as a silicon nitride layer may be stacked on the substrate 301 so as to fill the grooves GR1, and then the dielectric layer may be etched to form a word-line capping pattern 310 on each of the word lines WL. The word-line capping patterns 310 and the device isolation patterns 302 may be used as a mask to dope impurities into the active sections ACT, which doping may form first and second impurity regions 3d and 3b.

Figure 4C:
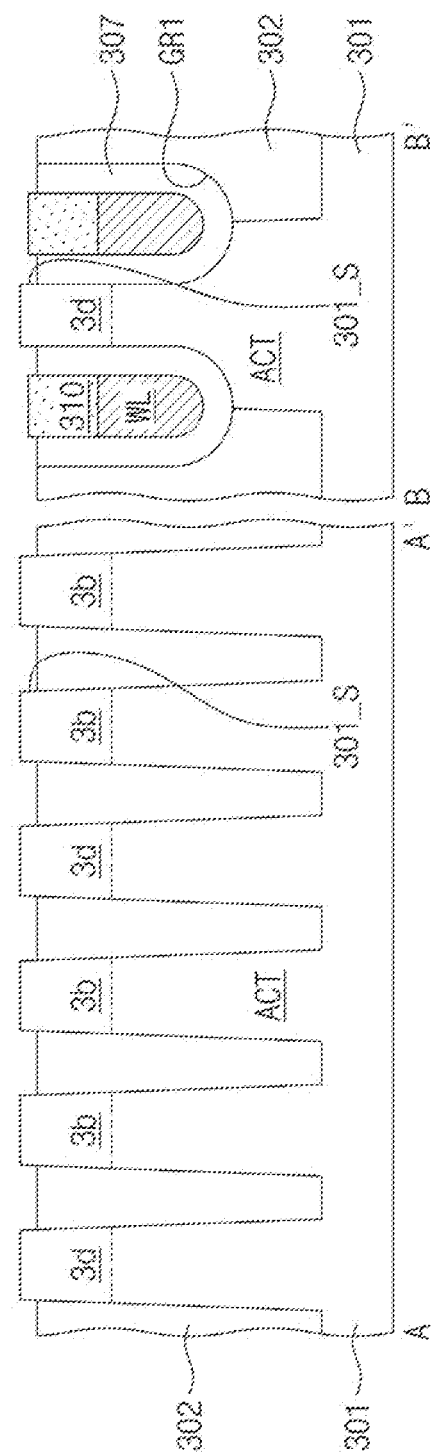

Referring to FIGS. 4A and 4C, an upper portion of the device isolation pattern 302 may be selectively removed. In this step, the gate dielectric layer 307 may be partially removed. The selective removal of the upper portion of the device isolation pattern 302 may be, for example, a wet etching process in which hydrofluoric acid (HF) is used to remove silicon oxide. The process mentioned above may expose the sidewalls 301_S of the active sections ACT (or of the substrate 301). In addition, a sidewall of the word-line capping pattern 310 may be exposed. As the sidewalls 301_S of the active sections ACT (or of the substrate 301) are exposed as discussed above, there may be an increase in contact areas between the substrate 301 and bit-line contacts DC which will be discussed below and may also be an increase in contact surfaces between the substrate 301 and storage node pads XP which will be discussed below.

Figure 5A:
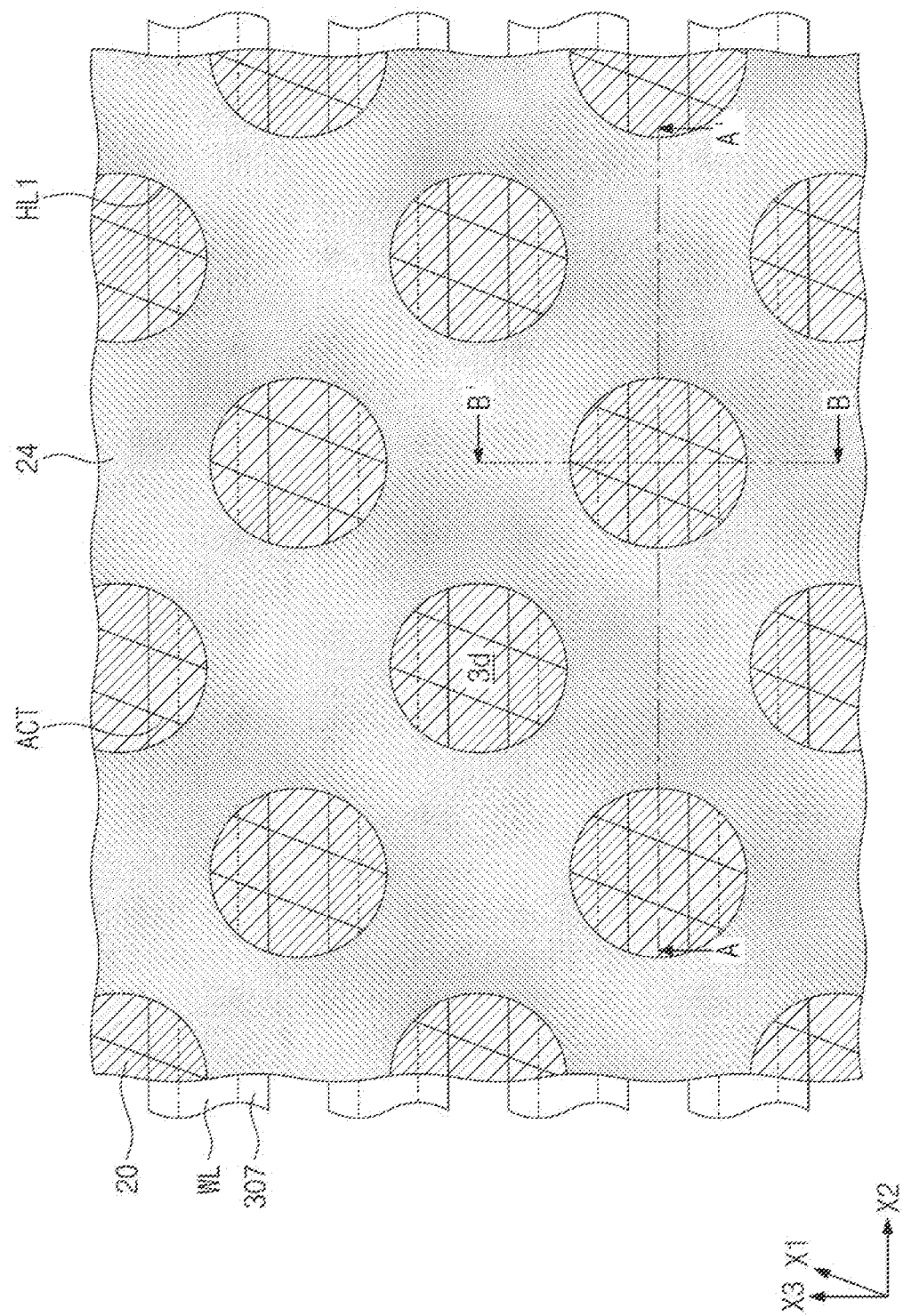
Figure 5B:
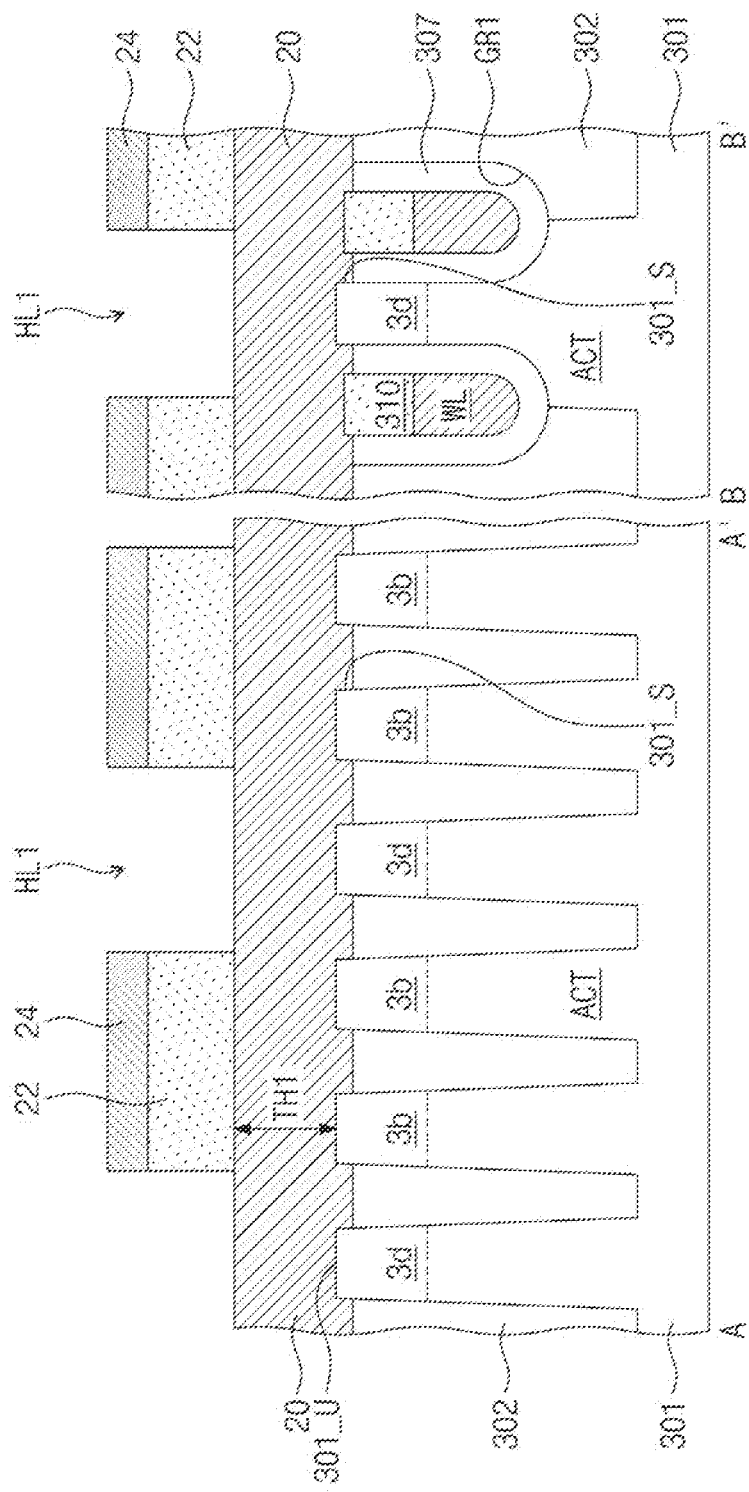

Referring to FIGS. 5A and 5B, a conductive layer 20 may be formed on an entire surface of the substrate 301. The conductive layer 20 may be, for example, an impurity-doped polysilicon layer. The formation of the conductive layer 20 may include depositing a polysilicon layer and performing an ion implantation process to dope impurities into the polysilicon layer. Alternatively, the formation of the conductive layer 20 may include depositing a polysilicon layer while the polysilicon layer is in-situ doped with impurities. The conductive layer 20 may be formed to have a first thickness TH1 measured from a top surface 301_U of the substrate 301. A first mask layer (not shown) and a second mask pattern 24 may be sequentially formed on an entire surface of the conductive layer 20. The first mask layer may include a material, such as silicon oxide, having an etch selectivity with respect to the conductive layer 20. The second mask pattern 24 may include a material, such as spin-on-hardmask (SOH) or amorphous carbon layer (ACL), having an etch selectivity with respect to the first mask layer. The second mask pattern 24 may be formed to have a plurality of first holes HL1 as shown in FIG. 5A. The first holes HL1 may overlap the first impurity regions 3d. The second mask pattern 24 may be used as an etching mask such that the first mask layer may be etched to form a first mask pattern 22 and to expose a top surface of the conductive layer 20. The first mask pattern 22 may have a planar shape the same as that of the second mask pattern 24. The first holes HL1 may be transferred to the first mask pattern 22. The first mask pattern 22 may be formed to have a thickness greater than a thickness of the second mask pattern 24.

Figure 6B:
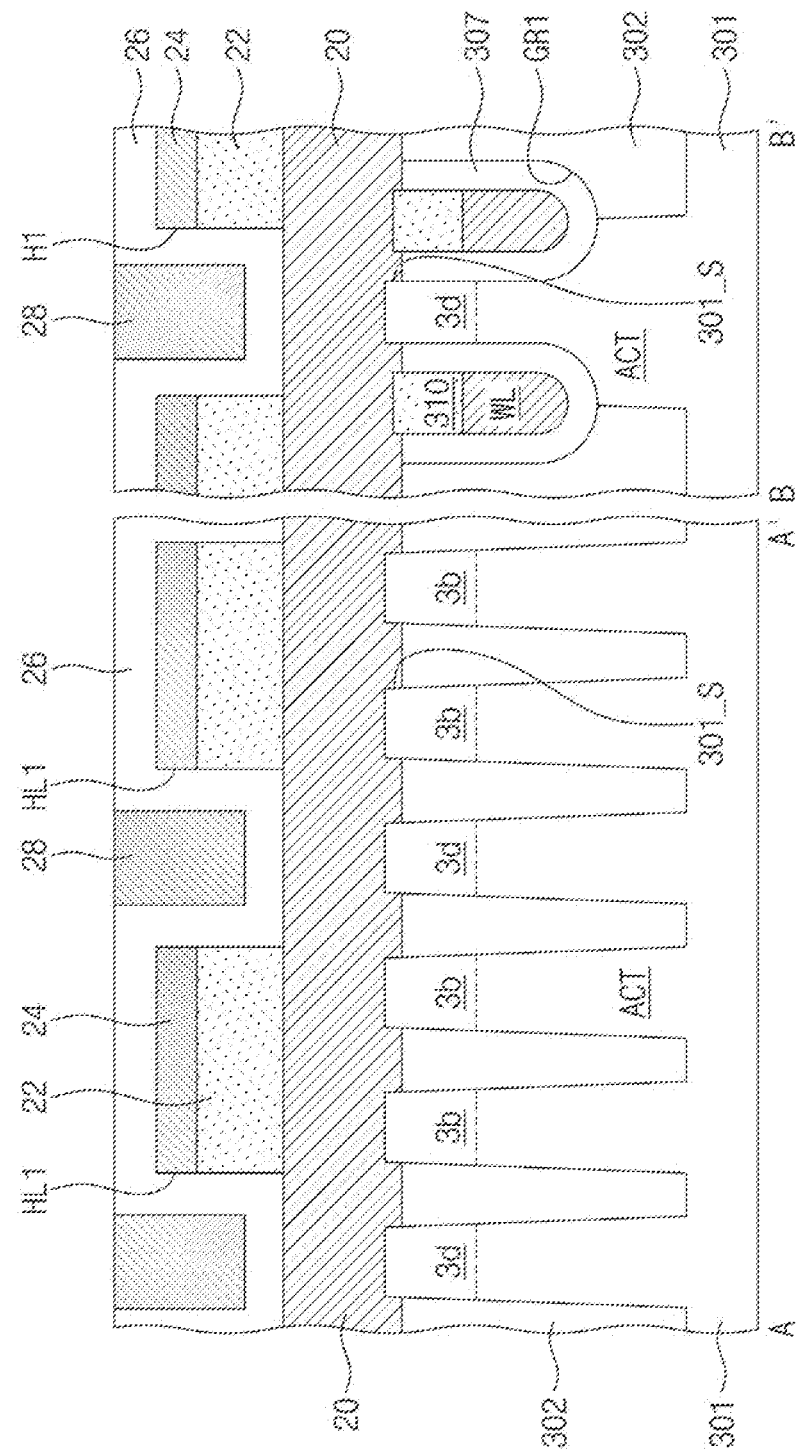

Referring to FIGS. 6A and 6B, a first sacrificial layer 26 may be conformally formed on the entire surface of the substrate 301. The first sacrificial layer 26 may include, for example, silicon oxide formed by atomic layer deposition (ALD). The first sacrificial layer 26 may be formed to have a thickness insufficient enough to fill the first holes HL1. The first sacrificial layer 26 may cover a top surface and lateral surfaces of the second mask pattern 24, lateral surfaces of the first mask pattern 22, and a top surface of the conductive layer 20 exposed in the first holes HL1. A second sacrificial pattern 28 may be formed to fill the first holes HL1. The second sacrificial pattern 28 may be formed of, for example, spin-on-hardmask (SOH) having excellent filling properties. The formation of the second sacrificial pattern 28 may include performing a spin coating process and a curing process to form a spin-on-hardmask (SOH) layer to fill the first holes HL1, and then performing an etch-back process to expose a top surface of the first sacrificial layer 26.

Referring to FIGS. 6A, 6B, 7A, and 7B, an etching process may be selectively performed on the first sacrificial layer 26. In this step, the second sacrificial pattern 28 may not be etched. The etching process may expose the top surface of the second mask pattern 24. The etching process may be performed such that the first sacrificial layer 26 in the first hole HL1 may be removed to expose the conductive layer 20. The conductive layer 20 exposed within the first hole HL1 may be removed to form a second hole HL2 that exposes a top surface of the device isolation pattern 302, a top surface of the gate dielectric layer 307, and a top surface of the word-line capping pattern 310. The formation of the second hole HL2 may separate the conductive layer 20 into a first conductive pattern 20d and a second conductive pattern 20pb. The first conductive pattern 20d and the second conductive pattern 20pb may each have the first thickness TH1 of FIG. 5B, measured from the top surface 301_U of the substrate 301.

The first conductive pattern 20d may have a circular shape when viewed in plan and may overlap the first impurity region 3d. The second conductive pattern 20pb may simultaneously cover two neighboring second impurity regions 3b. The second conductive pattern 20pb may have a network shape when viewed in plan.

Figure 7A:
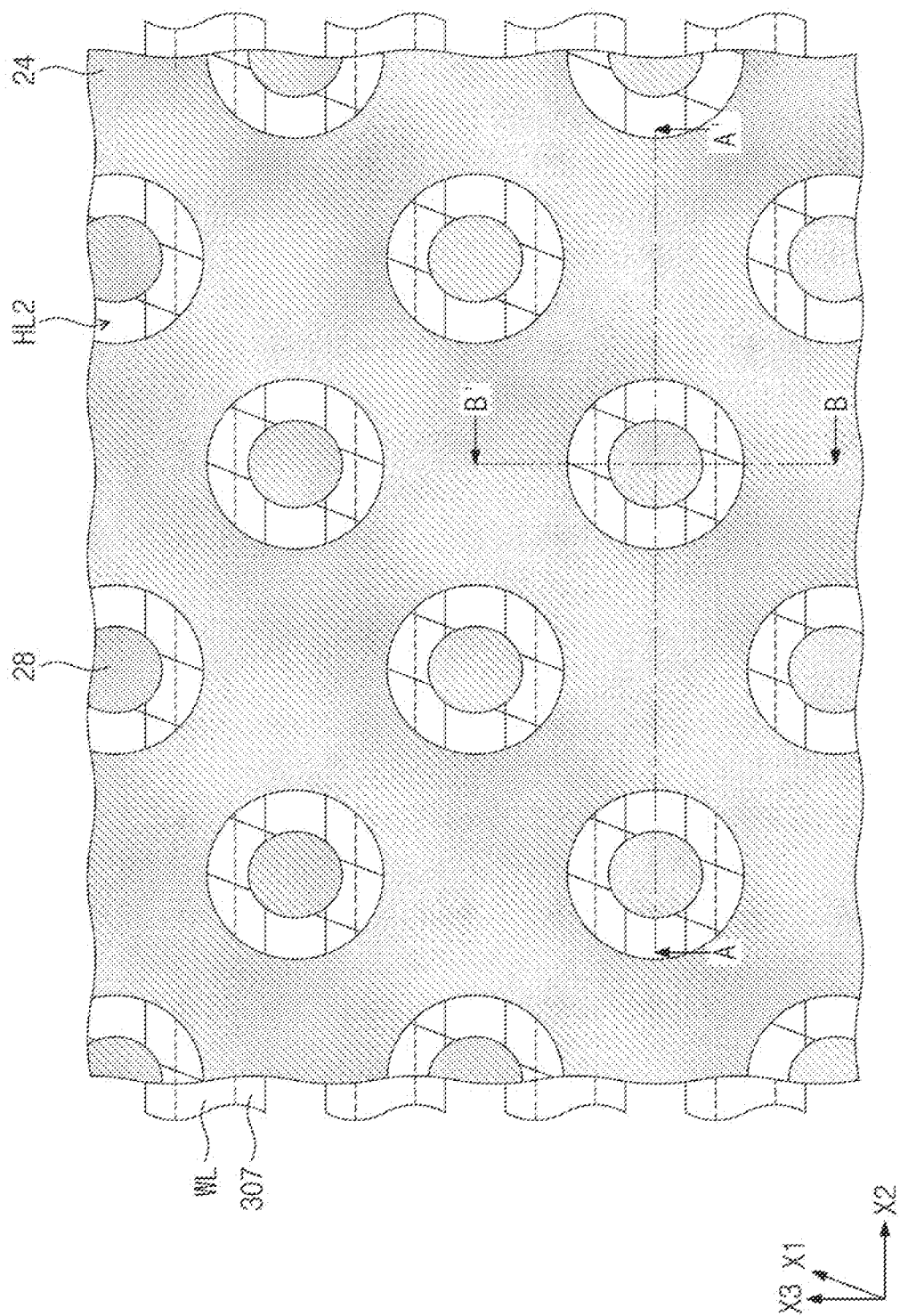
Figure 7B:
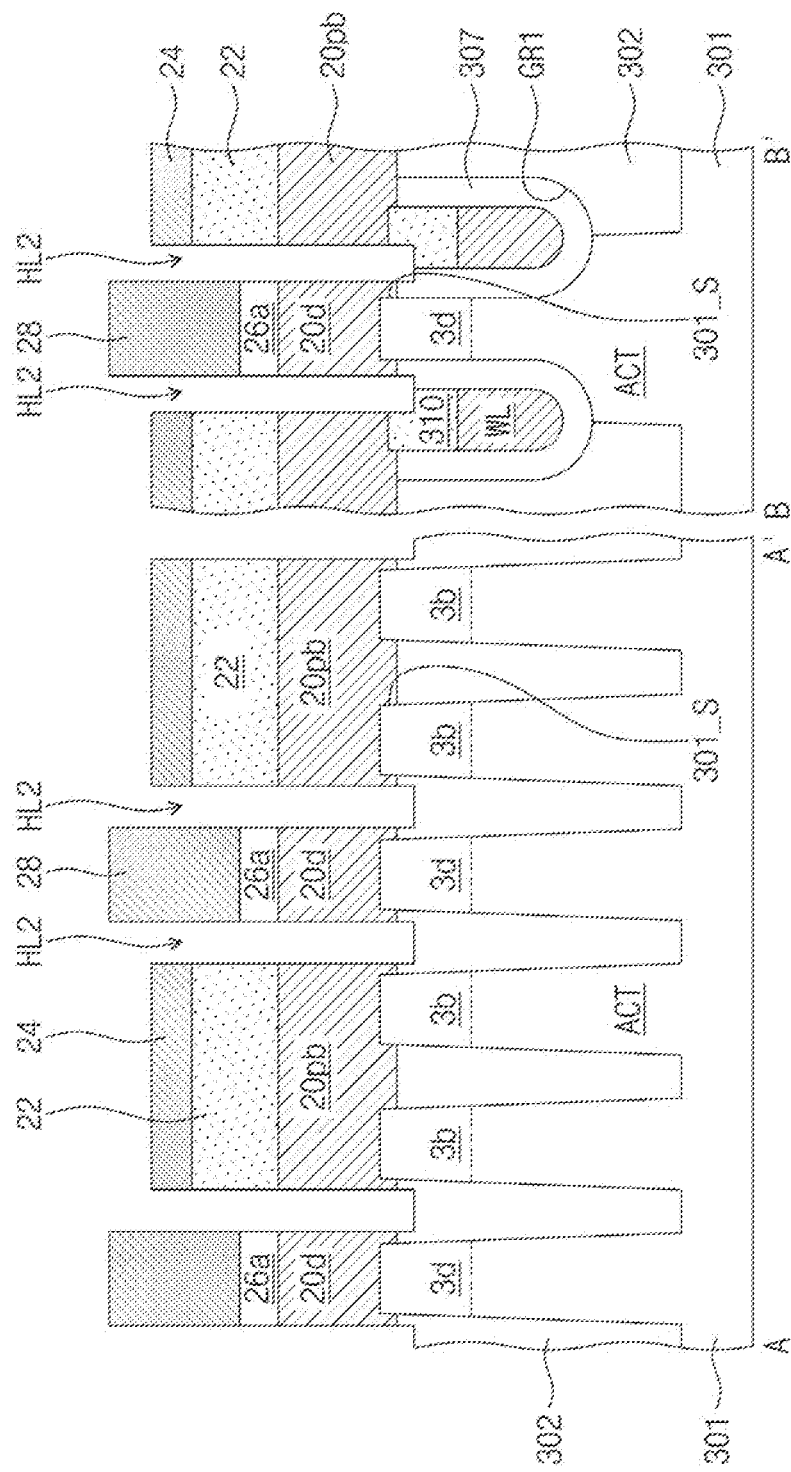
Figure 8B:
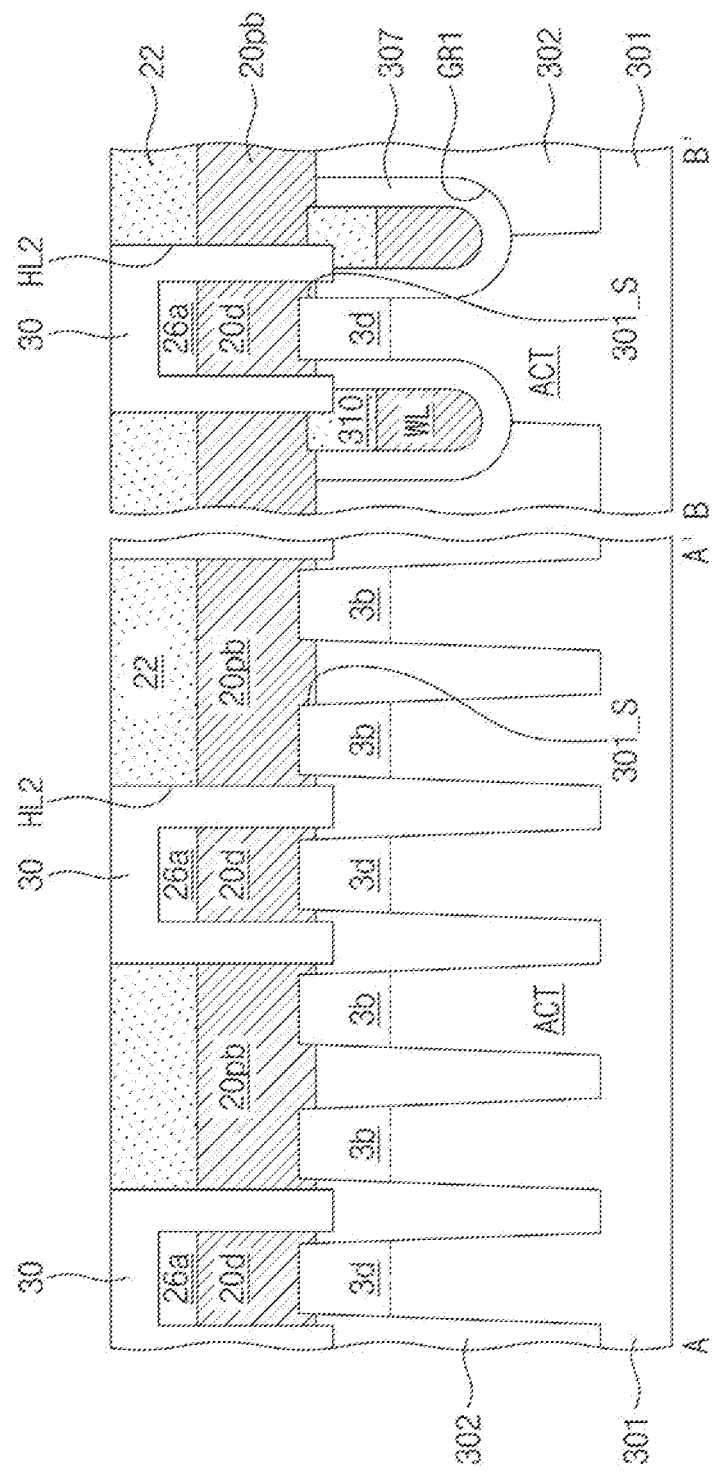

The second hole HL2 may be formed to have a doughnut or annular shape as shown in FIG. 7A. In this step, the first sacrificial layer 26 positioned below the second sacrificial pattern 28 may not be etched, but may remain to form a residual sacrificial pattern 26a. The etching process may also partially remove an upper portion of the device isolation pattern 302, an upper portion of the gate dielectric layer 307, and an upper portion of the word-line capping pattern 310. The residual sacrificial pattern 26a may be formed of, for example, silicon oxide.

Referring to FIGS. 7A, 7B, 8A, and 8B, the second mask pattern 24 and the second sacrificial pattern 28 may all be removed to expose a top surface of the residual sacrificial pattern 26a and a top surface of the first mask pattern 22. When both of the second mask pattern 24 and the second sacrificial pattern 28 are formed of spin-on-hardmask (SOH), an ashing process may be performed to remove the second mask pattern 24 and the second sacrificial pattern 28. The top surface of the residual sacrificial pattern 26a may be formed at a lower vertical level than the top surface of the first mask pattern 22. A contact dielectric layer may be formed on the entire surface of the substrate 301 to thereby fill the second holes HL2, and then a chemical mechanical polishing (CMP) process or an etch-back process may be performed to form contact capping patterns 30 in the second holes HL2. The contact capping pattern 30 may include a dielectric material, such as silicon oxide. The contact capping pattern 30 may cover the residual sacrificial pattern 26a and the first conductive pattern 20d.

Referring to FIGS. 8A, 8B, 9A, and 9B, the first mask pattern 22 may be removed to expose the second conductive pattern 20pb. An etch-back process may be performed to remove an upper portion of the second conductive pattern 20pb, and thus a thickness of the second conductive pattern 20pb may be changed to a second thickness TH2 less than the first thickness TH1 of FIG. 5B. The second thickness TH2 may be measured from the top surface 301_U of the substrate 301. In this step, the contact capping pattern 30 may protect the first conductive pattern 20d.

Figure 10B:
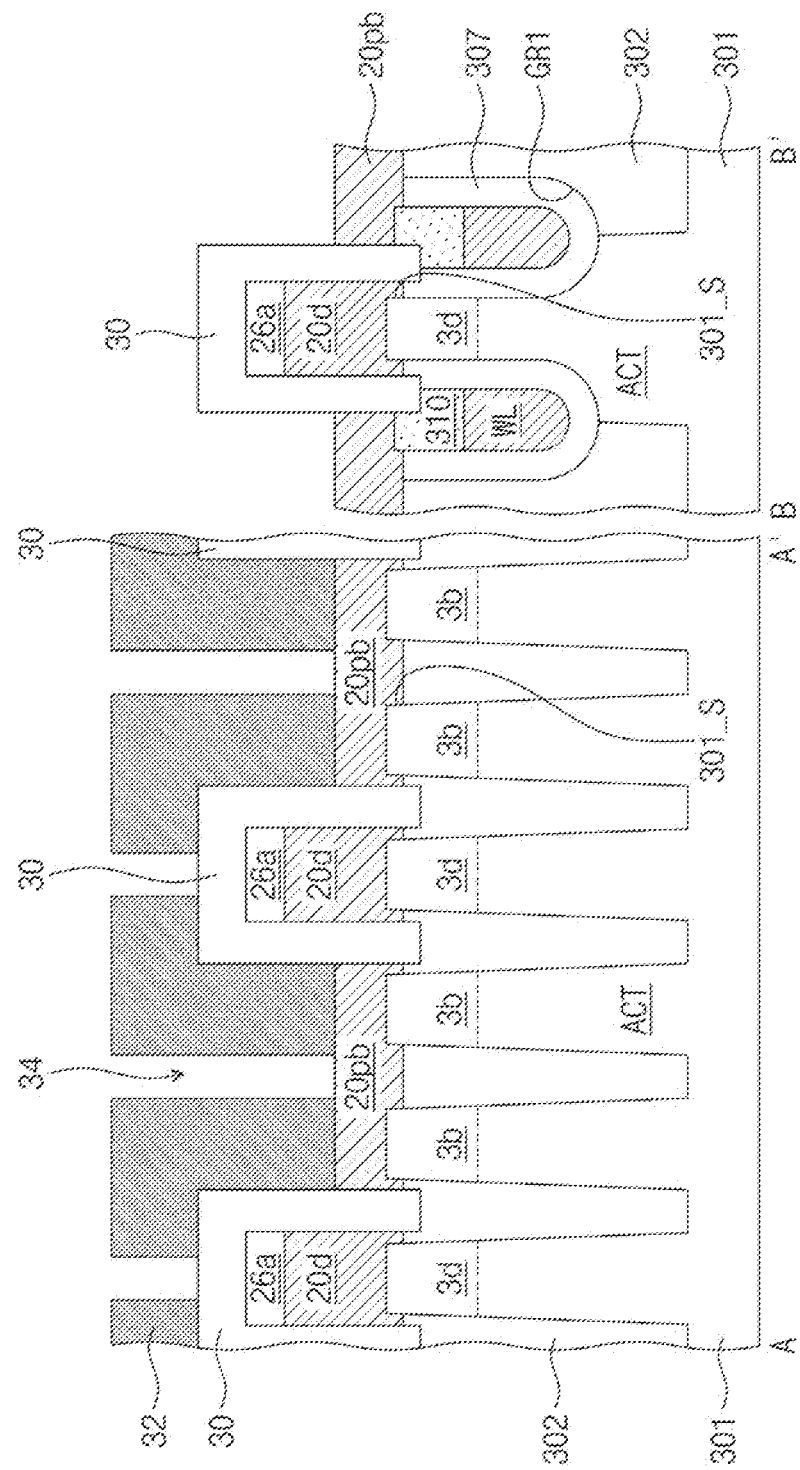
Figure 11A:
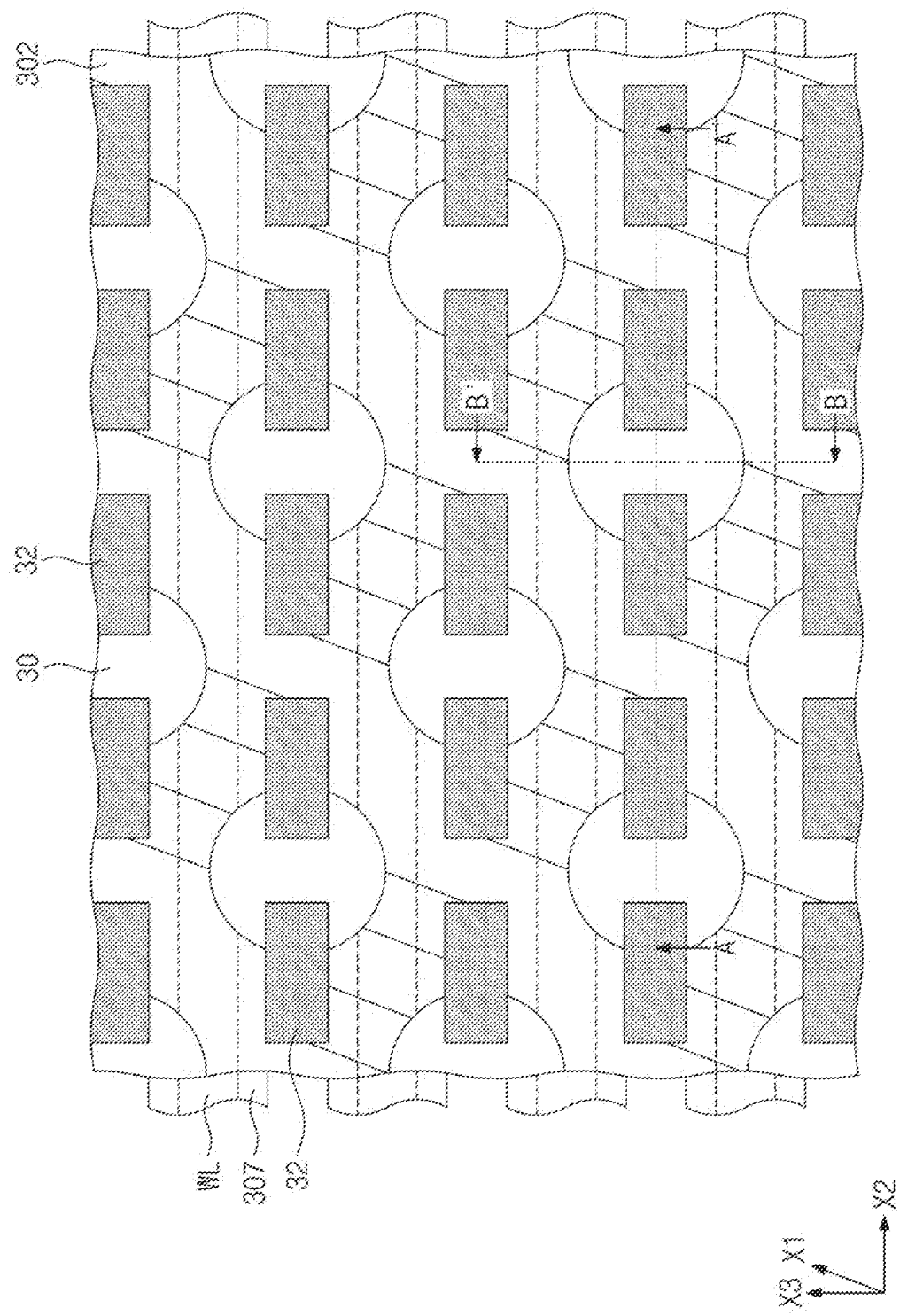
Figure 11B:
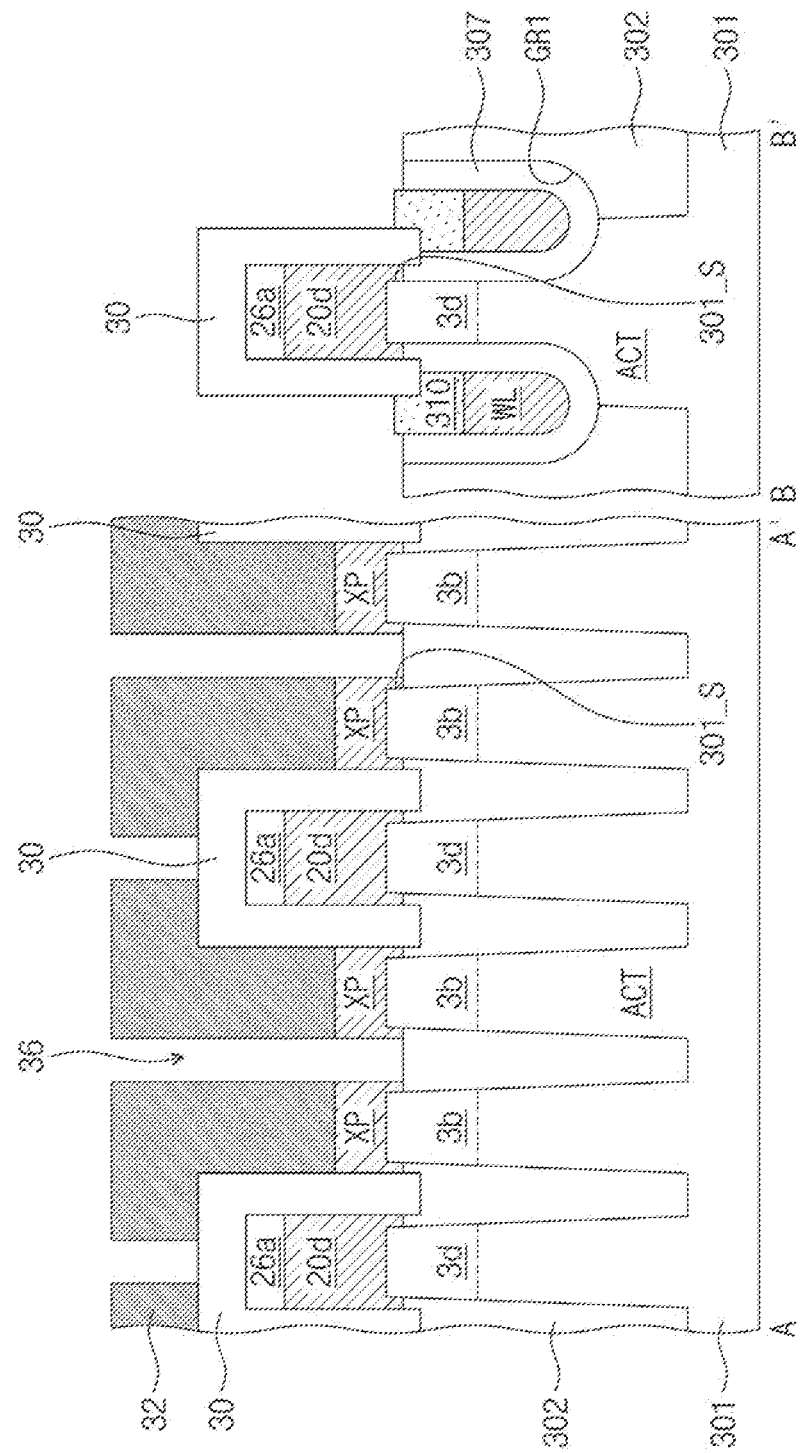

Referring to FIGS. 10A and 10B, third mask patterns 32 may be formed on the contact capping pattern 30 and the second conductive pattern 20pb. The third mask patterns 32 may be formed of, for example, spin-on-hardmask (SOH), amorphous carbon layer (ACL), silicon nitride, silicon oxynitride, or photoresist. The third mask patterns 32 may be two-dimensionally arranged along a second direction X2 and a third direction X3. The third mask patterns 32 may be positioned on the device isolation pattern 302 and the substrate 301 between neighboring gate dielectric layers 307. Two neighboring third mask patterns 32 may simultaneously overlap a single contact capping pattern 30. The second conductive pattern 20pb and the contact capping patterns 30 may be exposed between the third mask patterns 32. The third mask patterns 32 may be formed by using diverse patterning processes such as double patterning technology (DPT), quadruple patterning technology (QPT), or litho-etching-litho-etching (LELE). Spaces 34 may be provided between adjacent ones of the third mask patterns 32, and the spaces 34 may expose top surfaces of the second conductive patterns 20pb.

Referring to FIGS. 10A, 10B, 11A, and 11B, the third mask patterns 32 may be used as an etching mask to etch the second conductive pattern 20pb, which step may form storage node pads XP spaced apart from each other and also form a space 36 between the storage node pads XP. The space 36 may expose the device isolation pattern 302. In this step, the contact capping pattern 30 and the residual sacrificial pattern 26a may protect and prevent the first conductive pattern 20d from being etched. An upper portion of the contact capping pattern 30 may be partially etched in the etching process. In addition, an upper portion of the device isolation pattern 302 may be partially etched between the storage node pads XP. The storage node pads XP may each have the second thickness TH2 of FIG. 9B, measured from the top surface 301_U of the substrate 301.

Referring to FIGS. 11A, 11B, 12A, and 12B, the third mask patterns 32 may be removed to expose top surfaces of the storage node pads XP and top surfaces of the contact capping patterns 30. A pad separation layer (not shown) may be formed on the entire surface of the substrate 301 to fill the space 36 between the storage node pads XP, and then a chemical mechanical polishing (CMP) process may be performed. As such, the contact capping pattern 30 and the residual sacrificial pattern 26a on the first conductive pattern 20d may be removed to expose a top surface of the first conductive pattern 20d and simultaneously to form a contact dielectric pattern 30r that covers a sidewall of the first conductive pattern 20d. A portion of the contact capping pattern 30 may be formed into the contact dielectric pattern 30r. The contact dielectric pattern 30r may have a doughnut or annular shape when viewed in plan. In addition, a pad separation pattern 38 may be formed to fill the space 36 between the storage node pads XP and to cover the top surfaces of the storage node pads XP. The pad separation pattern 38 may be a portion of the pad separation layer (not shown).

Figure 13A:
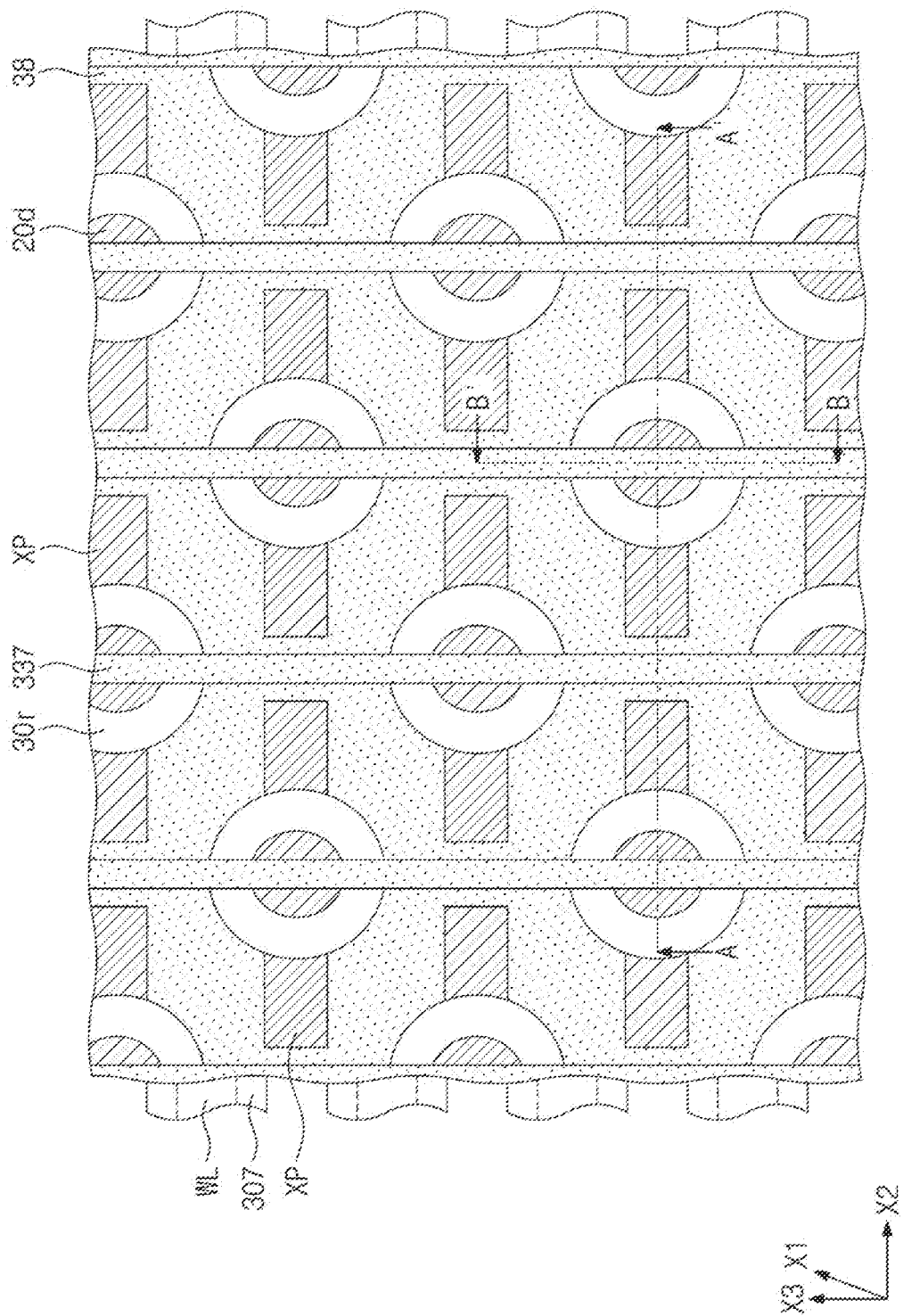
Figure 13B:
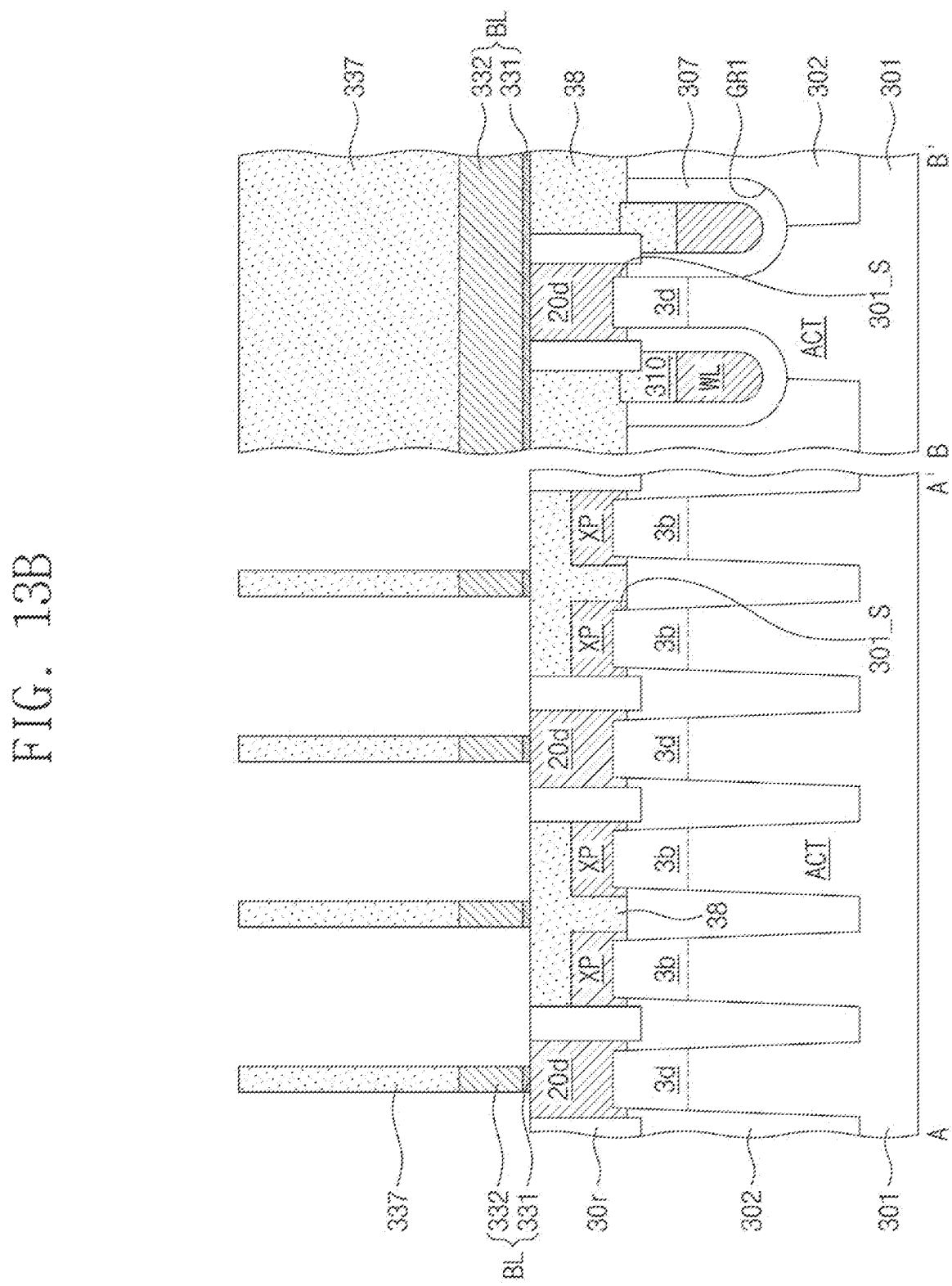

Referring to FIGS. 13A and 13B, a bit-line diffusion barrier layer (not shown) and a bit-line wire layer (not shown) may be sequentially formed on the first conductive pattern 20d, the contact dielectric pattern 30r, and the pad separation pattern 38, and then a bit-line capping pattern 337 may be formed on the bit-line wire layer. The bit-line capping pattern 337 may be used as an etching mask to sequentially etch the bit-line wire layer and the bit-line diffusion barrier layer to form a bit-line wire pattern 332 and a bit-line diffusion barrier pattern 331. Therefore, a bit line BL may be formed.

Figure 13C:
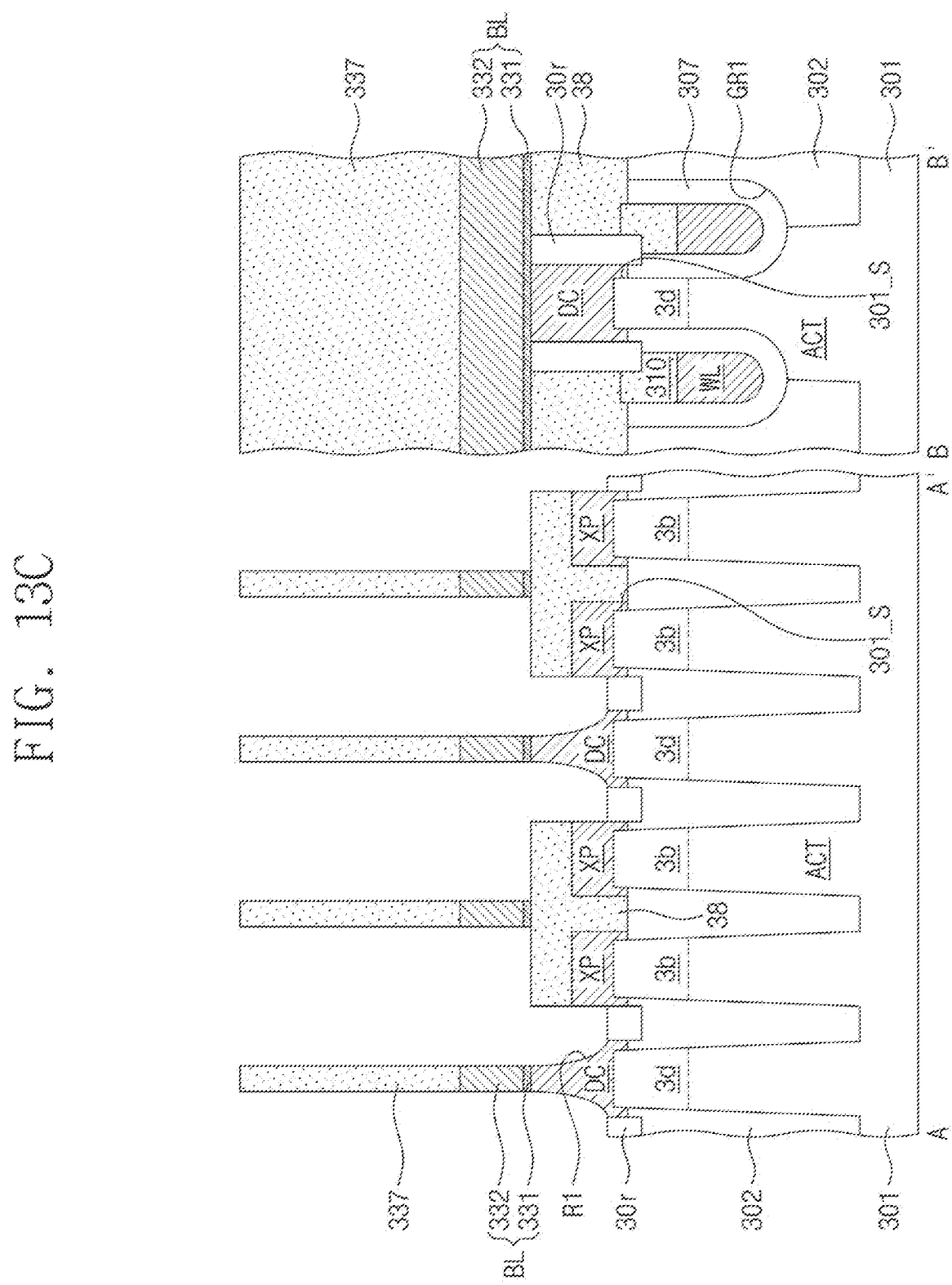

Referring to FIGS. 13B and 13C, the bit-line capping pattern 337 may be used as an etching mask to etch the first conductive pattern 20d exposed on a side of the bit-line capping pattern 337, thereby forming a bit-line contact DC. In addition, the contact dielectric pattern 30r exposed on the side of the bit-line capping pattern 337 may also be etched, and thus an upper portion of the contact dielectric pattern 30r may be removed and a recess region R1 may be formed on a side of the bit-line contact DC. The recess region R1 may expose sidewalls of the storage node pads XP and a sidewall of the pad separation pattern 38. In the etching process, process parameters may be properly adjusted to allow the bit-line contact DC to have an inclined sidewall and a width that increases in a downward direction.

Figure 14A:
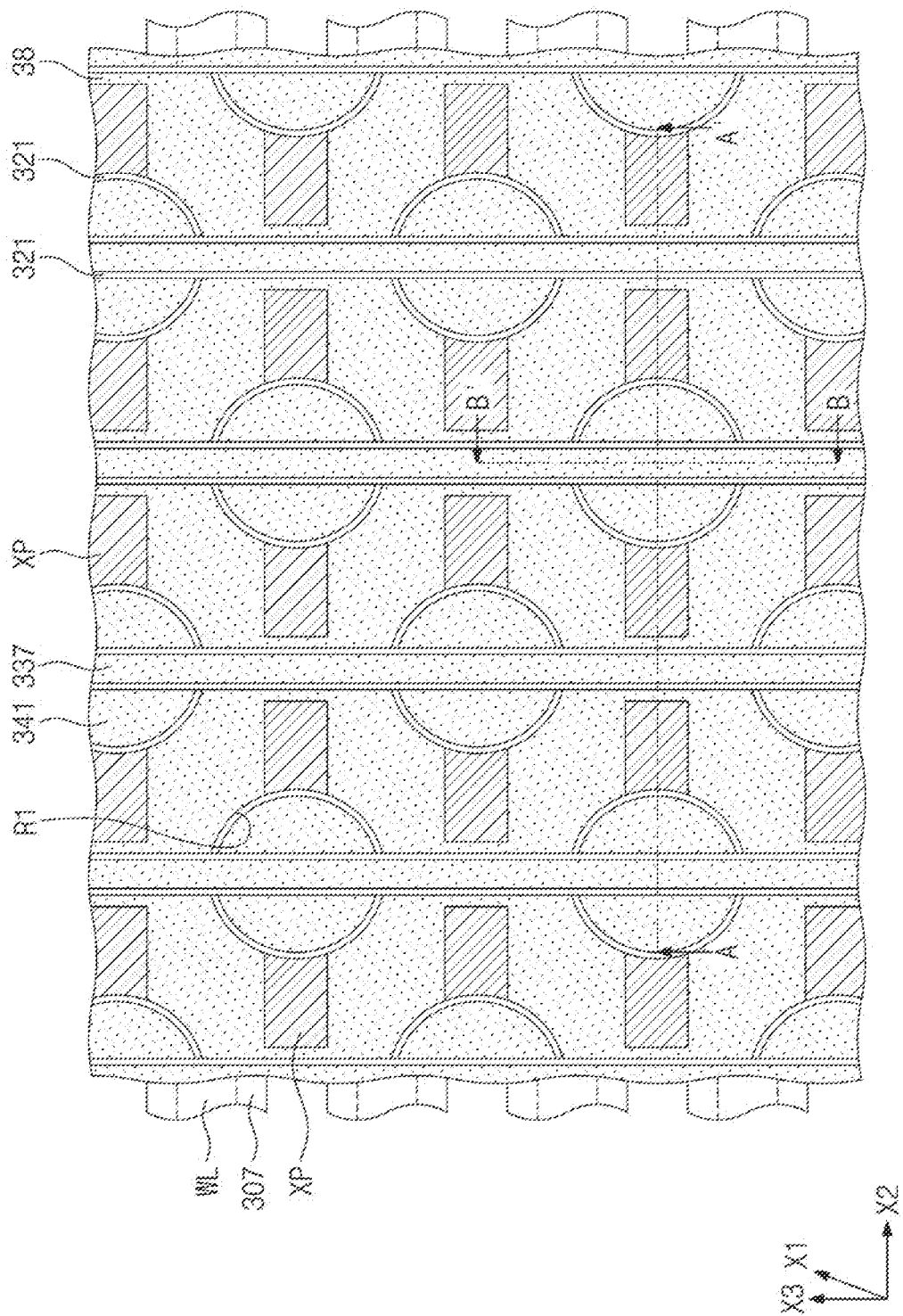
Figure 14B:
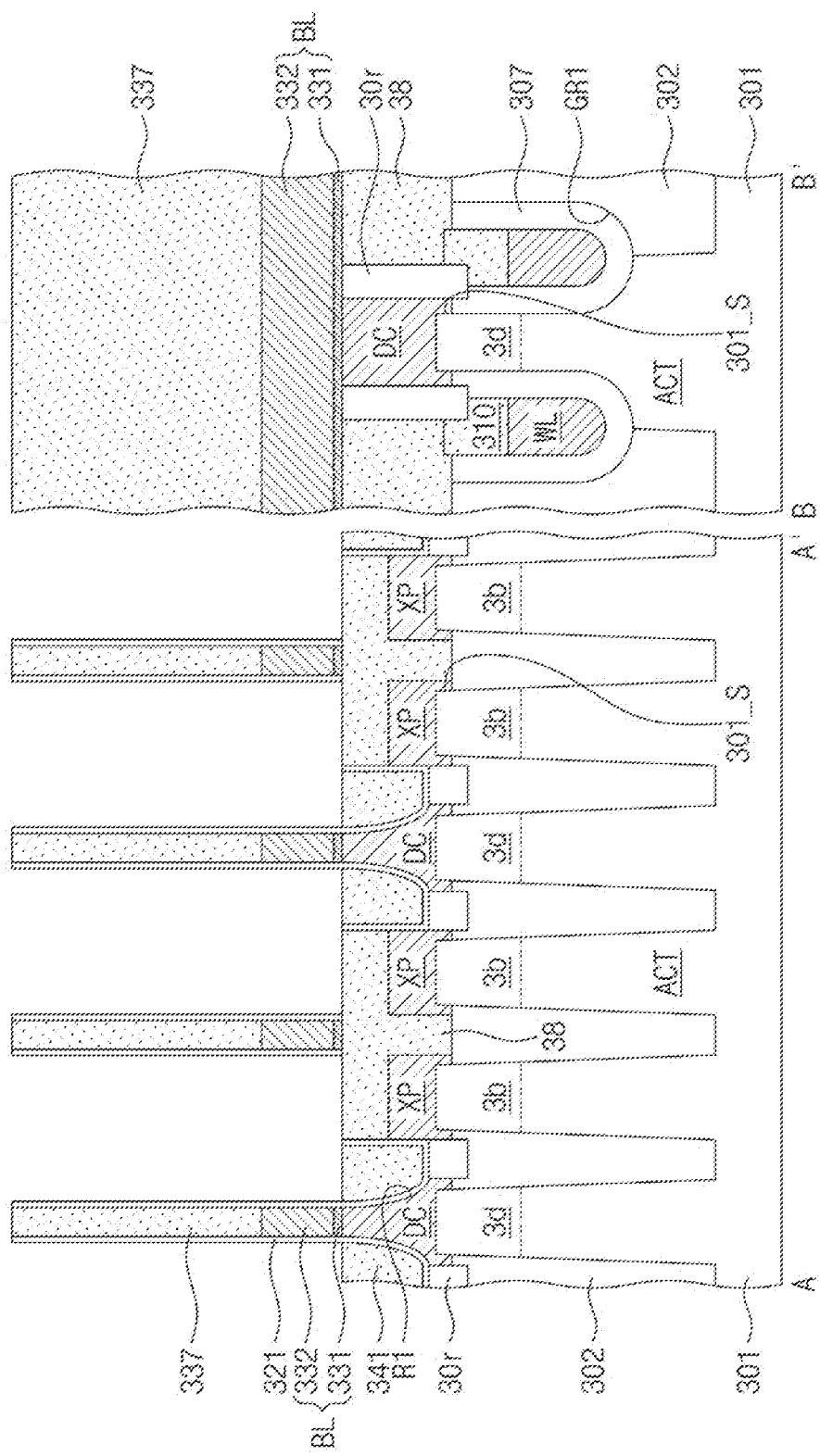

Referring to FIGS. 14A and 14B, a spacer liner 321 may be conformally formed on the entire surface of the substrate 301. A buried dielectric layer (not shown) may be formed on the spacer liner 321 to fill the recess region R1. The buried dielectric layer may undergo an etch-back process to form a buried dielectric pattern 341 in the recess region R1. A top surface of the pad separation pattern 38 may be exposed while the spacer liner 321 may remain on a sidewall of the bit line BL and on a sidewall of the bit-line capping pattern 337.

Figure 15A:
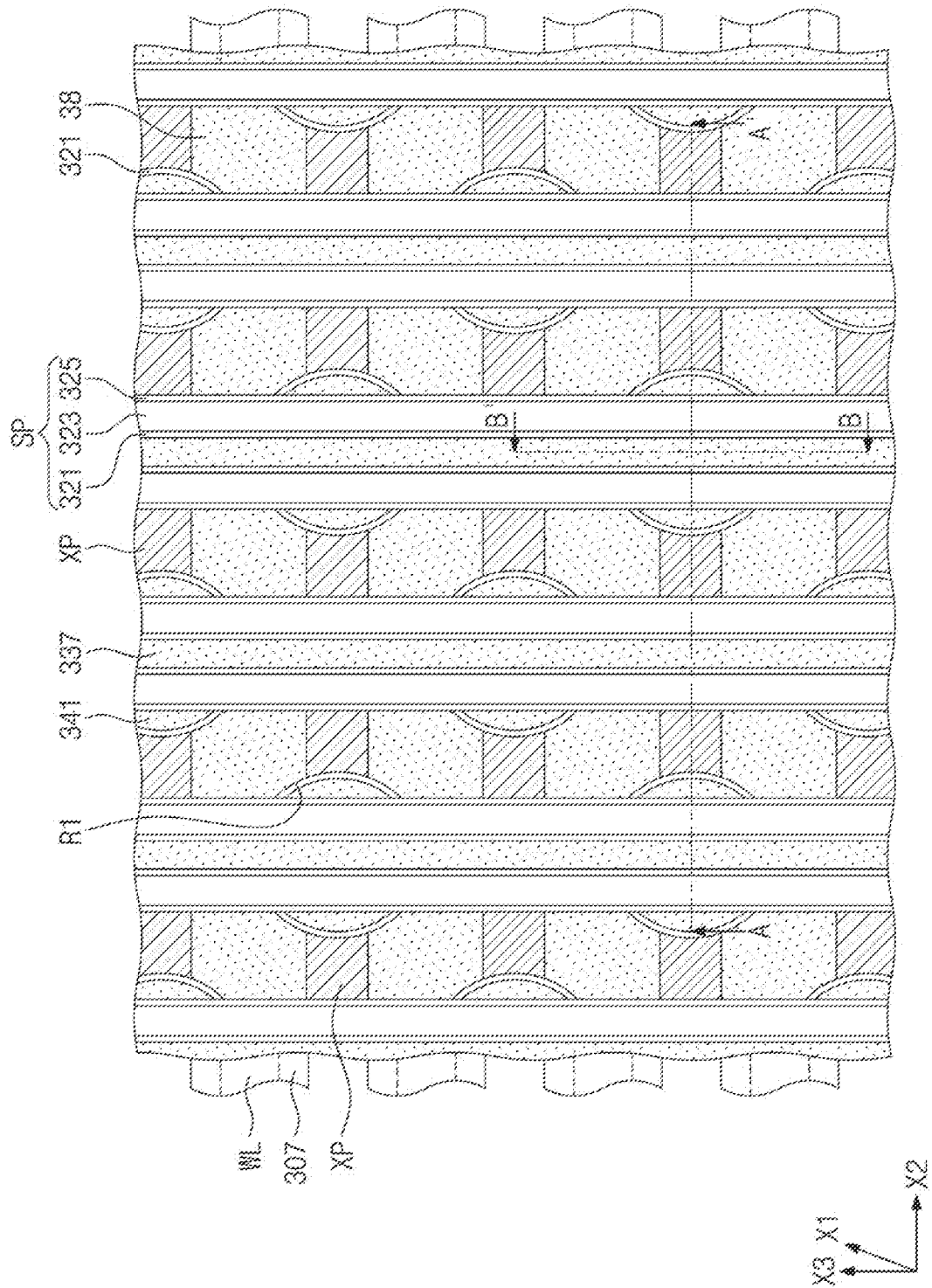
Figure 15B:
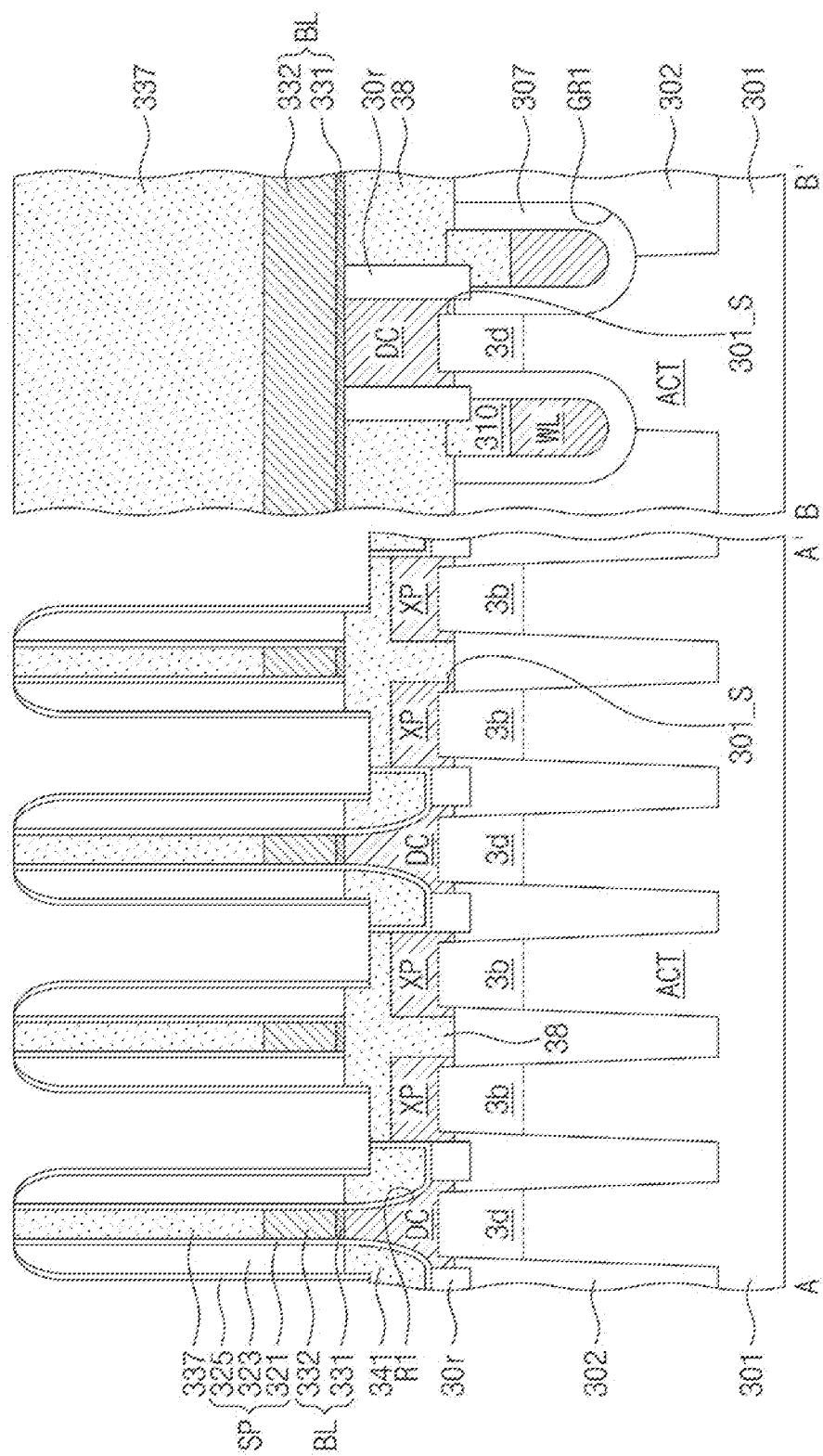

Referring to FIGS. 15A and 15B, a first spacer layer may be conformally formed on the entire surface of the substrate 301, and then the first spacer layer may be etched back to form a first spacer 323 that covers a sidewall of the spacer liner 321. In this step, the buried dielectric pattern 341 and the pad separation pattern 38 may be partially etched at their upper portions. A second spacer layer may be conformally formed on the entire surface of the substrate 301, and then the second spacer layer may be etched back to form a second spacer 325 that covers a sidewall of the first spacer 323. Therefore, a bit-line spacer SP may be formed.

Figure 16A:
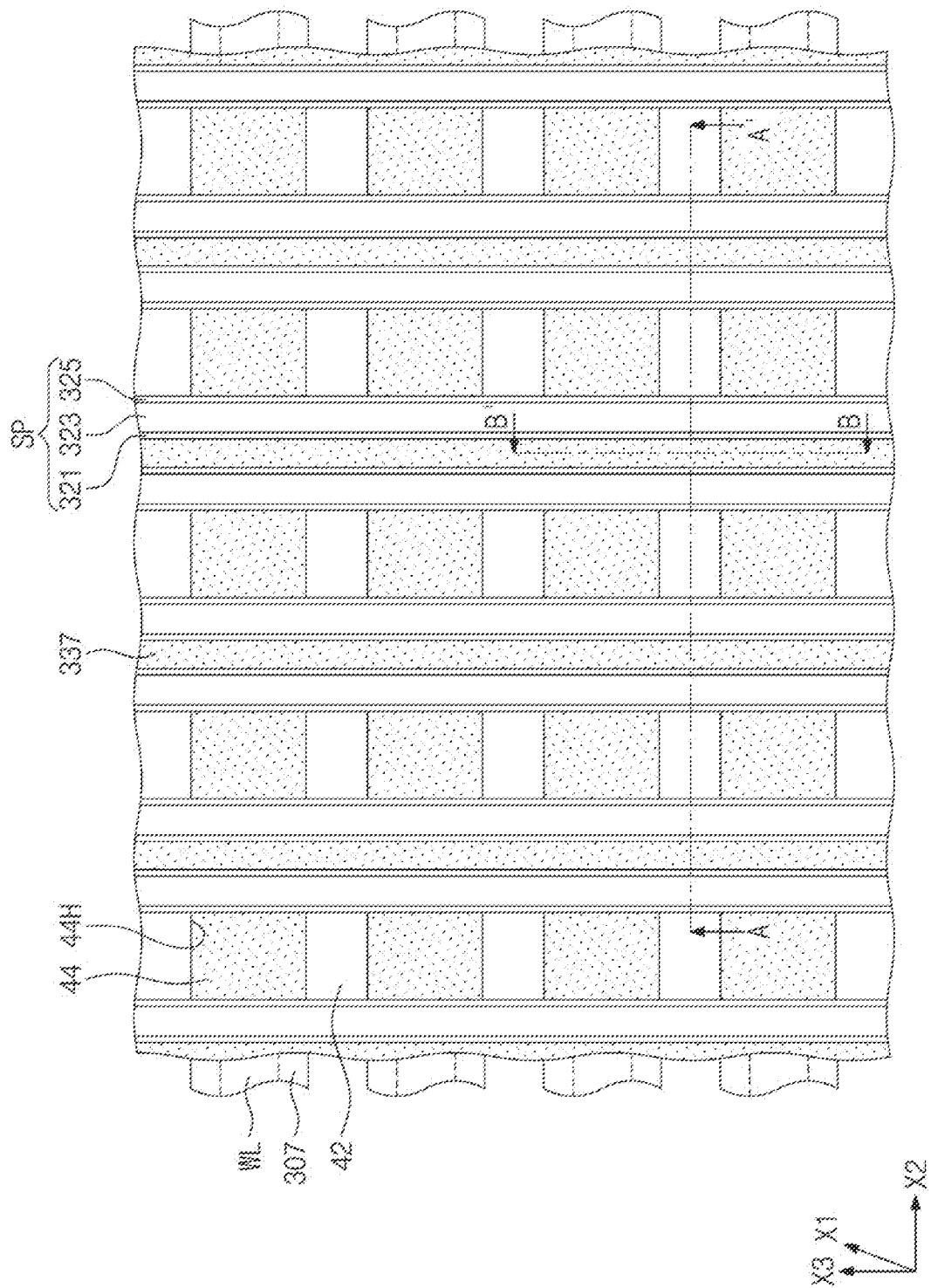
Figure 16B:
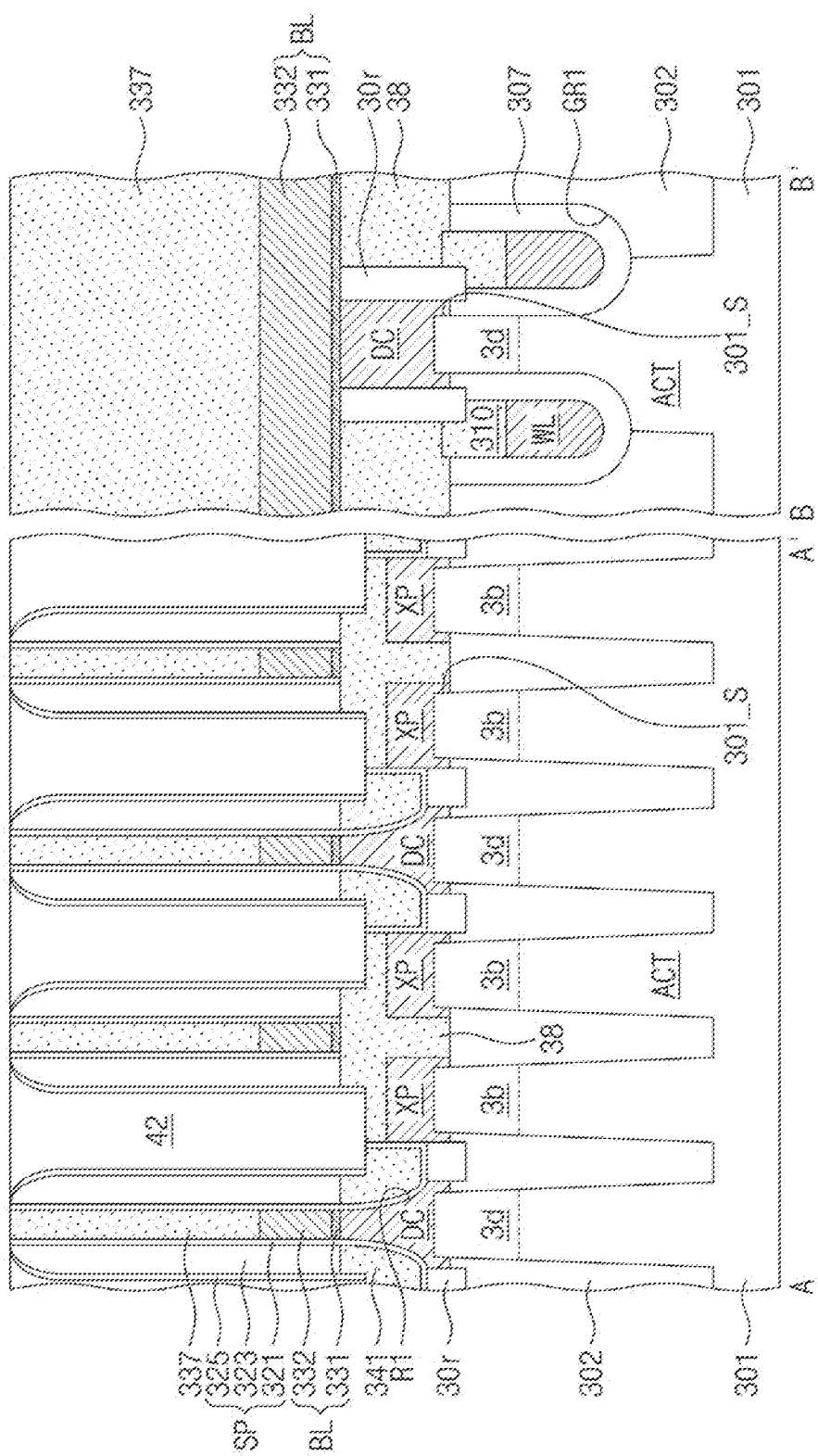

Referring to FIGS. 16A and 16B, a sacrificial buried layer may be formed on the entire surface of the substrate 301 to fill a space between the bit line BL, and an etch-back process and a patterning process may be performed to form sacrificial buried patterns 42 between the bit lines BL. The sacrificial buried patterns 42 may be formed of, for example, silicon oxide, tetraethylorthosilicate (TEOS), or tonensilazene (TOSZ). Node separation holes 44H may be formed between the bit lines BL and in the sacrificial buried patterns 42. The sacrificial buried patterns 42 may overlap the storage node pads XP. A node separation layer may be formed on the entire surface of the substrate 301 to fill the node separation holes 44H, and then the node separation layer may be etched back to form the node separation patterns 44. The node separation patterns 44 may include, for example, silicon oxide.

Referring to FIGS. 16A, 16B, 17A, and 17B, the sacrificial buried patterns 42 may be removed to expose the buried dielectric pattern 341 and the pad separation pattern 38. An etching process may be performed to etch the buried dielectric pattern 341 and the pad separation pattern 38 that are exposed between the bit lines BL, thereby forming storage nod contact holes BCH that expose the storage node pads XP. In this step, an upper portion of the bit-line spacer SP may also be partially etched. In addition, upper portions of the storage node pads XP may be partially etched.

Referring to FIGS. 17A, 17B, 1A, and 1B, a contact diffusion barrier layer (not shown) may be conformally formed on the entire surface of the substrate 301, and then a contact metal layer (not shown) may be formed on the contact diffusion barrier layer to fill the storage node contact holes BCH. The contact diffusion barrier layer and the contact metal layer may all include metal, and may be formed by a process (e.g., deposition) performed at a lower temperature (e.g., hundreds of degrees Celsius or from about 300° C. to about 400° C.) than that (e.g., about 1000° C.) of an annealing process.

A chemical mechanical polishing (CMP) process may be subsequently performed to expose a top surface of the bit-line capping pattern 337 and simultaneously to form a contact diffusion barrier pattern 311 and a contact metal pattern 313. A portion of the contact diffusion barrier layer may be formed into the contact diffusion barrier pattern 311. A portion of the contact metal layer may be formed into the contact metal pattern 313. The contact diffusion barrier pattern 311 and the contact metal pattern 313 may constitute a storage node contact BC. Subsequently, a conductive layer may be formed on the storage node contact BC and the bit-line capping patterns 337, and then the conductive layer may be etched to form landing pads LP and to form trenches between the landing pads LP. The trenches may be filled with a dielectric layer, and then an etch-back process or a chemical mechanical polishing (CMP) process may be performed to form landing pad separation patterns LPS.

According to some embodiments of the present inventive concepts, a method of fabricating a semiconductor memory device may include forming a storage node pad XP of which area is greater than that of the second impurity region 3b and forming the storage node contact hole BCH that exposes the storage node pad XP. Therefore, it may be possible to securely obtain a misalignment margin when the storage node contact hole BCH is formed. As a result, process defects may be reduced.

Figure 18:
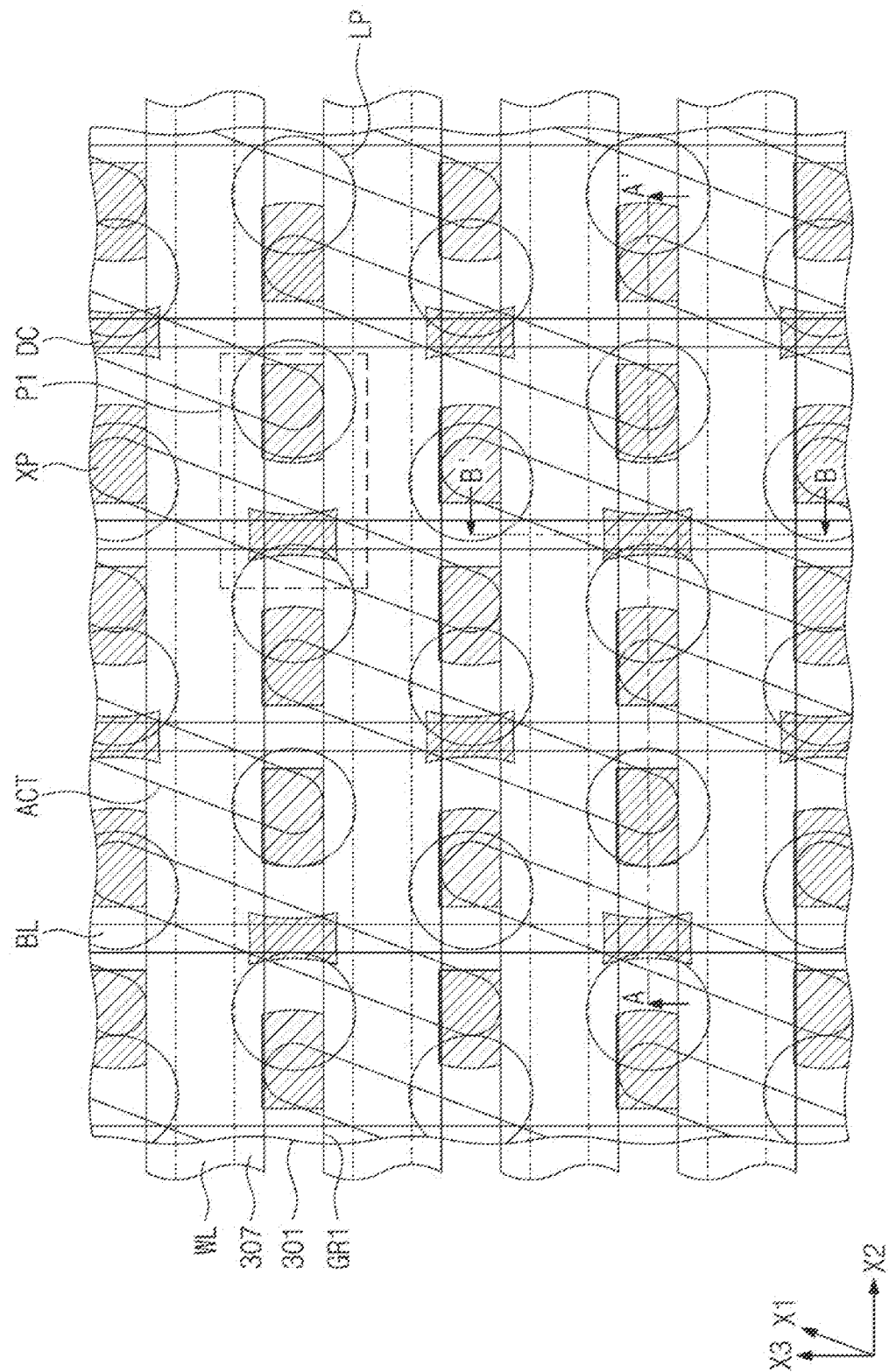
FIG. 18 illustrates a plan view showing a semiconductor memory device, according to some example embodiments of the present inventive concepts.
Figure 19:
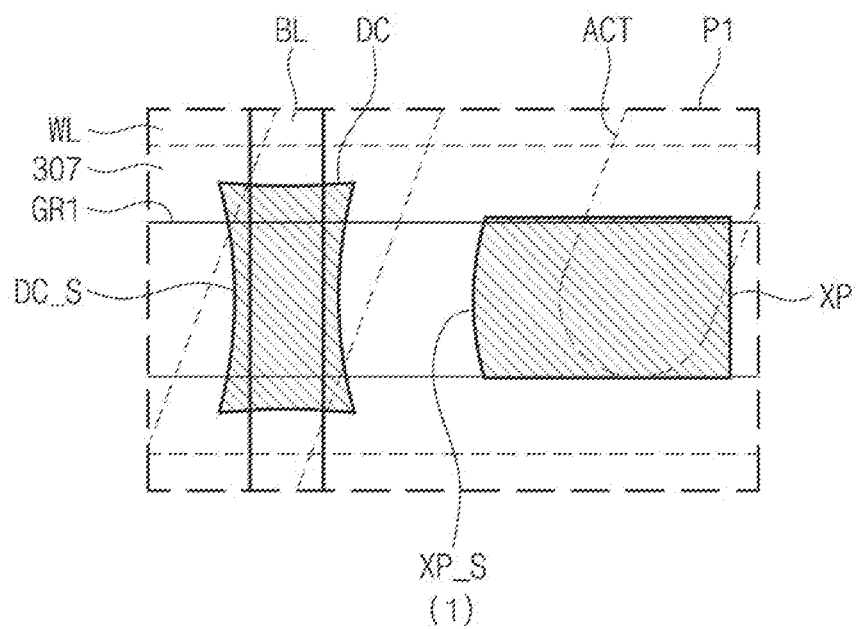
FIG. 19 illustrates an enlarged view showing section P1 of FIG. 18.

FIG. 18 illustrates a plan view showing a semiconductor memory device, according to some example embodiments of the present inventive concepts. FIG. 19 illustrates an enlarged view showing section P1 of FIG. 18. A cross-section taken along lines A-A' and B-B' of FIG. 18 may be identical or similar to that of FIG. 1B.

Referring to FIGS. 18 and 19, for a semiconductor memory device according to the present embodiment, the bit-line contact DC may have a shape similar to a rectangular shape when viewed in plan and may have sidewalls DC_S that are inwardly recessed. In addition, when viewed in plan, the storage node pad XP may have a first pad sidewall XP_S(1) that protrudes toward the bit-line contact DC. Other configurations may be identical or similar to those discussed with reference to FIGS. 1A to 3A.

Figure 20:
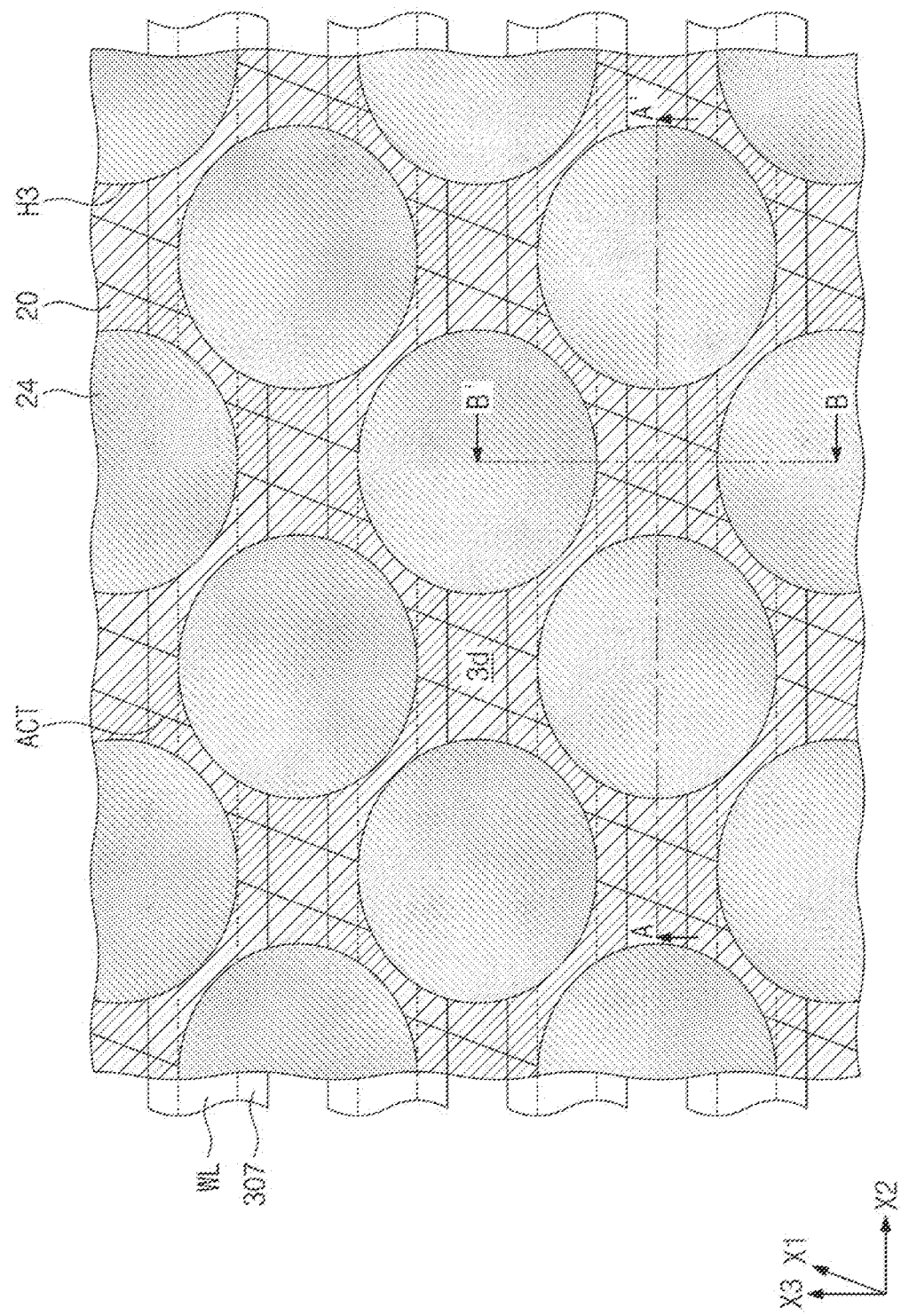
FIG. 20 illustrates a plan view showing an example method of fabricating a semiconductor memory device having the plan view of FIG. 18.

FIG. 20 illustrates a plan view showing a method of fabricating a semiconductor memory device having the plan view of FIG. 18.

Referring to FIG. 20, the second mask pattern 24 may not be formed to have a network shape as shown in FIG. 5A, but may be formed to have a plurality of isolated island shapes as shown in FIG. 20. The second mask patterns 24 may expose a top surface of the conductive layer 20 that overlaps the first impurity region 3d. The conductive layer 20 may constitute a network shape on its top surface exposed by the second mask patterns 24. Subsequent processes may be identical or similar to those discussed with reference to FIGS. 5A to 17B.

Figure 21A:
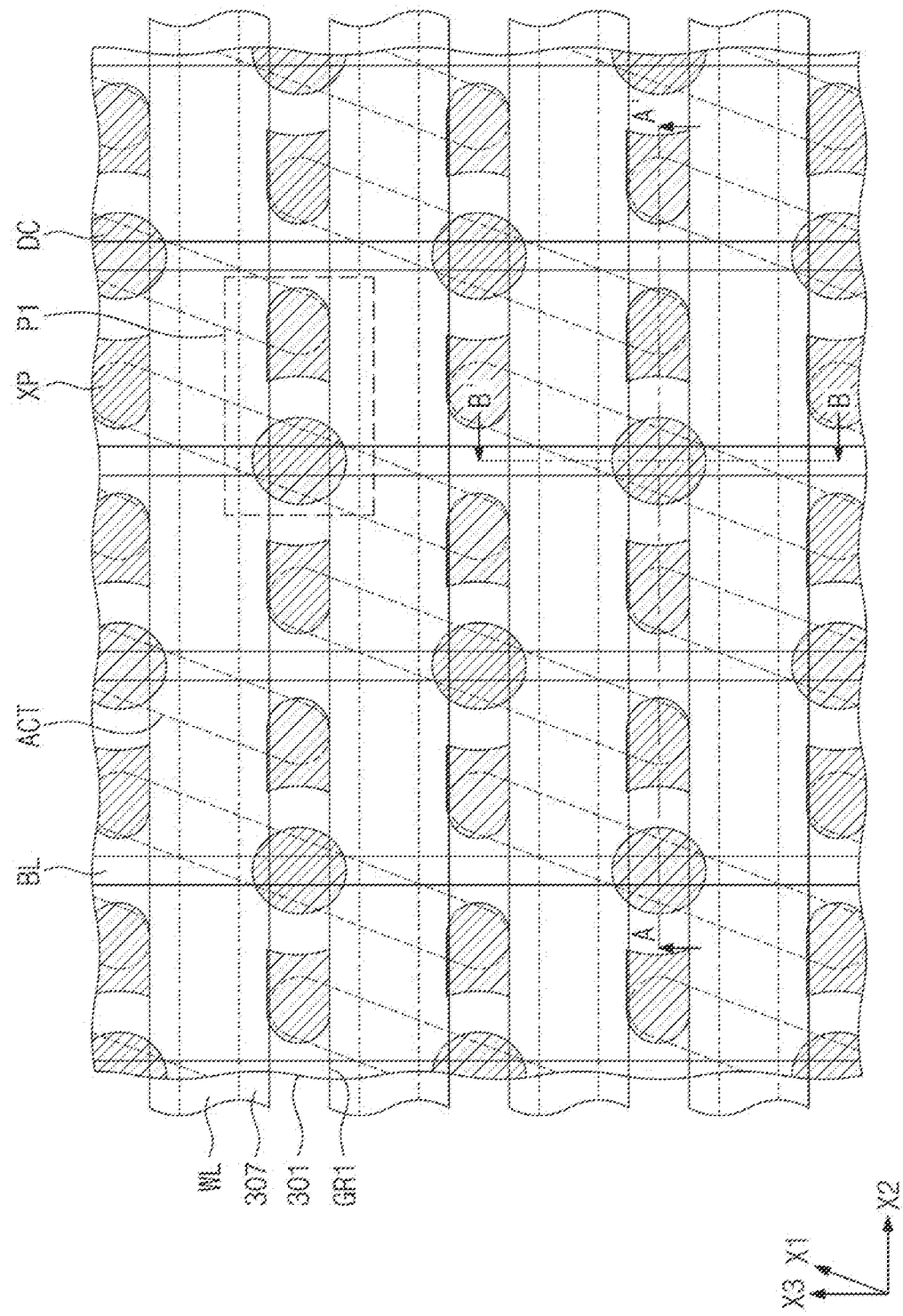
FIG. 21A illustrates a plan view showing a semiconductor memory device, according to some example embodiments of the present inventive concepts.
Figure 21B:
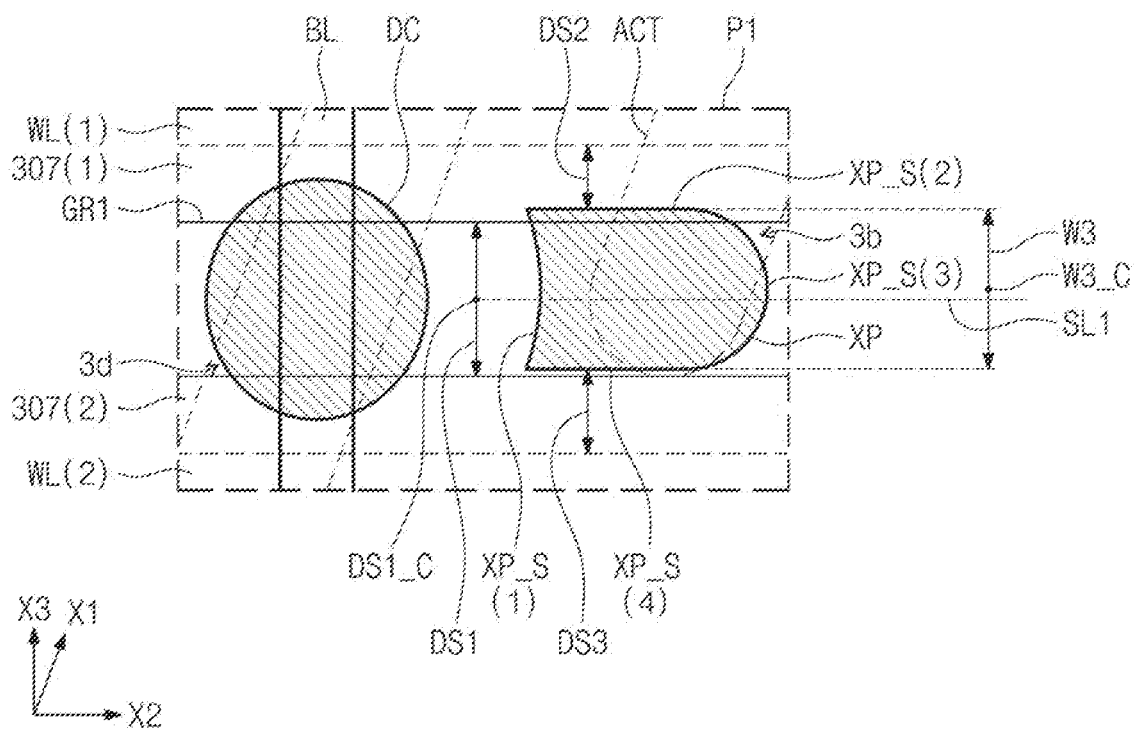
FIG. 21B illustrates an enlarged view showing section P1 of FIG. 21A.

FIG. 21A illustrates a plan view showing a semiconductor memory device according to some example embodiments of the present inventive concepts. FIG. 21B illustrates an enlarged view showing section P1 of FIG. 21A. FIG. 21A omits the illustration of the landing pad LP of FIG. 1A. A cross-section taken along lines A-A' and B-B' of FIG. 21A may be identical or similar to that of FIG. 1B.

Referring to FIGS. 1B, 21A, and 21B, for a semiconductor memory device according to the present embodiment, when viewed in plan, the third pad sidewall XP_S(3) of the storage node pad XP may be convex in the second direction X2 or in a direction away from a first pad sidewall XP_S(1). The first pad sidewall XP_S(1) of the storage node pad XP may be recessed in the second direction X2 or in a direction toward the third pad sidewall XP_S(3). In the present embodiment, the third pad sidewall XP_S(3) may have a curvature different from that of the first pad sidewall XP_S(1). The second pad sidewall XP_S(2) and the fourth pad sidewall XP_S(4) may be flat and parallel with one another, and may connect the first pad sidewall XP_S(1) to the third pad sidewall XP_S(3).

The substrate 301 may be provided therein with a first word line WL(1) and a second word line WL(2). The first word line WL(1) and the second word line WL(2) may be provided in the substrate 301 such that top surfaces of the first word line WL(1) and the second word line WL(2) are lower than the top surface 301_U of the substrate 301. A first gate dielectric layer 307(1) may be interposed between the first word line WL(1) and the substrate 301, and a second gate dielectric layer 307(2) may be interposed between the second word line WL(2) and the substrate 301.

When viewed in plan, the storage node pad XP may have a third width W3 in the third direction X3. The first gate dielectric layer 307(1) may be spaced apart at a first interval DS1 from the second gate dielectric layer 307(2). A center W3_C of the third width W3 may not be positioned on an imaginary line SL1 that passes through a center DS1_C of the first interval DS1 and is parallel to the second direction X2. The center W3_C of the third width W3 may correspond to a central position between the second pad sidewall XP_S(2) and the fourth pad sidewall XP_S(4) of the storage node pad XP, or to a point located between and at the same distance from both of the second pad sidewall XP_S(2) and the fourth pad sidewall XP_S(4). The center DS1_C of the first interval DS1 may correspond to a central position between the first gate dielectric layer 307(1) and the second gate dielectric layer 307(2), or to a point between and at the same distance from both of the first gate dielectric layer 307(1) and the second gate dielectric layer 307(2).

When viewed in plan, a second interval DS2 between the first word line WL(1) and the storage node pad XP may be different from a third interval DS3 between the second word line WL(2) and the storage node pad XP.

The storage node pads XP spaced apart from each other across one bit-line contact DC may have shapes that are mirror-symmetrical to each other. For example, the shapes of the storage node pads XP on opposite sides of a bit-line contact DC may mirror one another. Other configurations may be identical or similar to those discussed with reference to FIGS. 1A to 20.

Figure 22:
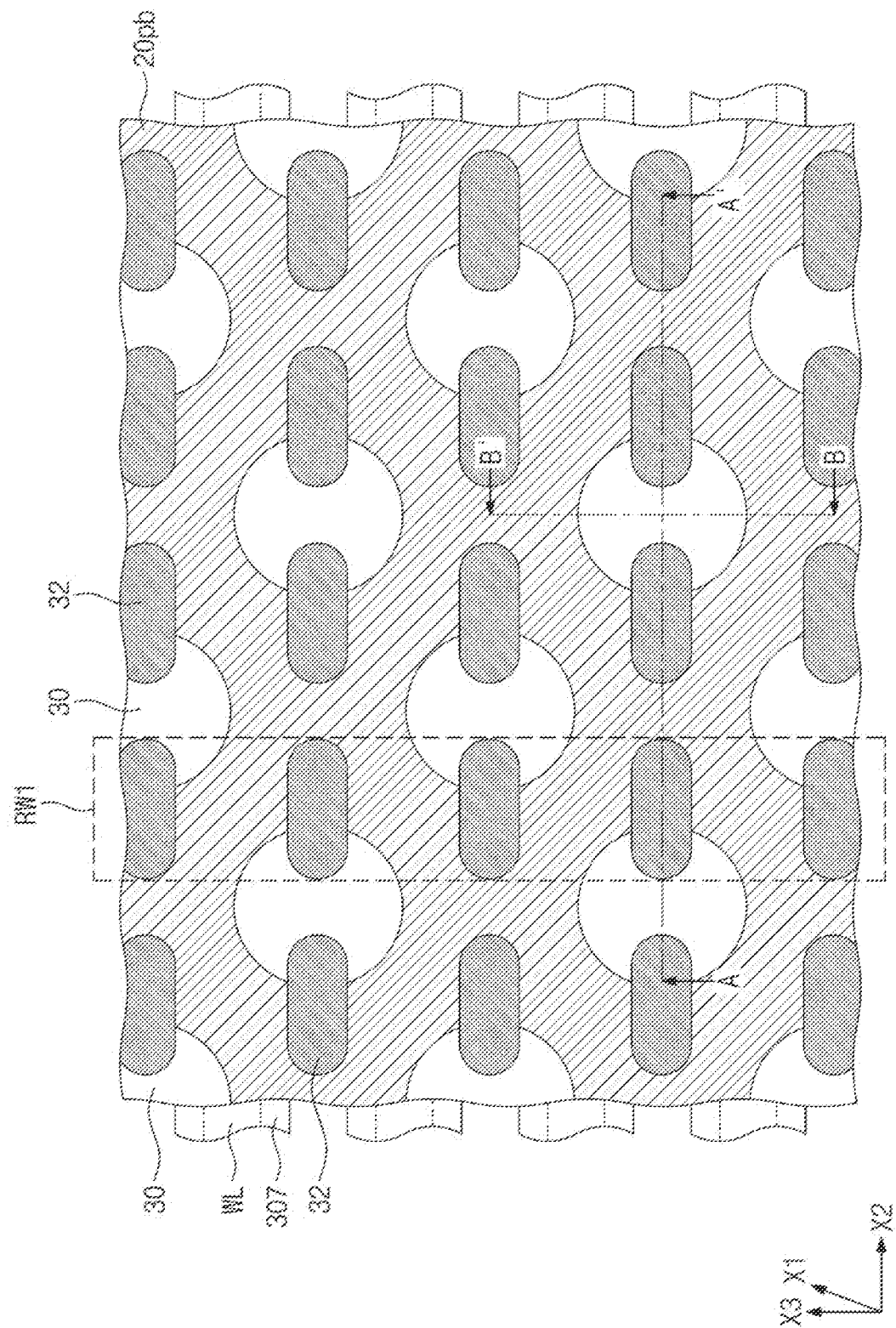
FIG. 22 illustrates a plan view showing an example method of fabricating a semiconductor memory device having the plan view of FIG. 21A.

FIG. 22 illustrates a plan view showing a method of fabricating a semiconductor memory device having the plan view of FIG. 21A. A cross-section taken along lines A-A' and B-B' of FIG. 22 may be identical or similar to that of FIG. 10B.

Referring to FIG. 22, as discussed with reference to FIGS. 10A and 10B, third mask patterns 32 may be formed on the contact capping pattern 30 and the second conductive pattern 20pb. In this step, the third mask patterns 32 may each have a planar shape that is not rectangular as shown FIG. 10A but oval as shown in FIG. 22. The third mask patterns 32 in one column RW1 may have their ends that are aligned along the third direction X3. The third mask patterns 32 may be formed by using diverse patterning processes such as double patterning technology (DPT), quadruple patterning technology (QPT), or litho-etching-litho-etching (LELE). Subsequent processes may be identical or similar to those discussed with reference to FIGS. 11A to 17B.

Figure 23A:
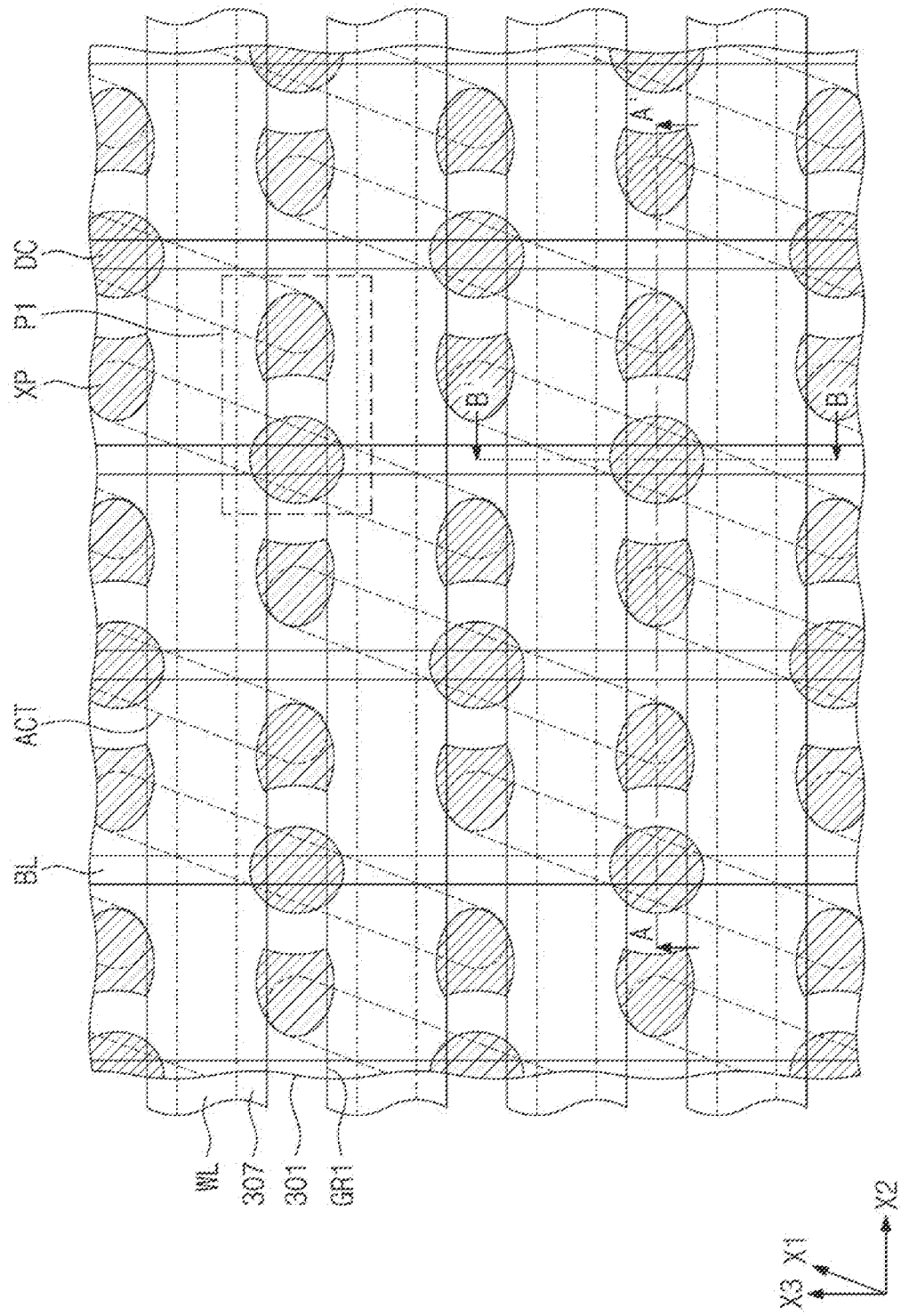
FIG. 23A illustrates a plan view showing a semiconductor memory device, according to some example embodiments of the present inventive concepts.
Figure 23B:
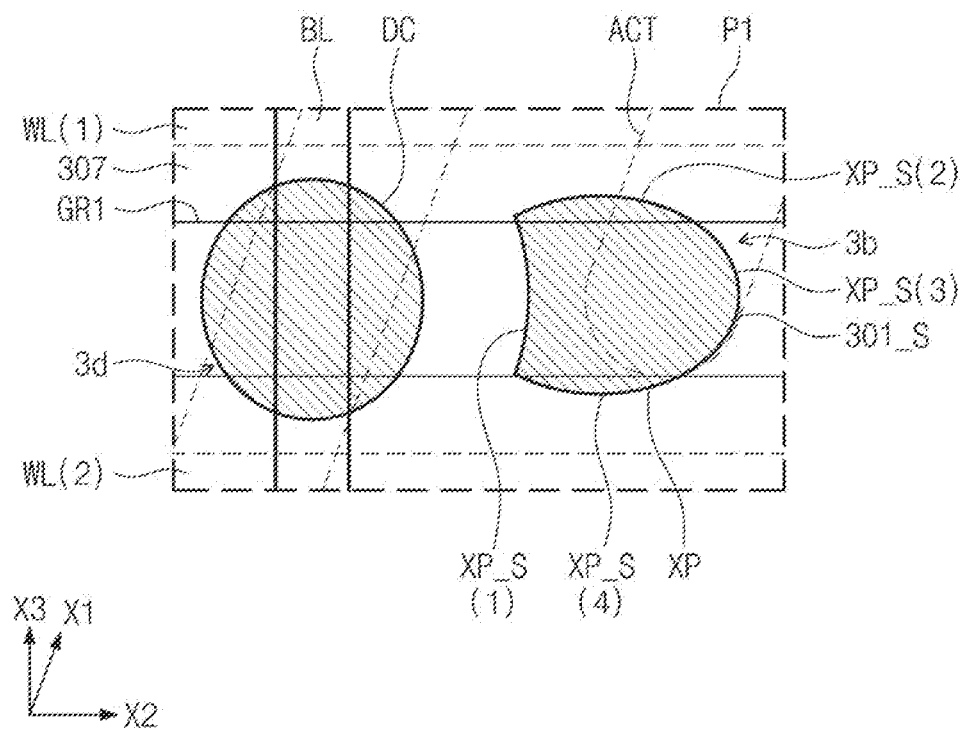
FIG. 23B illustrates an enlarged view showing section P1 of FIG. 23A.

FIG. 23A illustrates a plan view showing a semiconductor memory device according to some example embodiments of the present inventive concepts. FIG. 23B illustrates an enlarged view showing section P1 of FIG. 23A. FIG. 23A omits the illustration of the landing pad LP of FIG. 1A. A cross-section taken along lines A-A' and B-B' of FIG. 23A may be identical or similar to that of FIG. 1B.

Referring to FIGS. 1B, 23A, and 23B, the second pad sidewall XP_S(2) and the fourth pad sidewall XP_S(4) may be outwardly convex, and may connect the first pad sidewall XP_S(1) to the third pad sidewall XP_S(3) of the storage node pad XP. The storage node pad XP may have an oval shape a portion of which is cut away. For example, the first pad sidewall XP_S(1) of the storage node pad XP may have a shape that is concave in the second direction X2. In the present embodiment, an overlapping area between the storage node pad XP and the active section ACT may be relatively less than that in the case of FIG. 21B. The storage node pad XP may not cover but expose the sidewall 301_S of the substrate 301, which sidewall 301_S is adjacent to the third pad sidewall XP_S(3) of the storage node pad XP. Other configurations may be identical or similar to those discussed with reference to FIGS. 21A and 21B.

Figure 24:
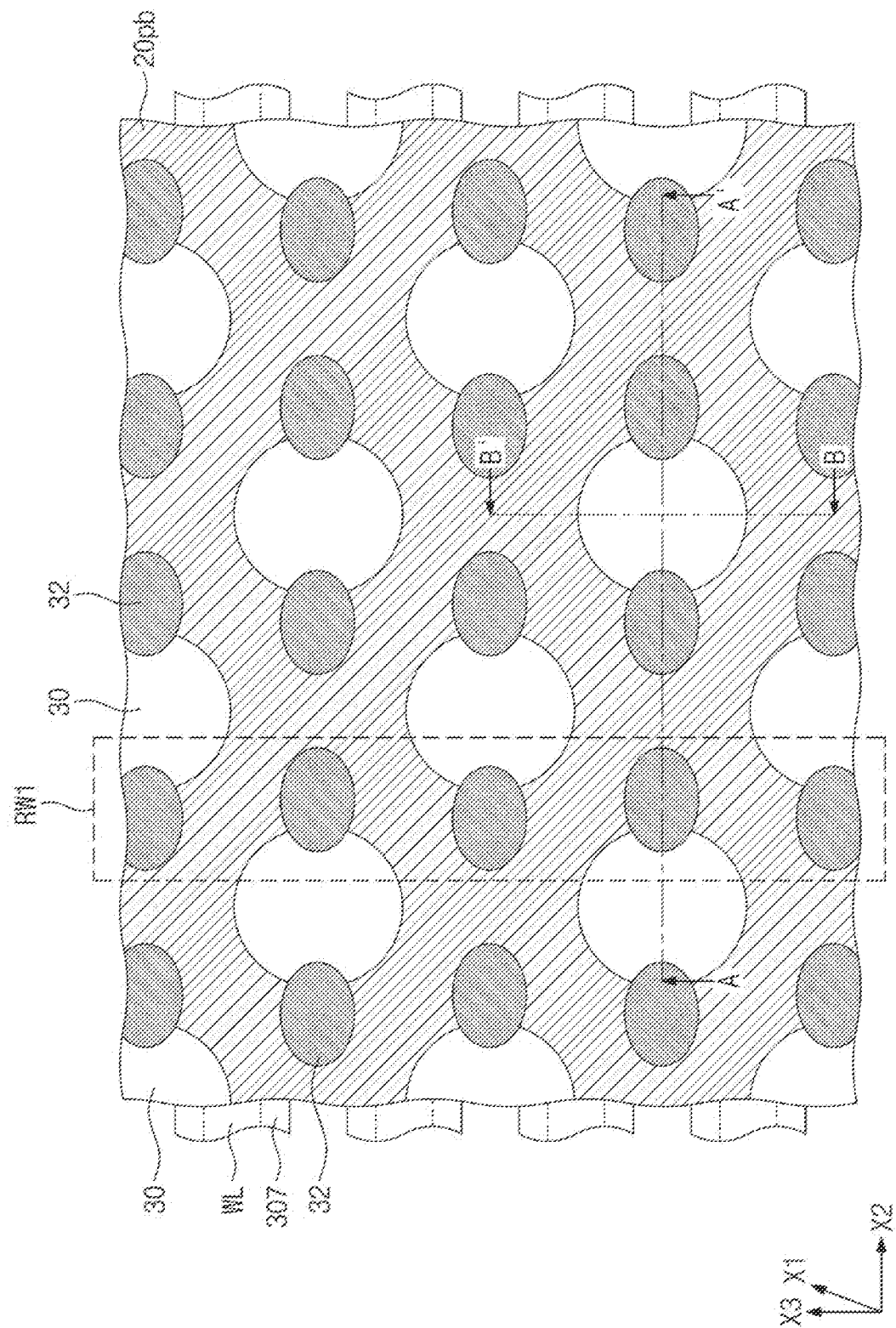
FIG. 24 illustrates a plan view showing an example method of fabricating a semiconductor memory device having the plan view of FIG. 23A.

FIG. 24 illustrates a plan view showing an example method of fabricating a semiconductor memory device having the plan view of FIG. 23A. A cross-section taken along lines A-A' and B-B' of FIG. 24 may be identical or similar to that of FIG. 10B.

Referring to FIG. 24, as discussed with reference to FIGS. 10A and 10B, third mask patterns 32 may be formed on the contact capping pattern 30 and the second conductive pattern 20pb. In this step, the third mask patterns 32 may each have a planar shape that is not rectangular as shown FIG. 10A but oval as shown in FIG. 24. A portion of the third mask pattern 32 may overlap the contact capping pattern 30. In the present embodiment, the third mask patterns 32 in one column RW1 may have ends that are not aligned along the third direction X3. On the one column RW1, odd-numbered third mask patterns 32 may be shifted to a direction opposite to the second direction X2, and even-numbered third mask patterns 32 may be shifted to the second direction X2.

Figure 25A:
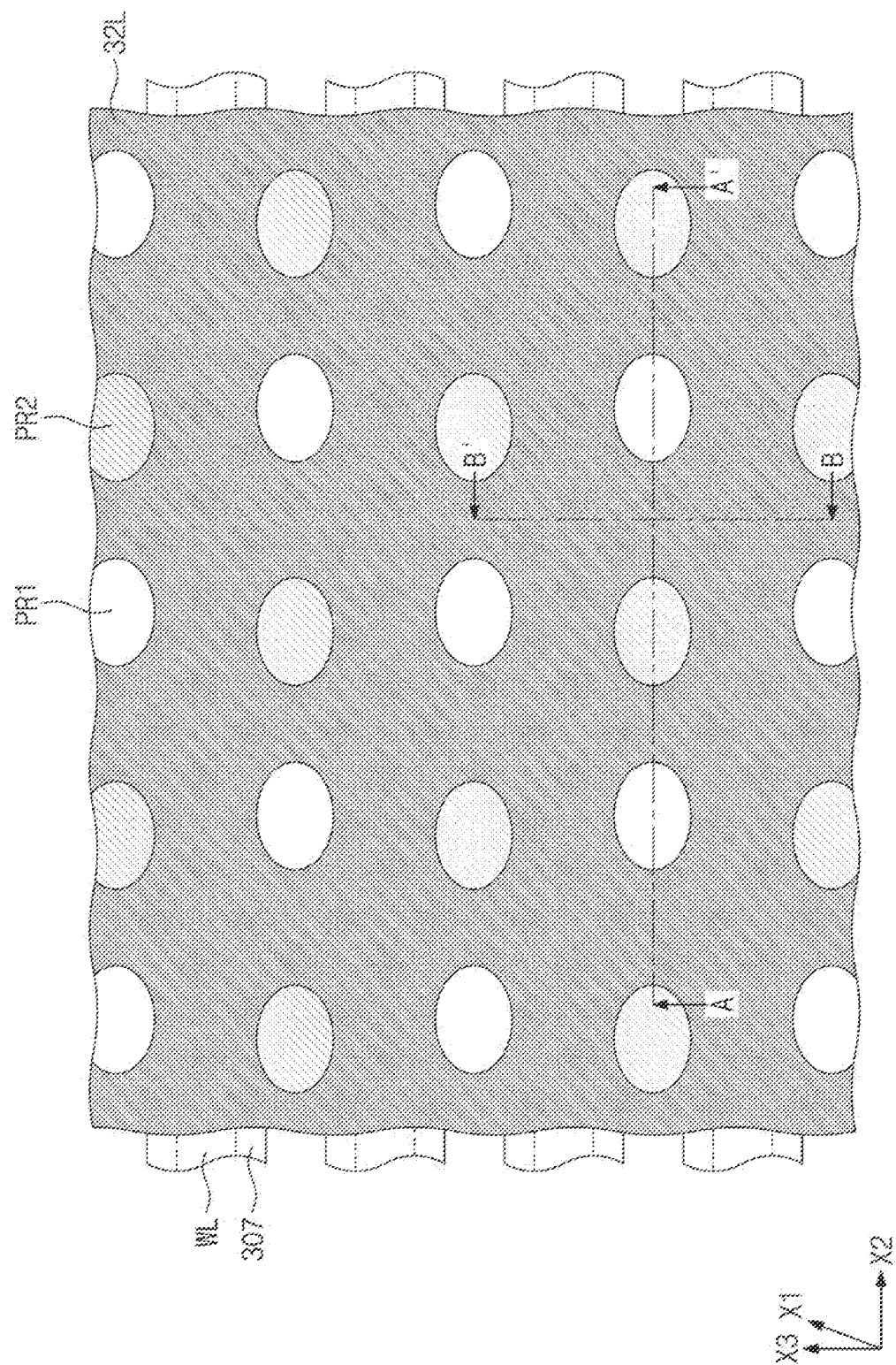
FIG. 25A illustrates a plan view showing an example method of forming third mask patterns of FIG. 24.
Figure 25B:
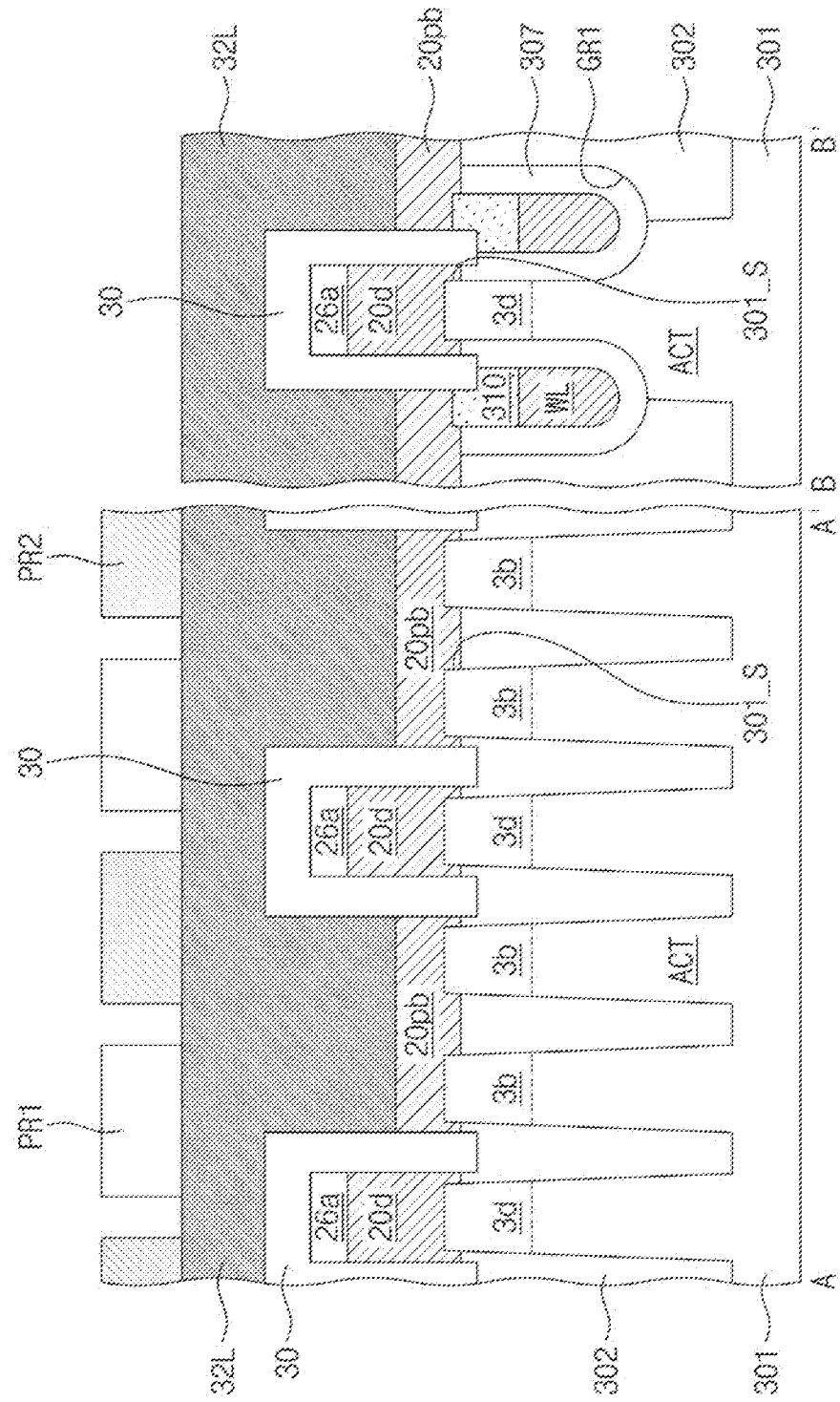
FIG. 25B illustrates a cross-sectional view taken along lines A-A' and B-B' of FIG. 25A.

FIG. 25A illustrates a plan view showing an example method of forming third mask patterns of FIG. 24. FIG. 25B illustrates a cross-sectional view taken along lines A-A' and B-B' of FIG. 25A.

Figure 9B:
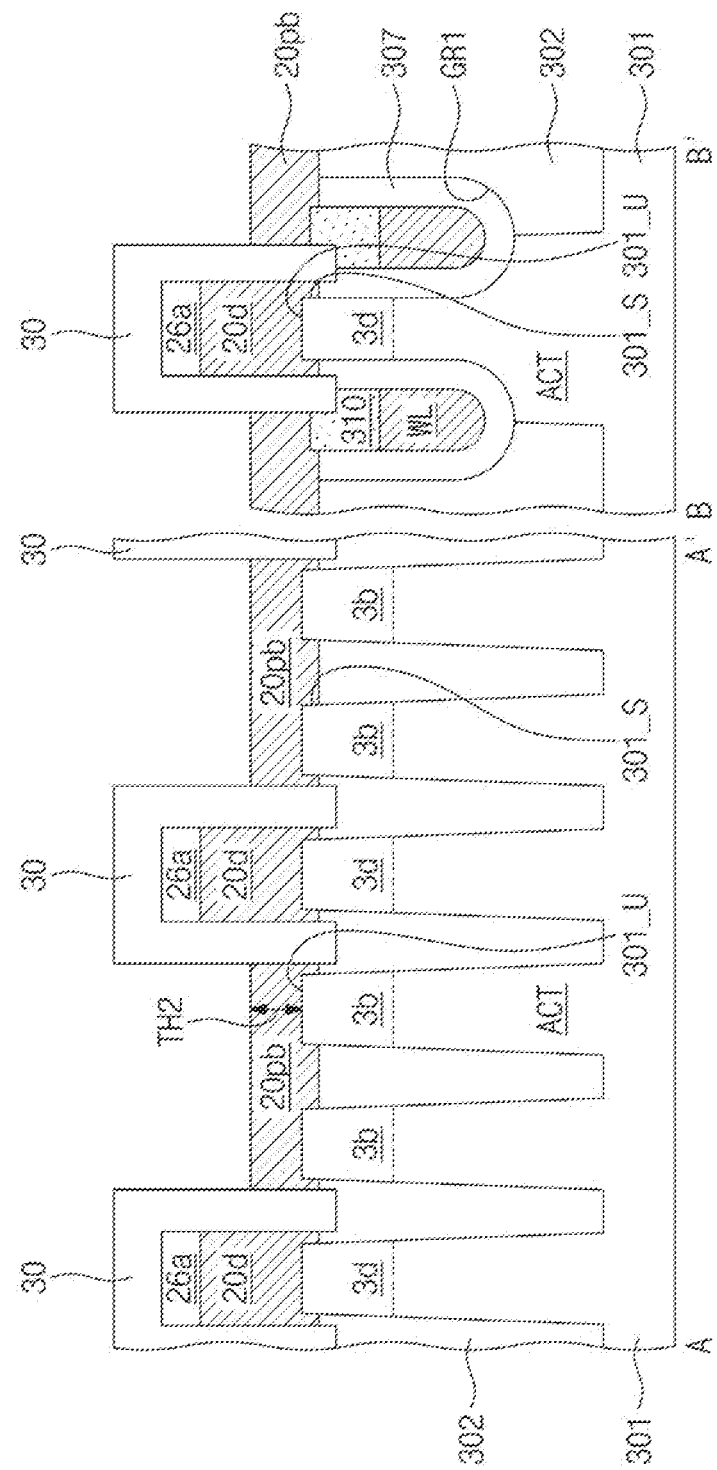

Referring to FIGS. 25A and 25B, at the step of FIGS. 9A and 9B, a third mask layer 32L may be formed on the contact capping pattern 30 and the second conductive pattern 20pb. The third mask layer 32L may be formed of a single or multiple layer including at least one selected from spin-on-hardmask (SOH), amorphous carbon layer (ACL), silicon nitride, and silicon oxynitride. Fourth mask patterns PR1 and PR2 may be formed on the third mask layer 32L. The fourth mask patterns PR1 and PR2 may include first photoresist patterns PR1 and second photoresist patterns PR2.

The formation of the fourth mask patterns PR1 and PR2 may include forming a photoresist layer on the third mask layer 32L, performing a first exposure process to convert portions of the photoresist layer into the first photoresist patterns PR1, performing a second exposure process to convert other portions of the photoresist layer into the second photoresist patterns PR2, and performing a development process to remove remaining portions of the photoresist layer that are not converted into the first photoresist patterns PR1 or the second photoresist patterns PR2. The first photoresist patterns PR1 may each have an island shape, and may be two-dimensionally arranged to be spaced apart from each other. The same interval may be provided between the first photoresist patterns PR1. The second photoresist patterns PR2 may be alternately arranged between the first photoresist patterns PR1. The second photoresist patterns PR2 and the first photoresist patterns PR1 may be the same in terms of shape and interval. The first exposure process and the second exposure process may use the same photomask, but a position of the photomask in the first exposure process may be different from that in the second exposure process. As discussed above, the third mask patterns 32 of FIG. 24 may be formed by forming the fourth mask patterns PR1 and PR2, and then using the fourth mask patterns PR1 and PR2 as an etching mask to etch the third mask layer 32L. Subsequent processes may be identical or similar to those discussed with reference to FIGS. 11A to 17B.

Figure 26A:
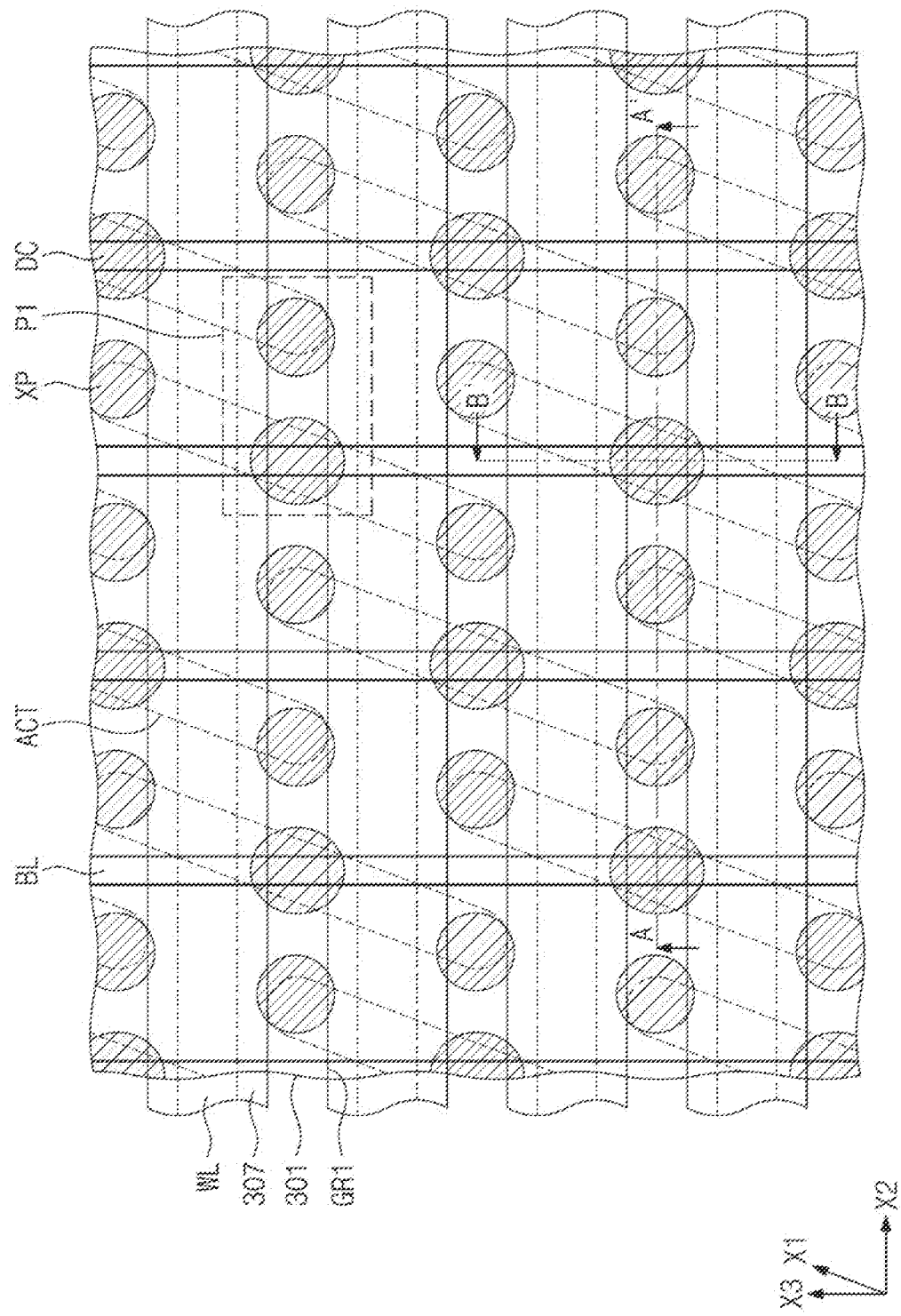
FIG. 26A illustrates a plan view showing a semiconductor memory device, according to some example embodiments of the present inventive concepts.
Figure 26B:
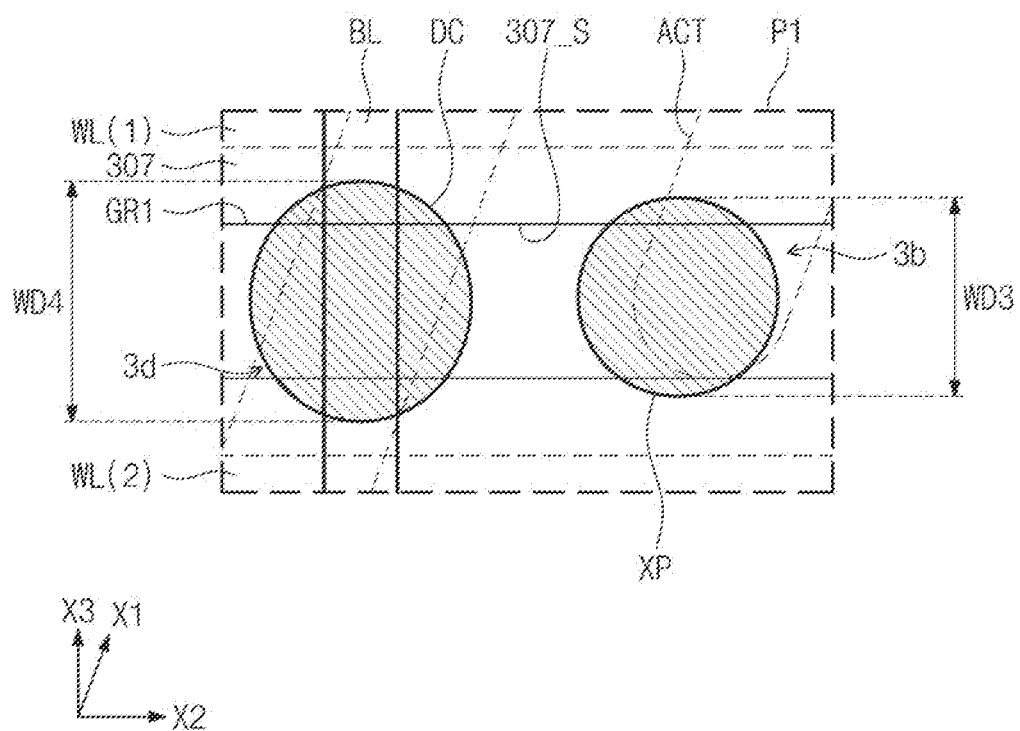
FIG. 26B illustrates an enlarged view showing section P1 of FIG. 26A.

FIG. 26A illustrates a plan view showing a semiconductor memory device according to some example embodiments of the present inventive concepts. FIG. 26B illustrates an enlarged view showing section P1 of FIG. 26A. FIG. 26A omits the illustration of the landing pad LP of FIG. 1A. A cross-section taken along lines A-A' and B-B' of FIG. 26A may be identical or similar to that of FIG. 1B.

Referring to FIGS. 26A and 26B, for a semiconductor memory device according to the present embodiment, the bit-line contact DC and the storage node pad XP may each have a rounded (e.g., oval or circular) shape when viewed in plan. The storage node pad XP may have a diameter WD3 less than a diameter WD4 of the bit-line contact DC. Other configurations may be identical or similar to those discussed with reference to FIGS. 23A and 23B.

Figure 27:
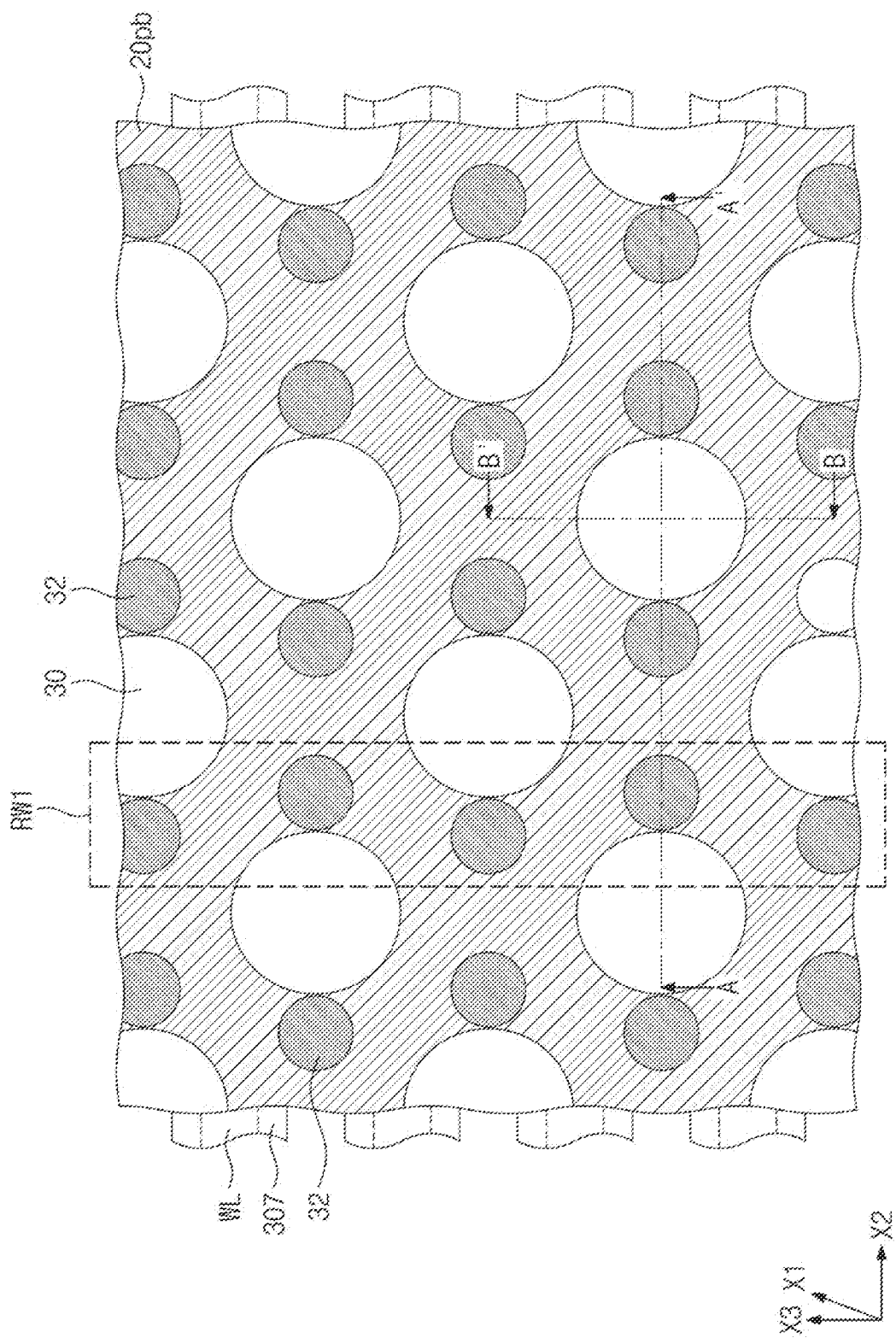
FIG. 27 illustrates a plan view showing an example method of fabricating a semiconductor memory device having the plan view of FIG. 26A.

FIG. 27 illustrates a plan view showing an example method of fabricating a semiconductor memory device having the plan view of FIG. 26A. A cross-section taken along line A-A' and B-B' of FIG. 27 may correspond to that of FIG. 10B.

Referring to FIG. 27, as discussed with reference to FIGS. 10A and 10B, third mask patterns 32 may be formed on the contact capping pattern 30 and the second conductive pattern 20pb. In this step, the third mask patterns 32 may each have a planar shape that is not rectangular as shown FIG.

10A but circular as shown in FIG. 27. In the present embodiment, the third mask pattern 32 may be in contact with the contact capping pattern 30, but may not overlap the contact capping pattern 30. In the present embodiment, the third mask patterns 32 in one column RW1 may have their ends that are not aligned along the third direction X3. On the one column RW1, odd-numbered third mask patterns 32 may be shifted to a direction opposite to the second direction X2, and even-numbered third mask patterns 32 may be shifted to the second direction X2. The formation of the third mask pattern 32 may be substantially the same as or similar to that discussed with reference to FIGS. 25A and 25B. However, in this case, the fourth mask patterns PR1 and PR2 may each have a circular shape. Subsequent processes may be identical or similar to those discussed with reference to FIGS. 11A to 17B.

In a semiconductor memory device according to the present inventive concepts, a substrate may protrude more than a device isolation pattern, and thus a contact area may be increased between the substrate and each of a bit-line pattern and a storage node pattern. Therefore, a contact resistance may be reduced, and the semiconductor memory device may operate at high speeds and low powers. In addition, silicon oxide may be included in a spacer liner that covers a sidewall of a bit line, and thus a bit-line spacer may increase in insulating properties. As a result, the semiconductor memory device may increase in reliability.

In a method of fabricating a semiconductor memory device according to the present inventive concepts, a device isolation pattern may be etched to expose lateral surfaces of a substrate. Thus, a contact area may be increased between a bit-line pattern and the lateral surfaces of the substrate and between a storage node pattern and the lateral surfaces of the substrate. For this reason, a storage node contact may be formed to exclude polysilicon and to include metal, and accordingly a high-temperature annealing process may not be required, which may result in prevention of process defects.

Although the present inventive concepts have been described in connection with some embodiments of the present inventive concepts illustrated in the accompanying drawings, it will be understood to those skilled in the art that various changes and modifications may be made without departing from the technical spirit and essential feature of the present inventive concepts. It will be apparent to those skilled in the art that various substitution, modifications, and changes may be thereto without departing from the scope and spirit of the present inventive concepts.

What is claimed is:

1. A semiconductor memory device, comprising:
   a device isolation pattern in a substrate and defining a first active section and a second active section that are spaced apart from each other, a center of the first active section being adjacent to an end of the second active section;
   a bit line that crosses over the center of the first active section;
   a bit-line contact between the bit line and the first active section; and
   a first storage node pad on the end of the second active section,
   wherein the first storage node pad contacts an upper surface, a first sidewall, and a second sidewall of the second active section,
   wherein the first storage node pad includes a first pad sidewall and a second pad sidewall, the first pad sidewall being adjacent to the bit-line contact, and the second pad sidewall being opposite to the first pad sidewall,
   wherein, when viewed in plan, the second pad sidewall is convex in a direction away from the bit-line contact, and
   wherein the first active section and the second active section extend above the upper surface of the device isolation pattern.

2. The semiconductor memory device of claim 1, further comprising:
   a first word line in the substrate and extending in a first direction, the first word line running across both of the first active section and the second active section;
   a second word line in the substrate and spaced apart from the first word line, the second word line extending in the first direction and running across the first active section;
   a first gate dielectric layer between the first word line and the substrate; and
   a second gate dielectric layer between the second word line and the substrate,
   wherein, when viewed in plan, the first storage node pad is between the first word line and the second word line, and
   wherein a center of a width of the first storage node pad is not on an imaginary line that is parallel to the first direction and passes through a center of an interval between the first gate dielectric layer and the second gate dielectric layer, the width of the first storage node pad being measured in a second direction orthogonal to the first direction.

3. The semiconductor memory device of claim 1, further comprising:
   a first word line in the substrate and extending in a first direction, the first word line running across both of the first active section and the second active section; and
   a second word line in the substrate and spaced apart from the first word line, the second word line extending in the first direction and running across the first active section,
   wherein, when viewed in plan, the first storage node pad is between the first word line and the second word line, and
   wherein a first interval between the first word line and the first storage node pad is different from a second interval between the second word line and the first storage node pad.

4. The semiconductor memory device of claim 1, wherein a top surface of the device isolation pattern is lower than a top surface of the substrate, and wherein the bit-line contact covers the top surface of the substrate and a sidewall of the substrate.

5. The semiconductor memory device of claim 1, wherein the device isolation pattern further defines a third active section that is spaced apart from the second active section across the first active section, an end of the third active section being adjacent to the center of the first active section, wherein the semiconductor memory device further comprises a second storage node pad on the end of the third active section, and wherein the second storage node pad has a mirror-symmetrical shape to the first storage node pad.

6. The semiconductor memory device of claim 1, wherein, when viewed in plan, the first pad sidewall is recessed in the direction away from the bit-line contact.

7. The semiconductor memory device of claim 6, wherein a curvature of the second pad sidewall is different from a curvature of the first pad sidewall.

8. The semiconductor memory device of claim 6,
wherein the first storage node pad further includes a third pad sidewall that connects the first pad sidewall and the second pad sidewall to each other, and
wherein the third pad sidewall is flat or convex.

9. A semiconductor memory device, comprising:
a device isolation pattern in a substrate and defining a first active section and a second active section that are spaced apart from each other, a center of the first active section being adjacent to an end of the second active section;
a first word line in the substrate and extending in a first direction, the first word line running across both of the first active section and the second active section;
a second word line in the substrate and spaced apart from the first word line, the second word line extending in the first direction and running across the first active section;
a word-line capping pattern on each of the first word line and the second word line;
a bit line that crosses over the center of the first active section;
a bit-line contact between the bit line and the first active section; and
a storage node pad on the end of the second active section,
wherein the storage node pad contacts an upper surface, a first sidewall, and a second sidewall of the second active section,
wherein, when viewed in plan, the storage node pad is between the first word line and the second word line,
wherein a first interval between the first word line and the storage node pad is different from a second interval between the second word line and the storage node pad,
wherein the first active section and the second active section extend above the upper surface of the device isolation pattern,
wherein the storage node pad includes a first pad sidewall adjacent to the bit-line contact and a second pad sidewall opposite to the first pad sidewall, and
wherein, when viewed in plan, the second pad sidewall is convex in a direction away from the bit-line contact.

10. The semiconductor memory device of claim 9, wherein, when viewed in plan, the first pad sidewall is recessed in the direction away from the bit-line contact.

11. The semiconductor memory device of claim 9,
wherein the storage node pad further includes a third pad sidewall that connects the first pad sidewall and the second pad sidewall to each other, and
wherein the third pad sidewall is flat or convex.

12. A semiconductor memory device, comprising:
a device isolation pattern in a substrate and defining a first active section and a second active section that are spaced apart from each other, a center of the first active section being adjacent to an end of the second active section;
a first word line in the substrate and extending in a first direction, the first word line running across both of the first active section and the second active section;
a second word line in the substrate and spaced apart from the first word line, the second word line extending in the first direction and running across the first active section;
a first gate dielectric layer between the first word line and the substrate;
a second gate dielectric layer between the second word line and the substrate;
a bit line that crosses over the center of the first active section;
a bit-line contact between the bit line and the first active section; and
a storage node pad on the end of the second active section,
wherein the storage node pad contacts an upper surface, a first sidewall, and a second sidewall of the second active section,
wherein, when viewed in plan, the storage node pad is between the first word line and the second word line,
wherein a center of a width of the storage node pad is not on an imaginary line that is parallel to the first direction and passes through a center of an interval between the first gate dielectric layer and the second gate dielectric layer, the width of the storage node pad being measured in a second direction orthogonal to the first direction,
wherein the first active section and the second active section extend above the upper surface of the device isolation pattern,
wherein the storage node pad includes a first pad sidewall adjacent to the bit-line contact and a second pad sidewall opposite to the first pad sidewall, and
wherein, when viewed in plan, the second pad sidewall is convex in a direction away from the bit-line contact.

13. The semiconductor memory device of claim 12, wherein, when viewed in plan, the first pad sidewall is recessed in the direction away from the bit-line contact.

14. The semiconductor memory device of claim 12,
wherein the storage node pad further includes a third pad sidewall that connects the first pad sidewall and the second pad sidewall to each other, and
wherein the third pad sidewall is flat or convex.

15. The semiconductor memory device of claim 12, wherein a bottom end of the bit-line contact and a bottom end of the storage node pad are lower than a top surface of the substrate.

* * * * *